United States Patent
Usami

[11] Patent Number: 5,883,611
[45] Date of Patent: Mar. 16, 1999

[54] IMAGE CONTROLLER HAVING PRINTER

[75] Inventor: Ryuji Usami, Tokyo, Japan

[73] Assignee: Casio Computer Co., Ltd., Tokyo, Japan

[21] Appl. No.: 576,945

[22] Filed: Dec. 22, 1995

[30] Foreign Application Priority Data

Dec. 28, 1994 [JP] Japan .................................. 6-328735

[51] Int. Cl.$^6$ ...................................................... G09G 5/36
[52] U.S. Cl. ........................... 345/114; 345/115; 345/117
[58] Field of Search ........................... 345/117, 113–115; 348/552; 399/8, 81; 463/31–34, 46; 358/531, 537, 538

[56] References Cited

U.S. PATENT DOCUMENTS

| | | |
|---|---|---|
| 4,095,791 | 6/1978 | Smith et al. . |
| 4,296,476 | 10/1981 | Mayer et al. .............................. 463/31 |
| 4,471,463 | 9/1984 | Mayer et al. . |
| 4,724,462 | 2/1988 | Yamasaki et al. ....................... 345/117 |
| 4,763,300 | 8/1988 | Yukawa . |
| 5,010,498 | 4/1991 | Miyata . |
| 5,255,104 | 10/1993 | Kajigaya .................................... 399/81 |
| 5,383,129 | 1/1995 | Farrell ....................................... 399/81 |
| 5,438,438 | 8/1995 | Lee ........................................... 358/537 |
| 5,475,835 | 12/1995 | Hickey .................................... 348/552 |

FOREIGN PATENT DOCUMENTS

0439269 A2  7/1991  European Pat. Off. .

*Primary Examiner*—Jeffery Brier
*Attorney, Agent, or Firm*—Frishauf, Holtz, Goodman, Langer & Chick

[57] ABSTRACT

In an image controller, a VDP, a CPU, and a printer section, which are needed to prepare and print an image signal, are provided in the same housing. The CPU supplies an image parameter corresponding to a printing state of the printer to the VDP, so that a user can recognize a shortage of printing paper of the printer and a setting defectiveness of the printing paper, RGB data for one horizontal line is written to an RGB line memory of an RGB buffer section of the VDP, and a print processing is executed based on the RGB data transferred to the work RAM.

14 Claims, 59 Drawing Sheets

GENERAL STRUCTURAL VIEW OF CIRCUIT OF EMBODIMENT OF PRESENT INVENTION

OUTLINE VIEW OF EMBODIMENT OF PRESENT INVENTION

OUTLINE VIEW OF CONTROL PAD 313

STRUCTURAL VIEW OF VDP

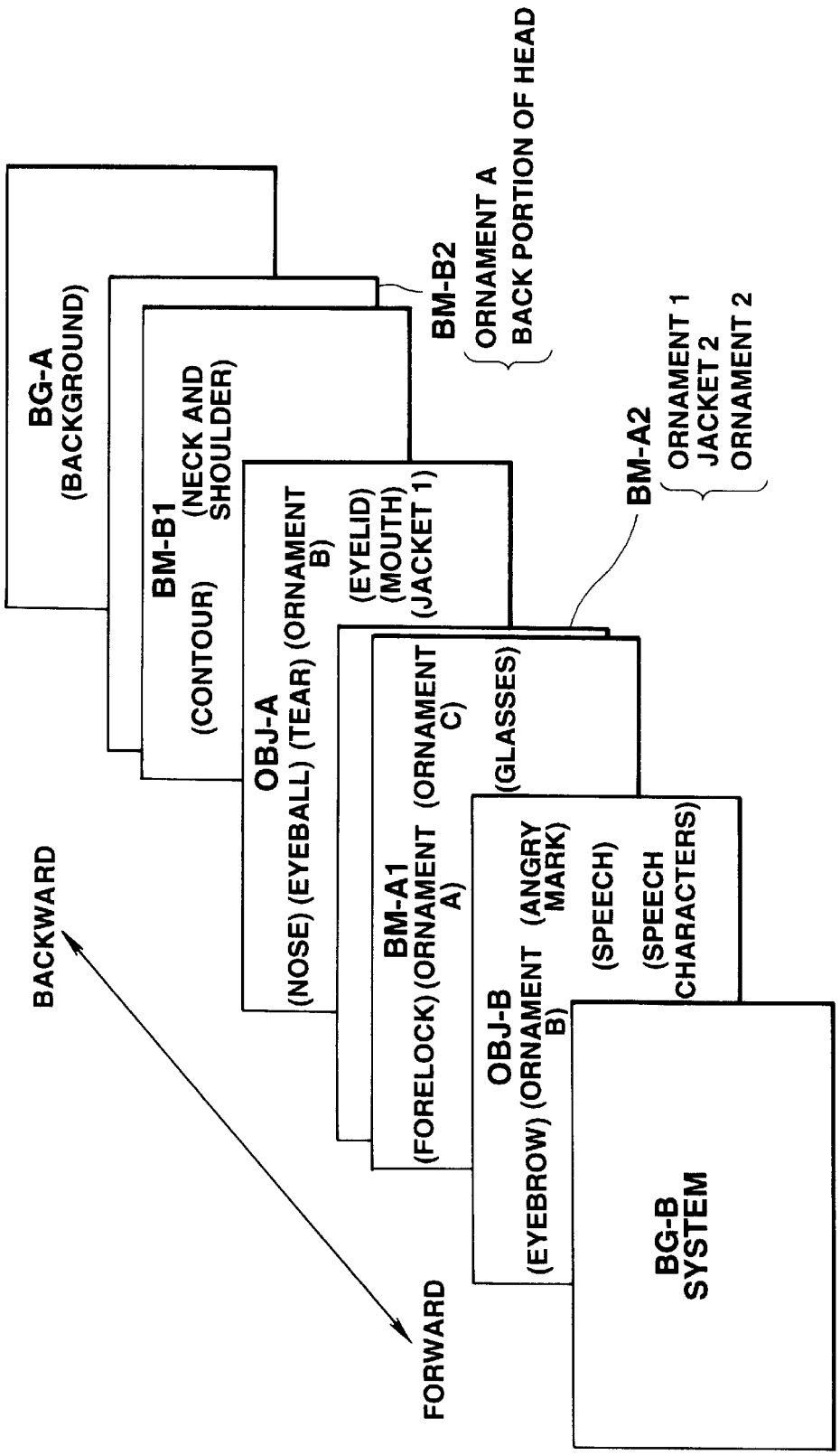
FIG.5 EXPLANATORY VIEW OF HIERARCHICAL STRUCTURE OF DISPLAY SCREEN

FIG.6

VIEW OF SCREEN ASSIGN

| SCREEN | BIT/DOT | PART |
|---|---|---|
| BG-A | 4 | BACKGROUND |
| BM-B2 | | ORNAMENT A<br>BACK PORTION OF HEAD |
| BM-B1 | | CONTOUR<br>NECK AND SHOULDER |
| OBJ-A | 4 | NOSE<br>EYEBALL<br>TEAR<br>MOUTH<br>ORNAMENT B<br>EYELID<br>JACKET 1 |
| BM-A2 | 4 | ORNAMENT 1<br>JACKET 2<br>ORNAMENT 2 |
| BM-A1 | 4 | FORELOCK<br>ORNAMENT A<br>ORNAMENT C<br>GLASSES |
| OBJ-B | 4 | EYEBROW<br>ORNAMENT B<br>ANGRY MARK<br>SPEECH<br>SPEECH CHARACTERS |
| BG-B | 4 | SYSTEM |

* IN TABLE, UP → DOWN CORRESPONDS TO PORTION FROM BACKWARD OF SCREEN PRIORITY TO FORWARD.

DATA STRUCTURAL VIEW OF SRAM

DATA STRUCTURAL VIEW OF DP-RAM

FIG.9

DATA STRUCTURAL VIEW OF OBJECT
ATTRIBUTE MEMORY SECTION

| OBJECT NO. | COORDINATE OF ARRANGEMENT | |
|---|---|---|
| #0 | Y-COORDINATE | FOR OBJ-A |
| | X-COORDINATE | |
| #1 | Y-COORDINATE | |
| | X-COORDINATE | |
| #N | Y-COORDINATE | |
| | X-COORDINATE | |
| #N+1 | Y-COORDINATE | FOR OBJ-B |
| | X-COORDINATE | |
| #127 | Y-COORDINATE | |
| | X-COORDINATE | |

FIG.10

DATA STRUCTURAL VIEW OF
DISPLAY CONTROL REGISTER

| 7 | 6 | 5 | 4 | 3 | 2 | 1 | 0 |
|---|---|---|---|---|---|---|---|
| OBJ-B | OBJ-A | BM-B2 | BM-B1 | BM-A2 | BM-A1 | BG-B | BG-A |

$\begin{cases} 1 : \text{ON (DISPLAY)} \\ 2 : \text{OFF (NOT DISPLAY)} \end{cases}$

STRUCTURAL VIEW OF RGB BUFFER SECTION

VIEW OF TRANSITION OF DISPLAY SCREEN

FLOW CHART OF OPERATION OF PROCESSING OF QUESTIONNAIRE SCREEN (NO.1)

FIG.20 FLOW CHART OF OPERATION OF PROCESSING OF FILE OPERATION SCREEN (NO.2)

FLOW CHART OF OPERATION OF PROCESSING OF FILE OPERATION SCREEN (NO.3)

FLOW CHART OF OPERATION OF PROCESSING OF BASIC SYSTEM SCREEN (NO.1)

FLOW CHART OF OPERATION OF PROCESSING OF BASIC SYSTEM SCREEN (NO.2)

FLOW CHART OF OPERATION OF PROCESSING OF BASIC SYSTEM SCREEN (NO.3)

FLOW CHART OF OPERATION OF PROCESSING
OF BASIC SYSTEM SCREEN (NO.4)

FLOW CHART OF OPERATION OF PROCESSING OF CHARACTER INPUT SCREEN (NO.1)

FLOW CHART OF OPERATION OF PROCESSING OF CHARACTER INPUT SCREEN (NO.2)

FLOW CHART OF OPERATION OF PROCESSING OF CHARACTER INPUT SCREEN (NO. 3)

FLOW CHART OF OPERATION OF PRINT PROCESSING (NO. 1)

FLOW CHART OF OPERATION OF PRINT PROCESSING (NO. 2)

FLOW CHART OF OPERATION OF PRINT EXECUTION PROCESSING (NO. 1)

FLOW CHART OF OPERATION OF PRINT EXECUTION PROCESSING (NO. 2)

FLOW CHART OF OPERATION OF PRINT EXECUTION PROCESSING (NO. 3)

FLOW CHART OF OPERATION OF RESIDUAL PAPER CHECKING PROCESSING

FLOW CHART OF OPERATION OF SCREEN EXTRACTION PROCESSING

FIG. 36 VIEW OF LAYOUT OF QUESTIONNAIRE (NO.1)

FIG. 37 VIEW OF LAYOUT OF QUESTIONNAIRE (NO.2)

VIEW OF LAYOUT OF QUESTIONNAIRE (NO.3)

VIEW OF LAYOUT OF QUESTIONNAIRE (NO.4)

VIEW OF LAYOUT OF FILE OPERATION SCREEN

VIEW SHOWING CONTENT OF BALLOON ON
MODE SELECTION SCREEN

DISCRIMINA- TION OF SEX?

HOW OLD IS SHE (HE)?

WHAT IS SHE(HE) LIKE?

IS SHE(HE) GOOD- LOOKING?

VIEW SHOWING CONTENT OF BALLOON ON QUESTIONNAIRE SCREEN

WHICH READ?
AT LOADING TIME

WHERE STORE?
AT SAVING TIME

REALLY STOP?
RETURN ICON

OK THIS GIRL?
CONFIRMATION ANSWER

NO DATA THERE
FILE STATE (NO DATA)

CANNOT STORE THERE
AT PRESET FILE DESIGNATING TIME

DISPLAY OK?
AT NORMAL FILE DESIGNATING TIME

VIEW SHOWING CONTENT OF BALLOON ON FILE OPERATION SCREEN

VIEW SHOWING CONTENT OF BALLOON ON
BASIC SYSTEM SCREEN

VIEW SHOWING CONTENT OF BALLOON
ON CHARACTER INPUT SCREEN

VIEW SHOWING DISPLAY CONTENT OF ALARM
PORTION ON FILE OPERATION SCREEN

VIEW SHOWING CONTENT OF BALLOON
ON PRINT PROCESSING (NO.1)

VIEW SHOWING CONTENT OF BALLOON
ON PRINT PROCESSING (NO.2)

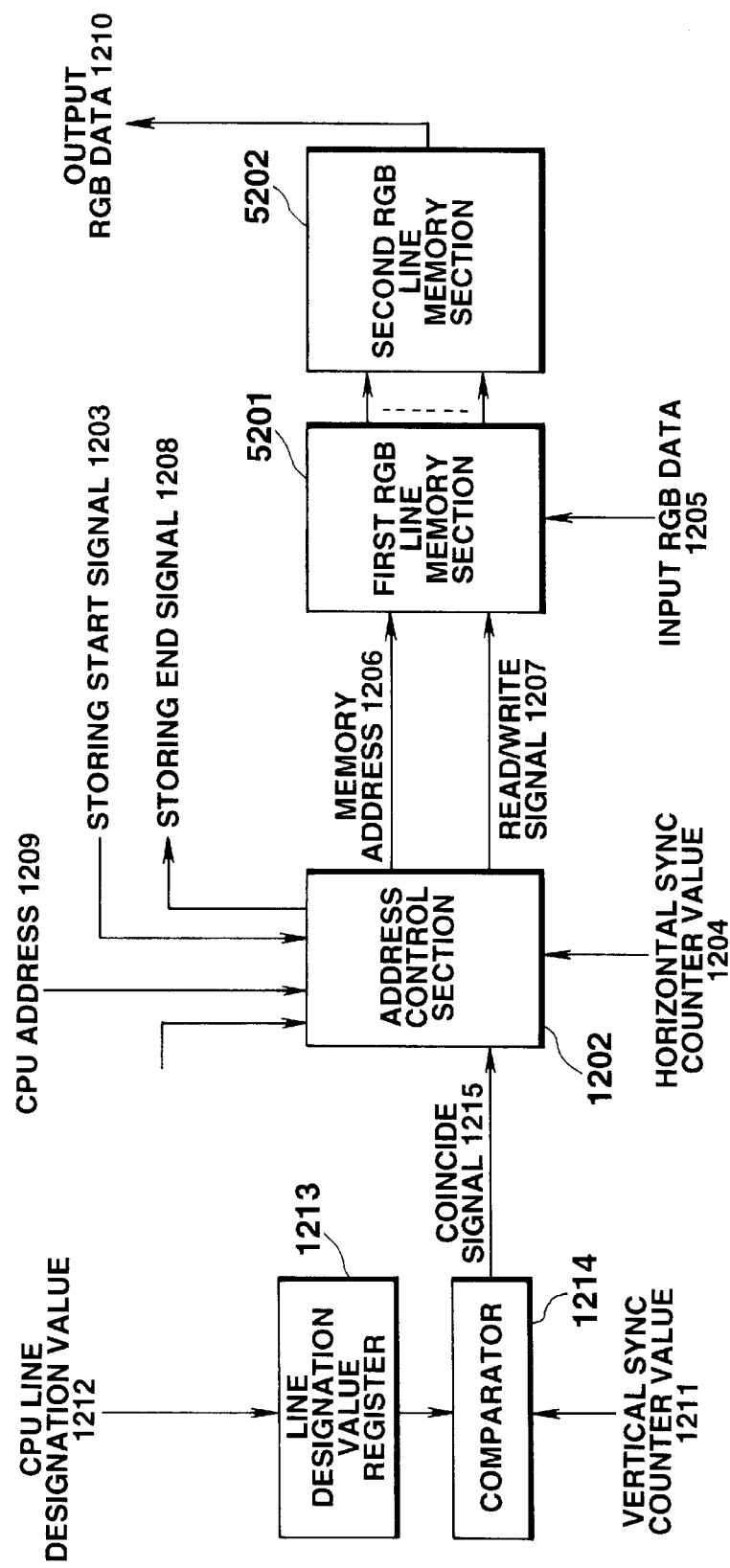
FIG.52 STRUCTURAL VIEW OF RGB BUFFER SECTION OF SECOND EMBODIMENT

FLOW CHART OF OPERATION OF SCREEN
EXTRACTION PROCESSING OF SECOND EMBODIMENT

STRUCTURAL VIEW OF RGB BUFFER SECTION
OF FOURTH EMBODIMENT

FLOW CHART OF OPERATION OF SCREEN EXTRACTION PROCESSING OF FOURTH EMBODIMENT

STRUCTURAL VIEW OF RGB BUFFER SECTION OF FIFTH EMBODIMENT

IMAGE CONTROLLER HAVING PRINTER

BACKGROUND OF THE INVENTION

1. Field of the Invention

The present invention relates to a technique for printing an image controlled in an image controller.

2. Description of the Related Art

Conventionally, there has been known an image controller such as a TV game machine having an image processing function of controlling image data such as a sprite (object) or a background. In the image processing function of such an apparatus, since it is necessary that processing such as a detection of an image position and priority control be executed in real time, the so-called video display processor (VDP) is generally structured as a hardware for the controller. In such a conventional technique of VDP, a final output image is output as a video signal at real time.

On the other hand, there has been known a printer, which fetches an image signal such as a video signal to print an image.

The above image controller and the printer are combined with each other, so that an image to be displayed on a TV screen of the TV game machine can be printed.

However, since the image signal, which is fetched by the printer, is the video signal, quality of the printed image is not sufficient. Moreover, since only the video signal corresponding to the final output image can be printed, there is a problem in that the control for printing only a desired image among the displayed images can not be performed.

Moreover, since there is needed an interface circuit for inputting/outputting the video signal to/from both the image controller and the printer, the hardware becomes bulky. As a result, there is a problem in that manufacturing cost is increased.

SUMMARY OF THE INVENTION

An object of the present invention is to realize an image controller with a printer, which can freely control image data to be printed and which has a printing function for obtaining a high quality image at a low cost.

More specifically, according to a first aspect of the present invention, there is provided an image controller with a printer comprising image signal outputting means for outputting an image signal formed of a background image and a display object image moving on the background image based on an image parameter to be input; controlling means for supplying the predetermined image parameter to the image signal outputting means; and image printing means for receiving the image signal from the image signal outputting means, wherein the image signal outputting means, the controlling means, and the image printing means are provided in the same housing.

According to the above-mentioned structure, the detailed linkage control between the image signal outputting means and the printing means can be performed.

Also, since the printing means can directly execute the printing processing of the image signal without interface of the video signal, the printing having a high quality of image can be performed. Moreover, since the interface circuit can be omitted, the scale of the hardware is reduced, and the image controller with a printer can be realized at a low cost.

Also, an object of the present invention is to provide an image controller with a printer in which image data to be printed can be freely controlled and a printing function for obtaining a high quality of image can be realized at a low cost, and a printing state can be informed to a user.

More specifically, according to a second aspect of the present invention, there is provided an image controller with a printer comprising image signal outputting means for outputting an image signal formed of a background image and a display object image moving on the background image based on an image parameter to be input; controlling means for supplying the predetermined image parameter to the image signal outputting means; image printing means for receiving the image signal from the image signal outputting means; and printing state controlling means for supplying the image parameter corresponding to a print state of the printing means to the image outputting means through the controlling means; wherein the image signal outputting means, the controlling means, the image printing means, and the printing state controlling means are provided in the same housing.

According to the above-mentioned structure, in addition to the above-mentioned advantages, the user can easily recognize the printing state of the printing means, for example, a start of printing, an end of printing, or abnormality such as shortage of printing paper, setting defectiveness of printing paper without using a special display device.

Moreover, an object of the present invention is to provide an image controller with a printer in which image data to be printed can be freely controlled, and a printing function for obtaining a high quality image can be realized with a small scale of the hardware at a low cost.

More specifically, according to a third aspect of the present invention, there is provided an image controller with a printer comprising image data storing means for storing background data necessary to display a screen and display object image data to be displayed at a position of the display screen; display object displaying position storing means for storing the display position on the display screen of the display object image data; scanning means for scanning the display screen; image processing means for reading background data corresponding to a scanning position scanned by the scanning means from the image data storing means, and for reading display object image data from the image data storing means when the scanning position coincides with a display position of the display object image data stored in the display object displaying position storing means, so as to sequentially output an image signal corresponding to the read background image data and display object image data one horizontal line by one horizontal line; image line storing means for temporarily storing the image signal for one horizontal line sequentially output from the image processing means; and printing means for executing a print processing based on the image signal for one horizontal line stored in the image line storing means.

According to the above-mentioned structure, since the printing means can directly execute the printing processing of the image signal without an interface for the video signal, the printing of a high quality image can be performed. Moreover, since the interface circuit is omitted, the scale of the hardware can be reduced, and the image controller with a printer can be realized at a low cost.

Particularly, since the image line storing means may store only the image signal for not one field but for one horizontal line, the scale of the hardware and cost can be further reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

One skilled in the art can easily understand the objects and the features of the present invention from preferred embodiments with reference to the following drawings.

FIG. 5 is an explanatory view of a hierarchical structure of a display screen;

FIG. 6 is a view of a screen assign;

FIG. 9 is a data structural view of an object attribute memory section;

FIG. 10 is a data structural view of a display control register;

FIG. 52 is a structural view of an RGB buffer section of a second embodiment;

DETAILED DESCRIPTION OF THE PREFERRED EMBODIMENTS

Embodiments of the present invention will be specifically explained with reference to the drawings.

Outline view of First Embodiment

Figure 1:
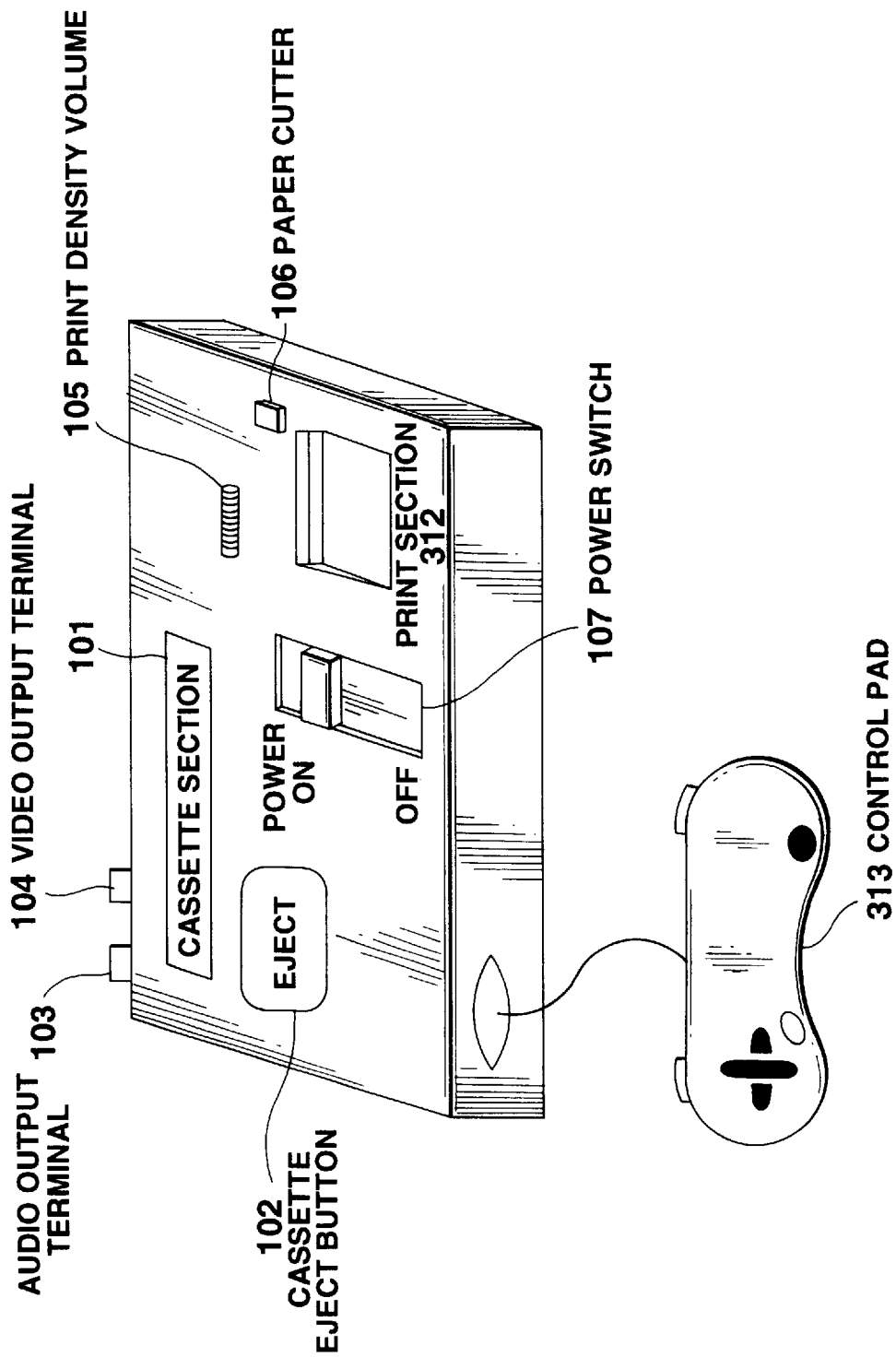
FIG. 1 is an outline view of an embodiment of the present invention.

FIG. 1 is an outline view of an embodiment of the present invention, which is used as a portrait generating apparatus having a printer.

Figure 2:
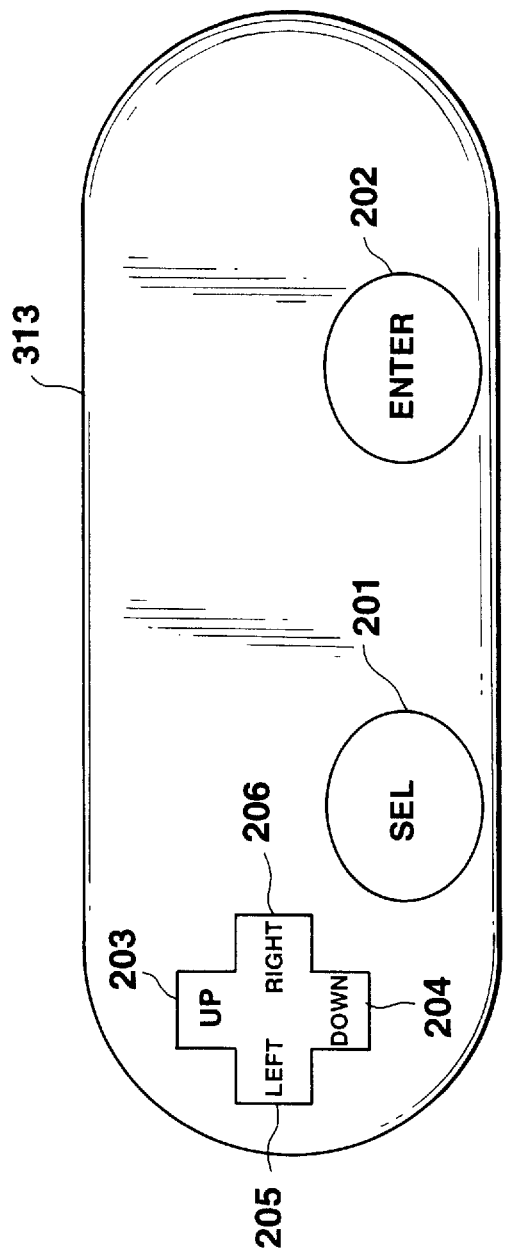
FIG. 2 is an outline view of a control pad of FIG. 1.
Figure 3:
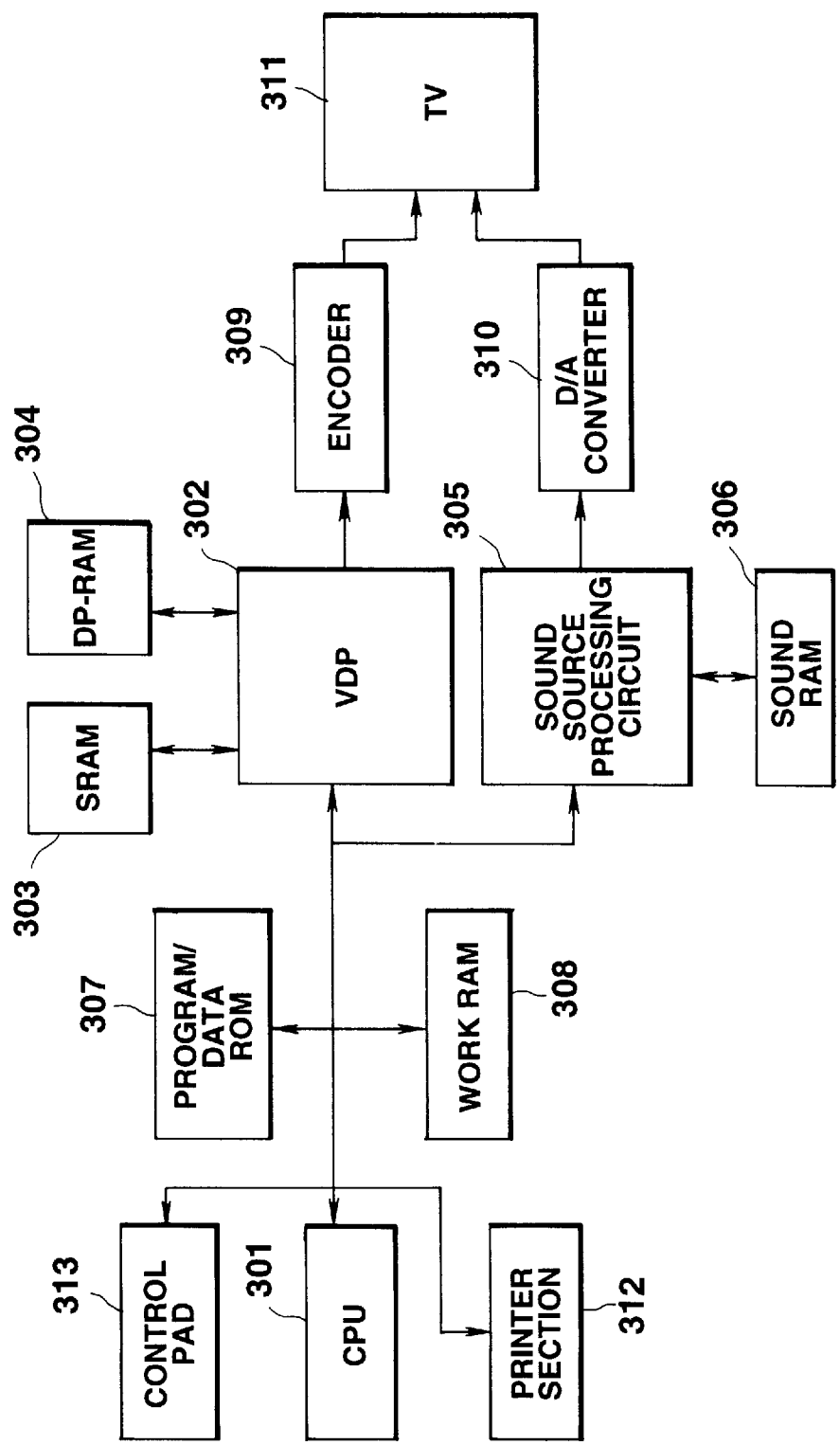
FIG. 3 is a general structural view of circuits of the embodiment of the present invention.

On a housing of the above apparatus, there are provided a cassette section 101 to which a paper cassette is inserted, a cassette eject button 102 for taking out the paper cassette, an audio output terminal 103, a video output terminal 104, a print density volume 105 for controlling print density, a paper cutter 106 for cutting printed paper, a power switch 107, and a control pad 313 and a printer section 312 (to be described referring to FIGS. 2 and 3).

Outline view of Control Pad

FIG. 2 is an outline view of the control pad 313 of FIG. 1. On the control pad 313, there are provided an SEL switch 201, an ENTER switch 202, and upper, lower, right and left switches 203 to 206.

General Structure of Circuit of Embodiment

FIG. 3 is a general structural view of circuits of the first embodiment of the present invention. The circuits excepting a TV 311 are provided in an interior of the housing of FIG. 1.

A VDP (video display processor) 302 controls an image processing of a sprite (object), a background, etc.

An SRAM (static RAM) 303 stores image data of the sprite (object), and background. A DP-RAM (dual port RAM) 304 stores image data of a bit map. The SRAM 303 and the DP-RAM 304 are accessed by the VDP 302.

A sound source processing circuit 305 generates sound data of a musical sound generated together with an image.

A sound RAM 306 stores musical sound wave data, which is processed by the sound source processing circuit 305, and the control data thereof.

A program/data ROM 307 stores a program, which a CPU 301 executes, and various kinds of data used in the program. The CPU 301 controls the VDP 302 and the sound processing circuit 305 as using a work RAM 308 in accordance with the program.

An encoder 309 converts an RGB analog image signal sent from the VDP 302 to an image signal (NTSC signal) of a TV standard.

A D/A converter 310 converts digital sound data sent from the sound source processing circuit 305 to an analog sound signal.

A TV 311 reproduces an image signal, which is output from the encoder 309 through a video output terminal 104 of FIG. 1, and a sound signal, which is output from a D/A converter 310 through the audio output terminal 103 of FIG. 1.

A printer section 312 prints an image displayed on the TV 311. The control pad 313 has an outline shown in FIG. 2, such that a user performs various kinds of operations.

Structure of VDP 302

Figure 4:
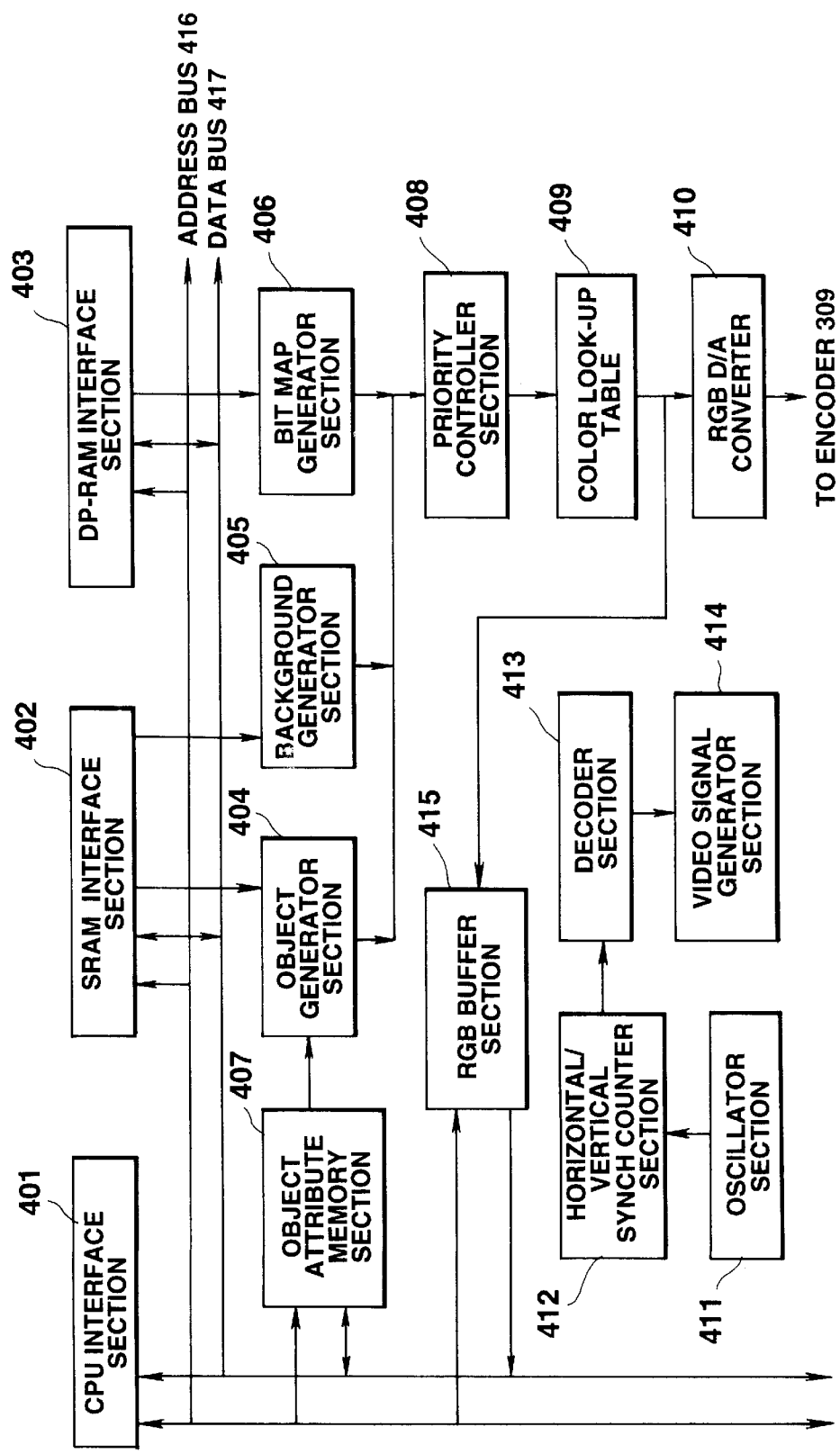
FIG. 4 is a structural view of a VDP of FIG. 3.

FIG. 4 is a structural view of the VDP 302 of FIG. 3.

The VDP 302 controls the screen display of the TV 311 the sprite (object), which expresses a character mainly moving at the time of playing a game, a background, which expresses the background, and the bit map (see FIG. 3).

A CPU interface section 401 controls an interface at a time of data transfer between the CPU 301 of FIG. 3 and the interface section.

An SRAM interface section 402 controls an interface when an object generator section 404 or a background generator section 405 accesses image data of the sprite (object) or that of the background.

A DP-RAM interface section 403 controls an interface when a video signal generator section 414 (to be described later) accesses image data of a bit map stored in the DP-RAM 304 of FIG. 3.

The object generator section 404, a background generator section 405 and the video signal generator section 414 fetch the color code of the sprite (object), the background, and the bit map, which are arranged on display coordinates corresponding to each dot display timing of a next horizontal display period, from the SRAM 303 of FIG. 3 or the DP-RAM 304, for each horizontal period (FIG. 10 to be described later). The fetched data is stored in an interior buffer thereof.

Also, an object attribute memory section 407 stores display coordinates corresponding to timing when the object generator section 404 reads the sprite (object) from the SRAM 303 through the SRAM interface section 402.

A priority controller section 408 selects and outputs one color code in accordance with a priority of the color codes fetched by the object generator section 404, the background generator section 405, or the video signal generator section 414, respectively, every dot for each horizontal display period.

A color look-up table section 409 converts the color code output from the priority controller section 408 to digital data of R (red), G (green), B (blue) to be output.

An RGB D/A converter section 410 converts RGB digital data output from the priority controller section 408 to an RGB analog image signal to be output.

An oscillator section 411 generates various kinds of clocks, which are necessary for the VDP 302.

A horizontal/vertical synch counter section 412 is a counter circuit for generating a horizontal synch counter value (horizontal synch signal), and a vertical synch counter value (vertical synch signal) which are necessary for the image display, in accordance with the clock output by the oscillator section 411.

A decoder 413 decodes the horizontal synch counter value and the vertical synch counter value from the counter value, which the horizontal/vertical synch counter section 412 outputs, so as to be supplied to each block of the VDP 302.

The video signal generator section 141 generates a video signal, which is necessary for the encoder 309 of FIG. 3, from the horizontal synch counter value and the vertical synch counter value, which the decoder section 413 outputs, so as to be supplied to the encoder 309.

An RGB buffer section 415 is particularly relevant to the present invention. The RGB buffer section 415 stores RGB digital data, which is output from the color look-up table section 409, by an amount corresponding to one line (256 dots) on the display screen of the TV 311 of FIG. 3.

Operation of VDP 302

The following will explain the schematic operation of the VDP 302 having the above-mentioned structure.

First, in this embodiment, the display screen is defined such that eight imaginary display screens are superimposed on each other as shown in FIG. 5. These display screens are arranged in order of a background A screen (BG-A screen), a bit map B2 screen (BM-B2 screen), a bit map B1 screen (BM-B1 screen), an object A screen (OBJ-A screen), a bit map A2 screen (BM-A2 screen), a bit map A1 screen (BM-A1 screen), an object B screen (OBJ-B screen), and a background B screen (BG-B screen) from a backward direction to a forward direction. Then, the forwarder the image is assigned, the higher the priority of display becomes, so that the image assigned to the imaginary backward display screen is displayed to be concealed by the imaginary forward display screen.

FIG. 6 shows kinds (parts) of image data to be assigned to the respective display screens, and the number of bits of color codes allocated to each dot, and each display size (number of dots in X and Y directions).

Figure 7:
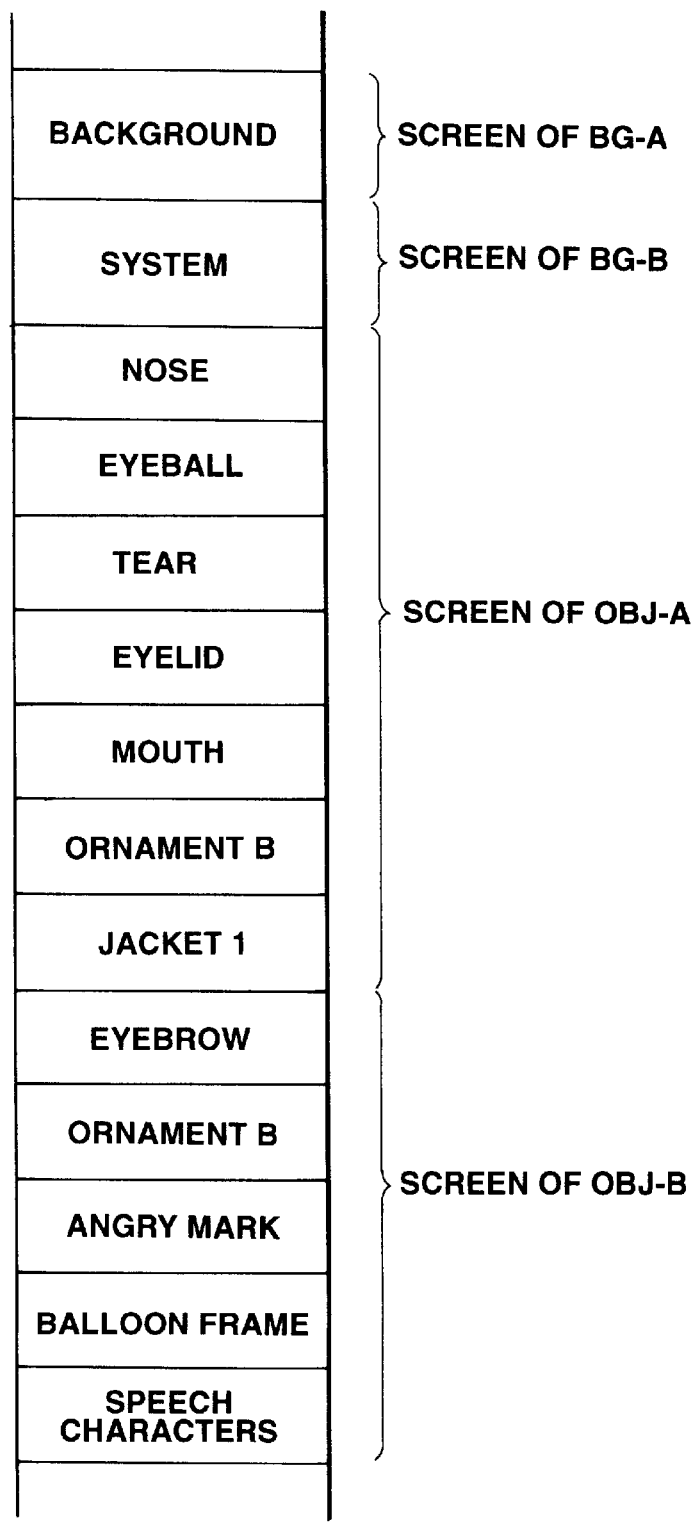
FIG. 7 is a data structural view of SRAM of FIG. 3.

Image data forming the present display screen of each of the BG-A screen, BG-B screen, OBJ-A screen, and OBJ-B screen is stored in the SRAM 303 of FIG. 3 based on a data format of FIG. 7. The image data is stored in the SRAM 303 from the program/data ROM 307 through the CPU interface section 401 of FIG. 4, an address bus 416, a data bus 417, and the SRAM interface section 402 under the control of the CPU 301.

Figure 8:
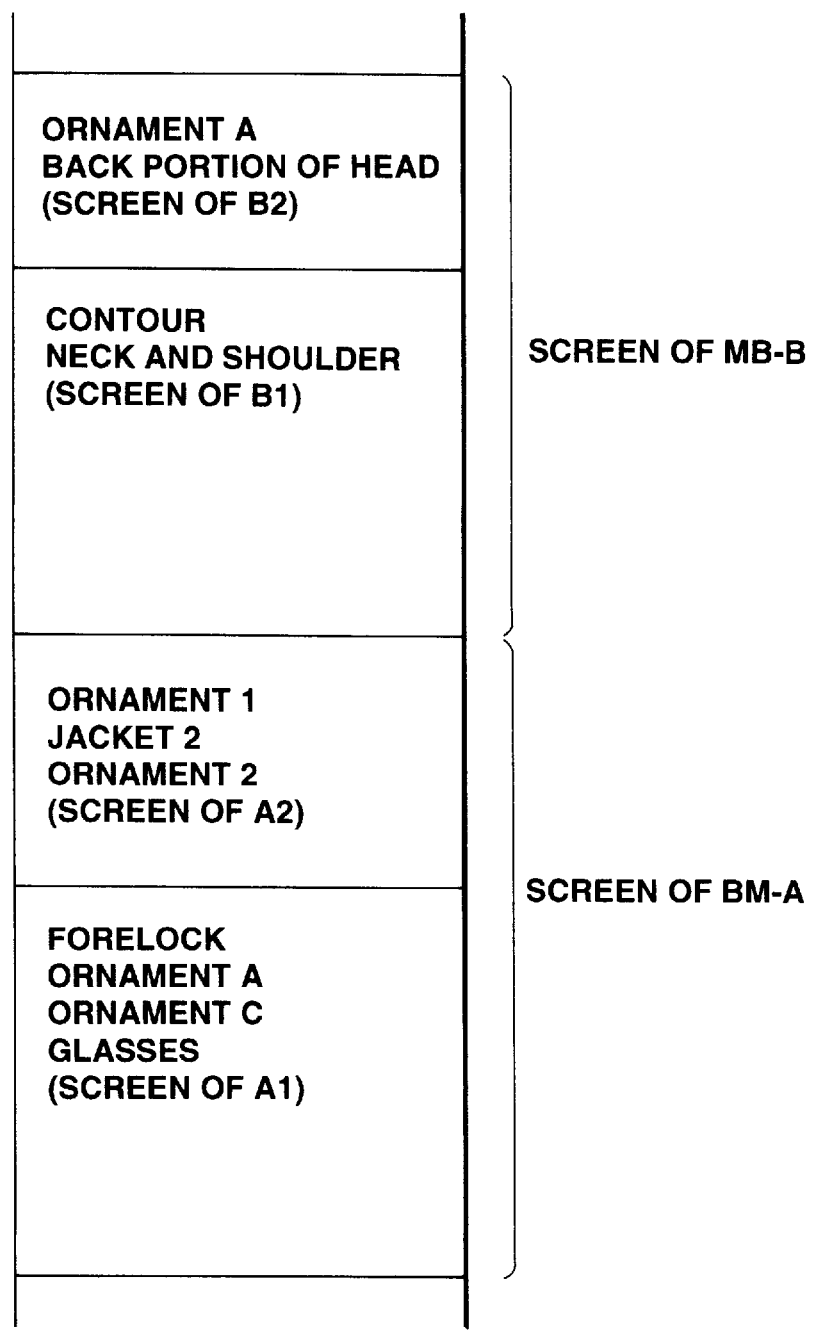
FIG. 8 is a data structural view of DP-RAM of FIG. 3.

Also, image data forming the present display screen of each of the BM-A1 screen, BM-A2 screen, BM-B1 screen, and BM-B2 screen is stored in the DP-RAM 304 of FIG. 3 based on a data format of FIG. 8. The image data is also stored in the SRAM 303 from the program/data ROM 307 through the CPU interface section 401 of FIG. 4, the address bus 416, the data bus 417, and the DP-RAM interface section 403 by means of the CPU 301.

The object generator section 404 and the background generator section 405 access the SRAM interface section 402 by each timing of each of time-divided horizontal periods. At the time of this access, the object generator section 404 reads the color code of each of the sprites (objects), which is placed at each of the display coordinates on the OBJ-A screen and the display coordinates on the OBJ-B screen corresponding to the display timing of each bit of the next horizontal display period. Then, each of the color codes is stored in the line buffer corresponding to each display screen of the object generator section 404. Similarly, the background generator section 405 reads the color code of the background, which is placed at each of the display coordinates on the BG-A screen and the display coordinates on the BG-B screen corresponding to the display timing of each bit of the next horizontal display period. Then, each of the color codes is stored in the line buffer corresponding to each display screen of the background generator section 405.

In the above-mentioned operation, in a case where the respective sprites (objects) whose maximum number is 128, which are stored in the SRAM 303 of FIG. 3 based on the data format of FIG. 7, are placed on the OBJ-A screen or the OBJ-B screen, their coordinates are stored in the object attribute memory section 407 by the CPU 301 of FIG. 3 through the CPU interface section 401, the address bus 416, and the data bus 417 based on the data format of FIG. 9. Then, the object generator section 404 calculates the reading timing corresponding to these coordinates in connection with the respective sprites (objects) stored in the object attribute memory section 407. Then, the respective sprites (objects) are read from the SRAM 303 by the calculated timing, and stored in the line buffer.

On the other hand, the video signal generator section 414 accesses the DP-RAM interface section 403 by each timing of each of time-divided horizontal periods independently of the accessing operation of the object generator section 404 and the background generator section 405. At the time of this access, the background generator section 405 reads the color code of each of the bit maps, which is placed at each of the display coordinates on the BM-A1 screen the BM-A2 screen, the BM-B1 screen, and the BM-B2 screen, corresponding to the display timing of each bit of the next horizontal display period. Then, each of the color codes is stored in the line buffer corresponding to each display screen of the video signal generator section 414.

As explained above, the color codes of the sprites (objects) corresponding to next one line to be placed on the OBJ-A screen and the OBJ-B screen can be obtained in two line buffers of the object generator section 404 every horizontal period. Also, the color codes of the background corresponding to next one line to be placed on the BG-A screen and the BG-B screen can be obtained in two line buffers of the background generator 405. Moreover, the color codes of the bit maps corresponding to a next one line to be placed on the BM-A1 screen, the BM-A2, the BM-B1 screen, and the BM-B2 screen can be obtained in four line buffers of the video signal generator section 414.

The CPU 301 of FIG. 3 sets a status, denoting whether or not the respective display screens of FIG. 5 are used, in a display control register (not shown) of the VDP 302 having the data format of FIG. 10. Each of the object generator section 404, the background generator section 405, and the video signal generator section 414 determines whether or not image data (color codes) corresponding to the respective display screens is read from the SRAM 303 or the DP-RAM 304 with reference to the contents of the display control register.

Figure 11:
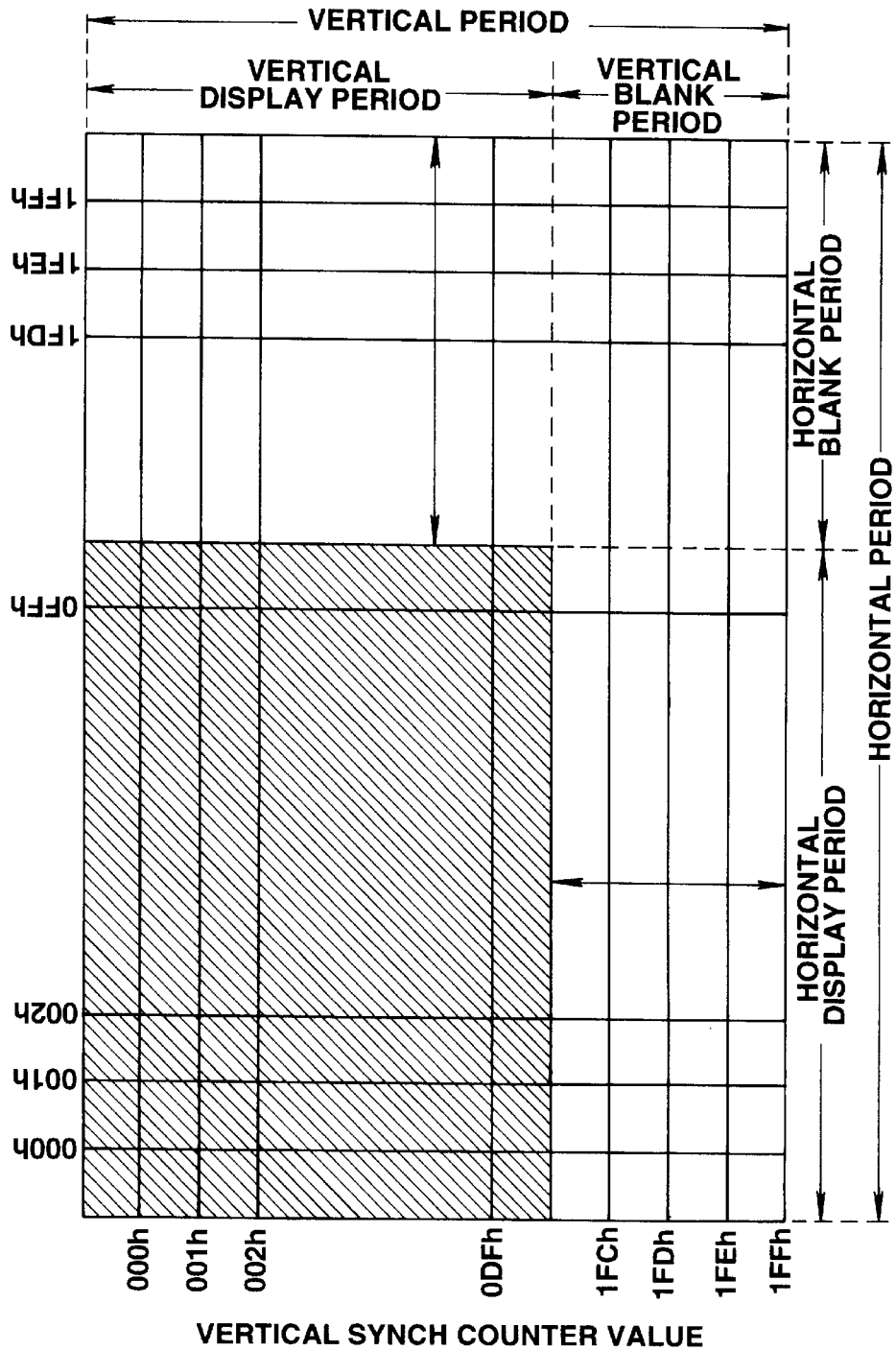
FIG. 11 is an explanatory view of a screen display timing.

FIG. 11 is an explanatory view of a screen display timing.

A period in which horizontal synch counter values output from the decoder section 413 of FIG. 4 change from 000h to 2FFh ("h" shows hexadecimal number) is one horizontal period. Among the above counter values, a period, which corresponds to the horizontal synch counter values having 256 counts of 000h to 0FFh is a horizontal display period corresponding to one line having 256 dots, and a period corresponding to the other horizontal synch counter values is a horizontal blank (or blanking) period. Moreover, a period in which vertical synch counter values output from the decoder section 413 change from 000h to 1FFh is one vertical period, which serves as a display period corresponding to one screen of the TV 311 of FIG. 3. Then, a period corresponding to the vertical synch counter values having 224 counts of 000h to 0DFh is a vertical display period corresponding to 224 lines in a vertical direction, and a period corresponding to the other vertical synch counter values is a vertical blank (or blanking) period.

A set of RGB data is output to the RGB D/A converter section 410 from the color look-up table section 409 every time when the horizontal synch counter value is counted up.

Also, setting of various kinds of data to the SRAM 303, the DP-RAM 304, or the object attribute memory section 407 (FIG. 4) from the CPU 301 of FIG. 3 is executed during each vertical blank period. Thereby, the display screen can be gradually changed.

Figure 12:
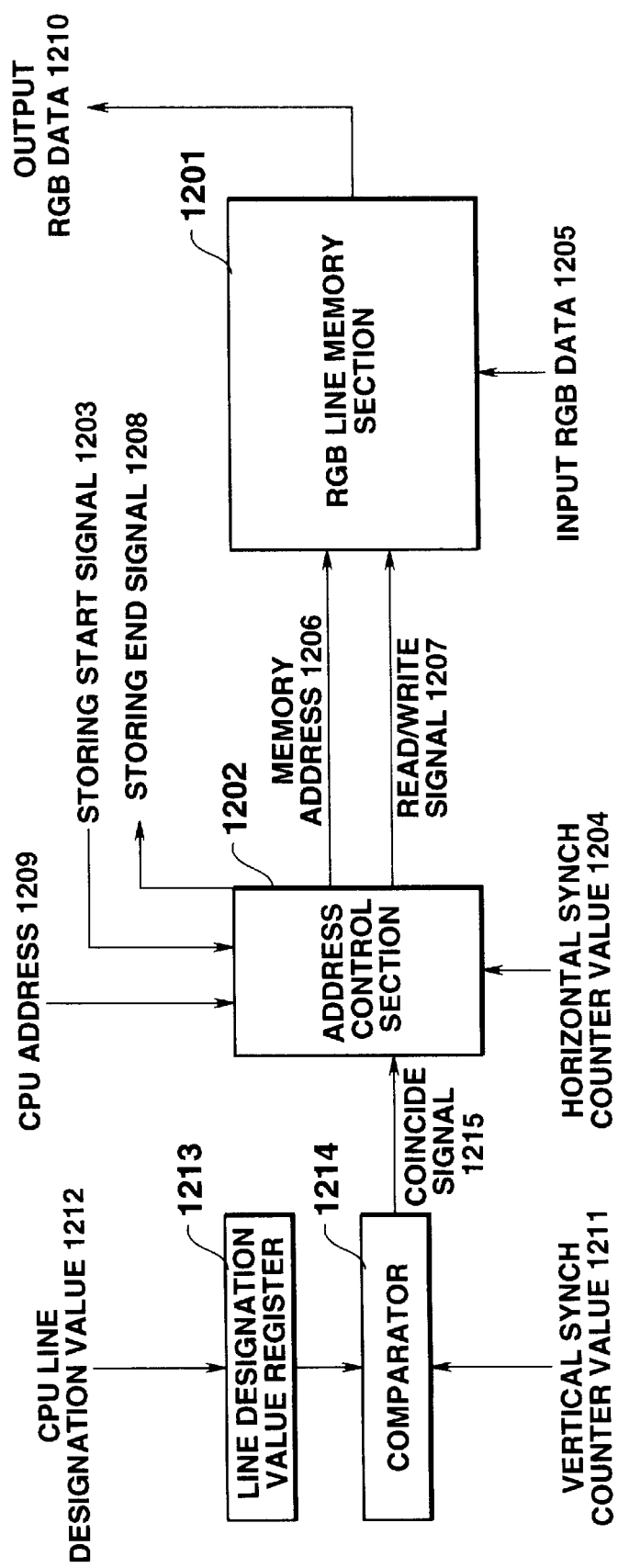
FIG. 12 is a structural view of an RGB buffer section.
Figure 13:
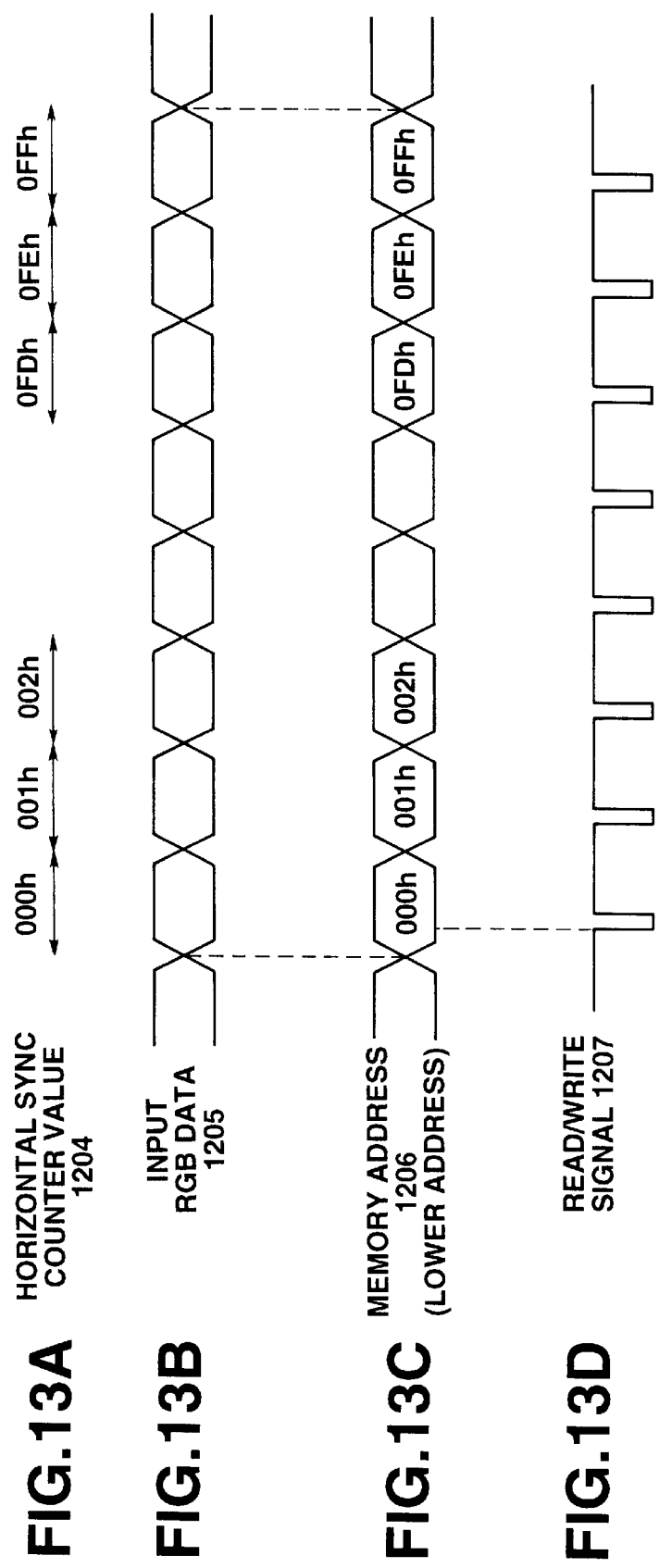
FIGS. 13A–13D are timing charts of a storing timing of RGB data for one horizontal display period.

FIG. 12 is a structural view of the RGB buffer section 415 of FIG. 4.

First of all, a CPU line designation value 1212, which designates a line position of the screen, which is being displayed presently on the TV 311, is set to a line designation register 1213 from the CPU 301 of FIG. 3 through the CPU interface section 401 of FIG. 4. Thereafter, a storing start signal 1203 is sent to an address control section 1202 from the CPU 301 of FIG. 3 through the CPU interface section 401 of FIG. 4.

The address control section 1202 receives the storing start signal 1203 from the CPU 301 through the CPU interface section 401 of FIG. 4. Thereafter, the address control section 1202 generates a memory address 1206, which corresponds to the horizontal synch counter value 1204 output from the decoder section 413 of FIG. 4, and a pulse of a read/write signal 1207, which designates writing, by timing when a coincide signal 1215 showing that the CPU line designation value 1212 set to the line designation value register 1213 coincides with the vertical synch counter value 1211 output from the decoder section 413, is output from a comparator 1214. Then, the memory address and the pulse are supplied to an RGB line memory section 1201. As a result, an input RGB data 1205 of one line (256 dots), which corresponds to the CPU line designation value 1212 input from the color look-up table section 409, is written to the RGB line memory section 1201.

FIGS. 13A to 13D show a timing of a horizontal synch counter value 1204 ((a)) corresponding to one line, that of input RGB data ((b)), a timing of a memory address 1206 ((c)), and that of a read/write signal 1207 ((d)).

When the CPU 301 of FIG. 3 receives a storing end signal 1208 from the address control section 1202 through the CPU interface section 401 of FIG. 4, a CPU address 1209 is supplied to the address control section 1202 from the CPU interface section 401 of FIG. 4 through the address bus 416. The address control section 1202 supplies the CPU address 1209 serving memory address 1206, to the RGB line memory section 1201 directly. Also, the address control section 1202 supplies the pulse of the read/write signal 1207 designating reading to the RGB line memory section 1201. As a result, an output RGB data 1210 of one line corresponding to the CPU line designation value 1212 is output to the work RAM 308 of FIG. 3 from the RGB line memory section 1201 through the data bus 417 of FIG. 4. The output RGB data 1210 is stored in a memory area of the original image area of the work RAM 308 of FIG. 3 corresponding to a CPU line designation value 1212.

The CPU 301 repeats the series of the operations as the CPU line designation value 1212 is sequentially designated. Thereby, the output RGB data 1210 corresponding to one screen displayed on the TV 311 is transferred to the original image area of the work RAM 308 from the VDP 302.

Thereafter, print processing is provided to the output RGB data 1210 corresponding to one field, which is transferred to the work RAM 308, by the CPU 301. Thereby, the same image as the image displayed on the TV 311 with the same quality is printed by the printer 312. In this case, a predetermined scaling factor for enlargement to be described later can be designated.

Specific Operation of CPU 301

An operation of the CPU 301 of FIG. 3 will be specifically explained along the operation flow charts of FIGS. 14 to 35 and the explanatory views of FIGS. 36 to 51. Each operation chart is realized as an operation which the CPU 301 executes the control program stored in the program/data ROM 307.

Transition Relationship between Display Screens

Figure 14:
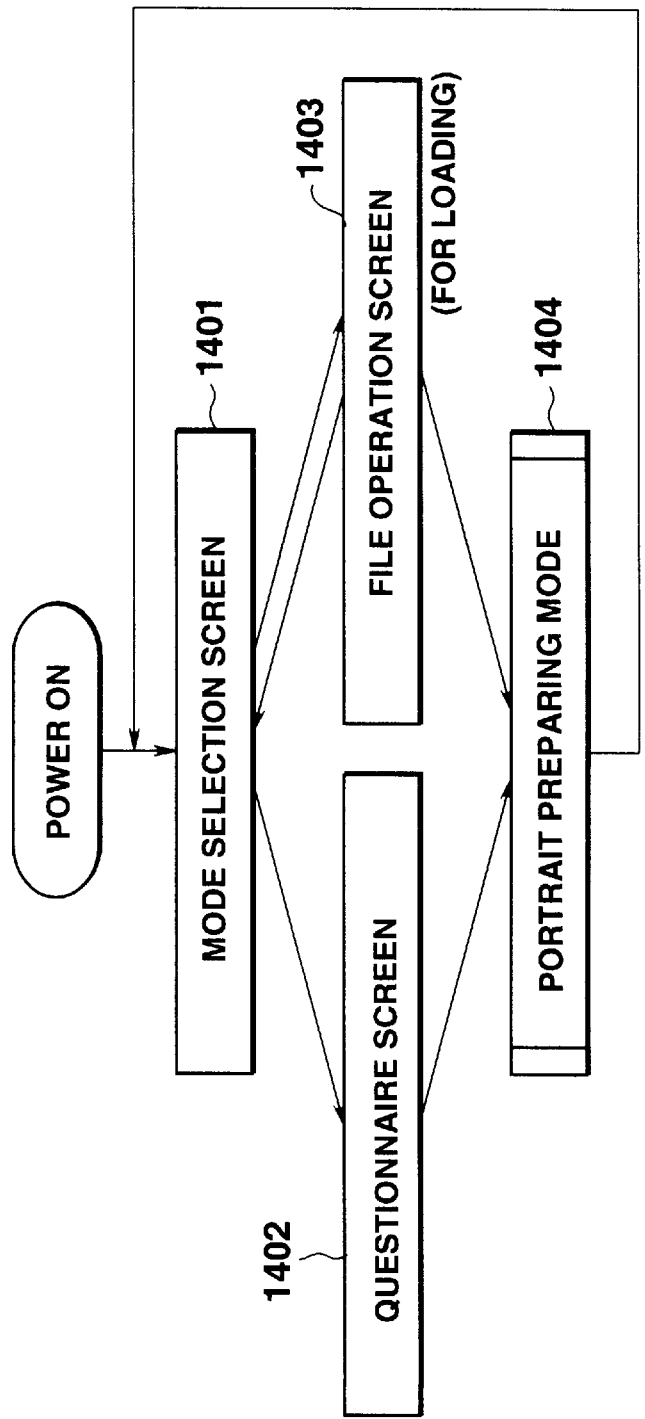
FIG. 14 is a transition view of a display screen.

FIG. 14 is a view showing the transition relationship between the display screens on TV 311 of FIG. 3.

When power of system is turned on, a mode selection screen is displayed (step 1401). In the mode screen, a mode 1 and a mode 2 can be selected.

In the mode selection screen, if the mode 1 is selected, a questionnaire screen is displayed (step 1402). In a case where a portrait is newly prepared, the questionnaire screen is used when a user determines the contour of the portrait to be prepared. In the mode selection screen, if the mode 2 is selected, a file operation screen is displayed (step 1403). The file operation screen is used to load portrait data from the battery-backup work RAM 308 of FIG. 3.

If the user ends the operation of the questionnaire screen or the file operation screen, the display is changed to the screen of a portrait preparation mode (step 1404). The portrait preparation mode is used to perform the operation which is needed when the user prepares the portrait. In a case where the operation is canceled on the file operation mode, the display is returned to the mode selection screen (step 1403 to 1401).

When the user ends the operation of the basic system screen of the portrait preparation mode, the display is returned to the mode selection screen (step 1404→1401).

Figure 15:
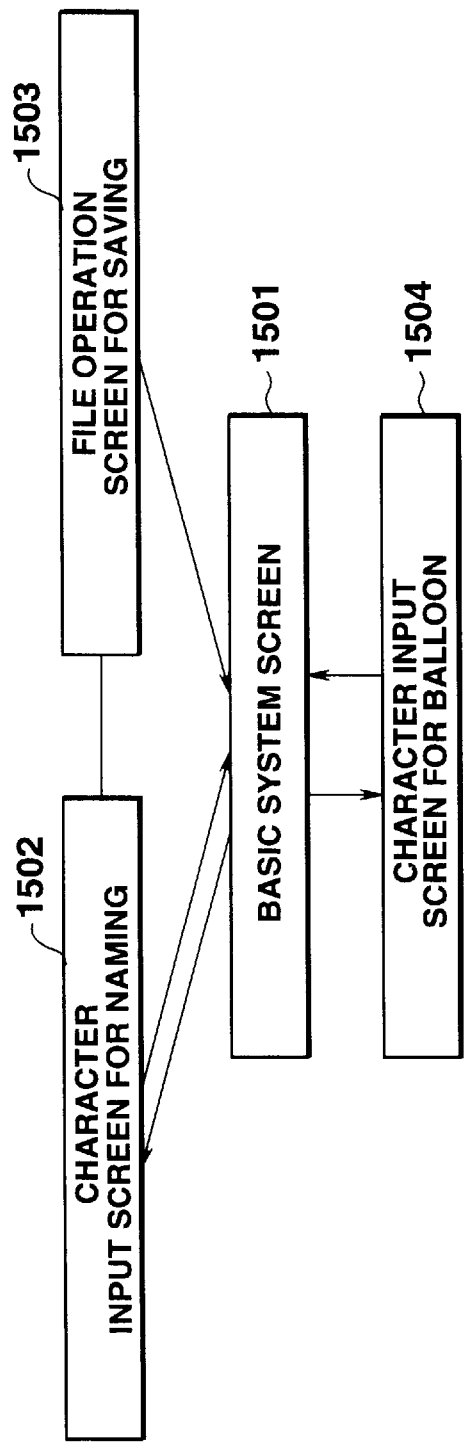
FIG. 15 is a transition view of a display screen in a portrait preparing mode.

FIG. 15 is a view showing the transition relationship between the display screens on the portrait preparation mode.

The basic screen on the portrait preparation mode is a basic system screen (step 1501).

In the basic system screen, if the user selects a save operation of the file, the display is changed to a character input screen, which is needed when the user inputs a file name (step 1502). If the user ends the input operation of the file name, the display is changed to a file operation screen which is needed when the user selects a file storing position on the work RAM 308 (step 1503). If the user ends the selection operation of the file storing position and the save of the file is ended, the display is returned to the basic system screen (step 1502 to step 1501).

Moreover, in the basic system screen, if the user selects a balloon operation, the display is changed to a character input screen, which is needed when the user inputs a speech to the balloon (step 1504).

If the user ends the operation of inputting the speech to the balloon, the display is returned to the basic system screen (step 1504 to step 1501).

General Operation Flow

Figure 16:
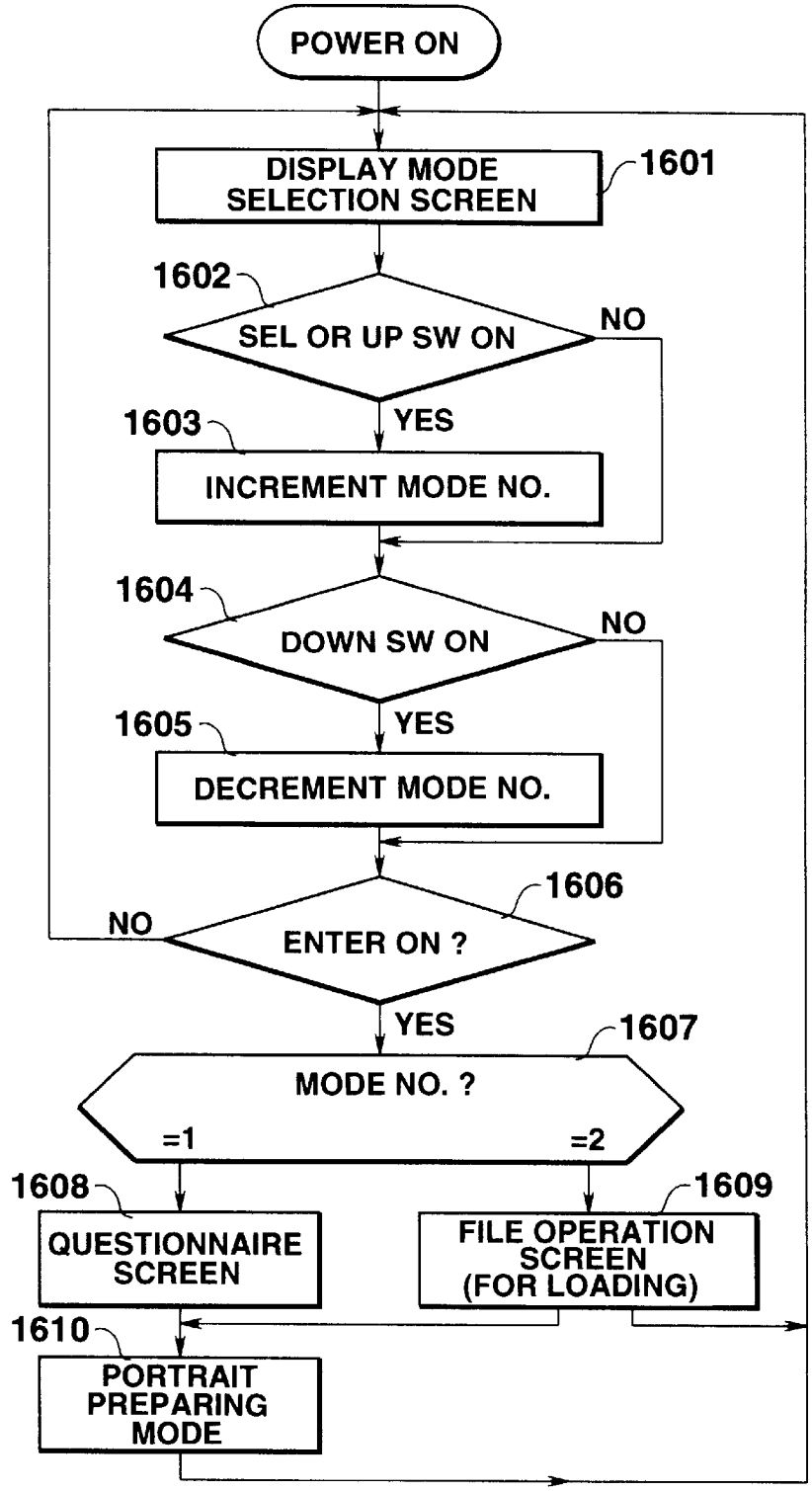
FIG. 16 is a flow chart of a general operation.

FIG. 16 shows a flow chart of a general operation which the CPU 301 executes.

Figure 44:
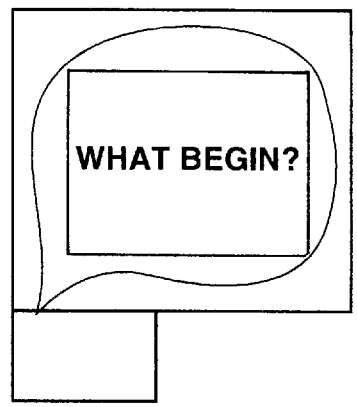
FIG. 44 is a view showing the content of a balloon in a mode selection screen.
Figure 45A:
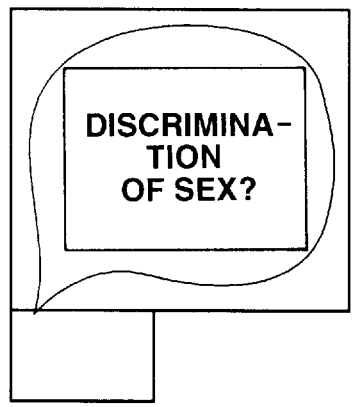
FIGS. 45A–45D are views showing the content of a balloon in a questionnaire screen.
Figure 45B:
Figure 45C:
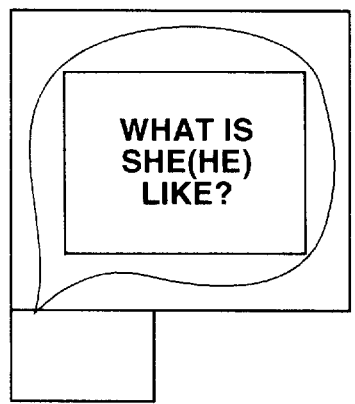
Figure 45D:

When power of the system is turned on, the mode selection screen is displayed (step 1601). More specifically, for example, during the vertical blank period, the CPU 301 of FIG. 3 transfers background image data for mode selection screen to the respective storage areas of the BG-A screen and the BG-B screen of SRAM 303 (FIG. 7) from the program/data ROM 307 through the CPU interface section 401 of FIG. 4, the address bus 416, the data bus 417, and the SRAM interface section 402. As a result, the VDP 302 having the structure shown in FIG. 4 displays image data for mode selection screen transferred to the respective storage areas of the BG-A screen and the BG-B screen of SRAM 303 on the TV 311 of FIG. 3. On the mode selection screen, a selection area (not shown) for selecting modes 1 and 2 is displayed. When the mode selection screen is first displayed, for example, the selection area of mode 1 is emphatically displayed. On the mode selection screen, a balloon as shown in FIG. 44 is also displayed.

At the repetition of steps 1601 to 1606 of FIG. 16, the type of the switch, which the user turned on in the control pad 313 of FIG. 2 or FIG. 3, is discriminated. Also, the display of the mode selection screen is changed in accordance with the turned-on switch.

If the user turns on a SEL switch 201 of FIG. 2 or an up switch SW 203, the result of the discrimination in step 1602 is YES, and a mode number (#), which is set to a register (not shown) is incremented from 1 to 2 in step 1603. In a case where the mode number is already 2, the number is unchanged. As a result, when the step 1601 is executed next, there is displayed the mode selection screen in which the selection area of mode 2 is emphatically displayed.

If the user turns on a down switch 204 of FIG. 2, the result of the discrimination in step 1604 is YES, and the mode number (#), which is set to the register (not shown) is decremented from 2 to 1 in step 1605. In a case where the mode number is already 1, the number is unchanged. As a result, when the step 1601 is executed next, there is displayed the mode selection screen in which the selection area of mode 1 is emphatically displayed.

If the user turns on an ENTER switch 202 of FIG. 2, the result of the discrimination in step 1606 is YES. As a result, in step 1607, the present mode number, which is set in the register (not shown) is discriminated.

If it is discriminated that the present mode number is 1, the processing of the questionnaire screen is executed in step 1608.

On the other hand, if it is discriminated that the present mode number is 2, the processing of the file operation screen for loading the file is executed in step 1609.

If the user ends the questionnaire screen displayed on the TV 311 in step 1608 or the file operation screen displayed on the TV 311 in step 1609, the processing of the portrait preparation mode is executed in step 1610. If the user cancels the operation of the file operation screen, the display is returned to the mode selection screen (step 1609 to 1601). If the user ends the basic system screen, which is the basic display screen of the portrait preparation mode displayed on TV 311, in step 1610, the operation goes back to step 1601.

Processing Flow of Questionnaire Screen

Figure 17:
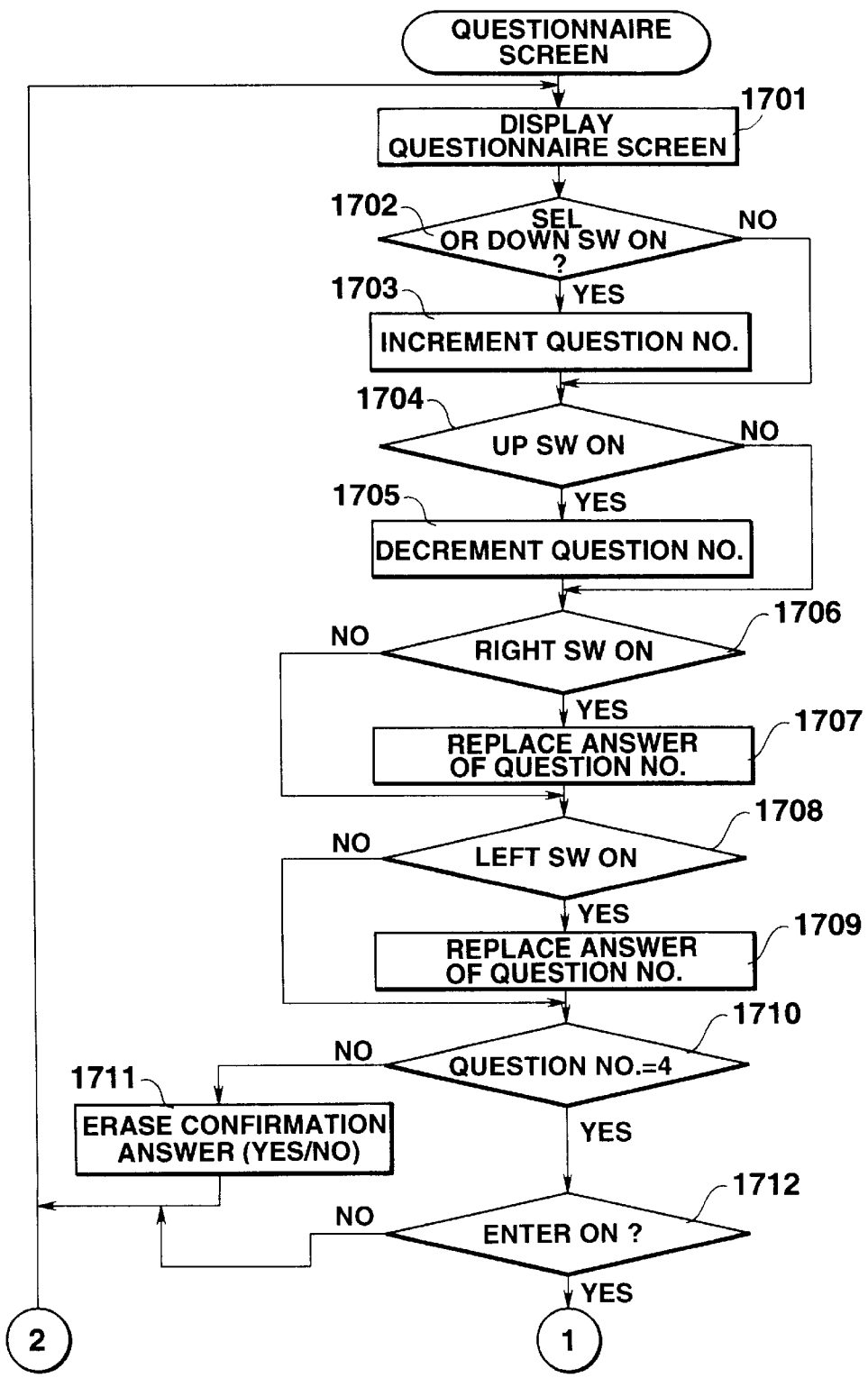
FIG. 17 is a flow chart of an operation of processing of a questionnaire screen (No. 1)
Figure 18:
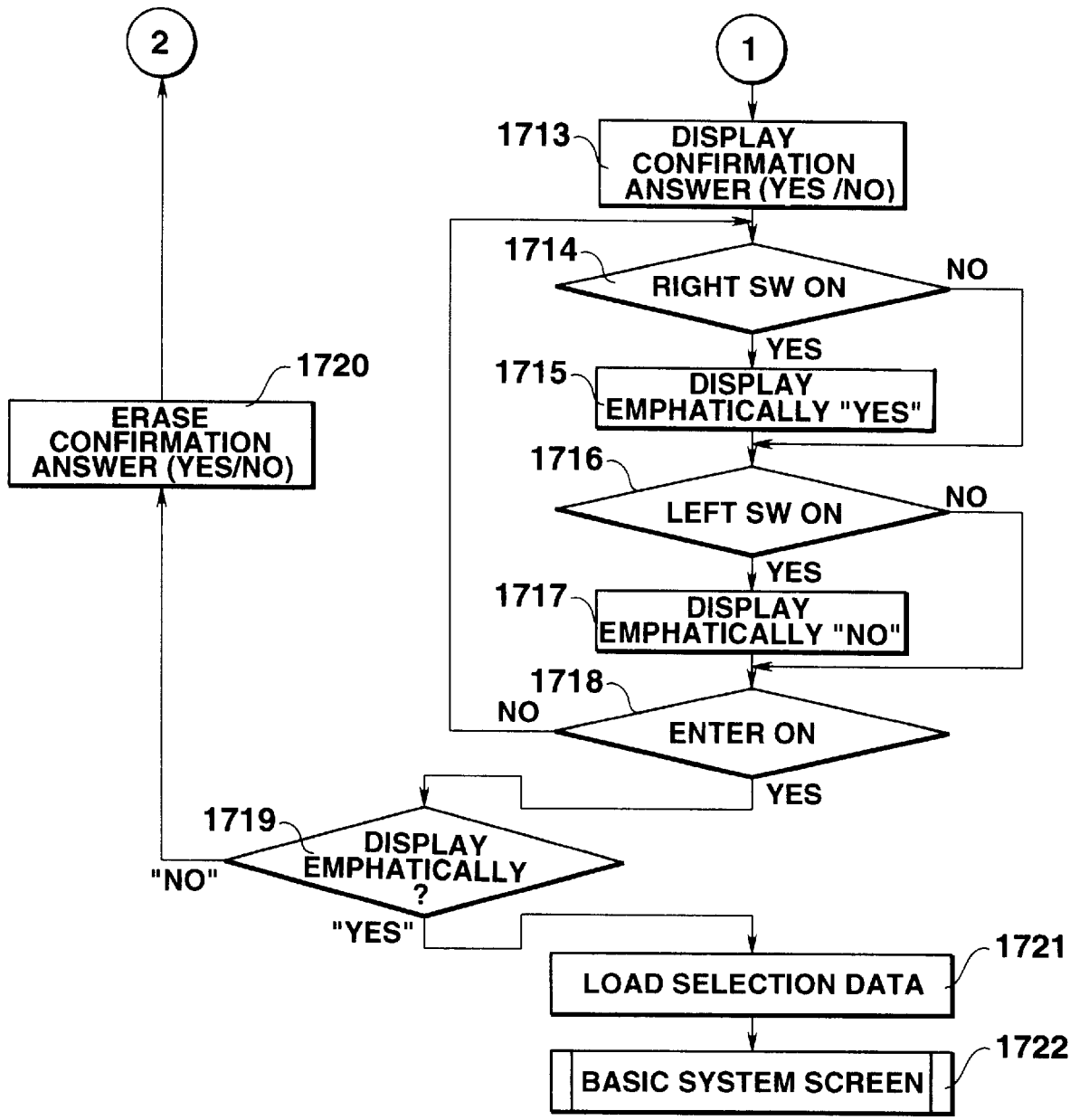
FIG. 18 is a flow chart of an operation of processing of a questionnaire screen (No. 2)

FIGS. 17 and 18 are operation flow charts showing the processing of the questionnaire screen executed in step 1608 of FIG. 16. The user can determine the contour of the portrait, which is newly prepared, on the questionnaire screen.

At the repetition of steps 1701 to 1712 of FIG. 17, the type of the switch, which the user turned on in the control pad 313 of FIG. 2 or FIG. 3, is discriminated. Also, the display of the questionnaire screen is changed in accordance with the turned-on switch.

First of all, in step 1701, the questionnaire screen is displayed. More specifically, for example, during the vertical blank period (FIG. 11), the CPU 301 of FIG. 3 transfers background image data for the questionnaire screen and object image data to the respective storage areas of the BG-A screen, the BG-B screen, and the OBJ-B screen of SRAM 303 (FIG. 7) from the program/data ROM 307 through the CPU interface section 401 of FIG. 4, the address bus 416, the data bus 417, and the SRAM interface section 402. As a result, the VDP 302 having the structure shown in FIG. 4 displays image data for the questionnaire screen transferred to the respective storage areas of SRAM 303 on the TV 311 of FIG. 3.

Figure 36:
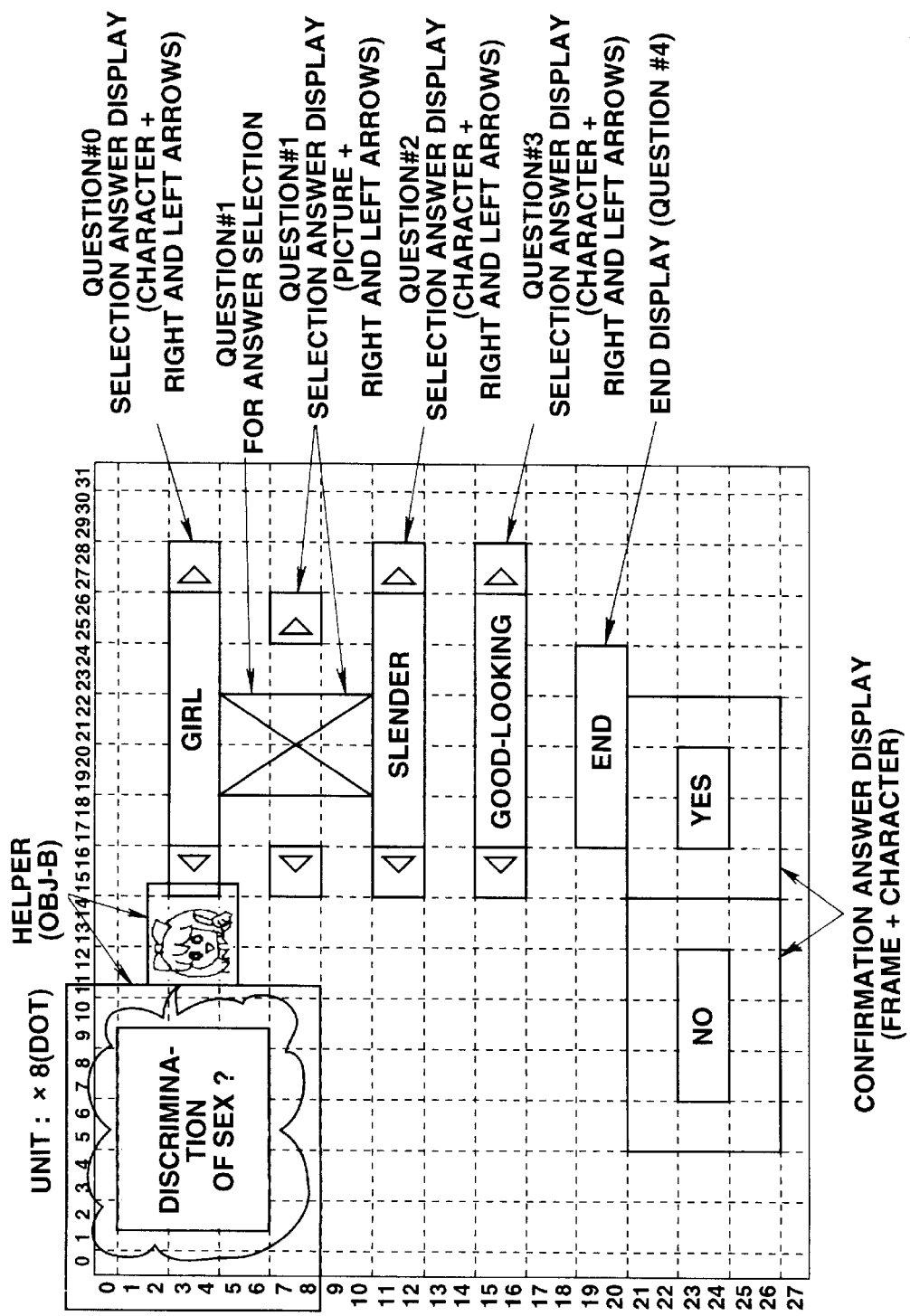
FIG. 36 is a layout view of a questionnaire screen (No. 1)
Figure 37:
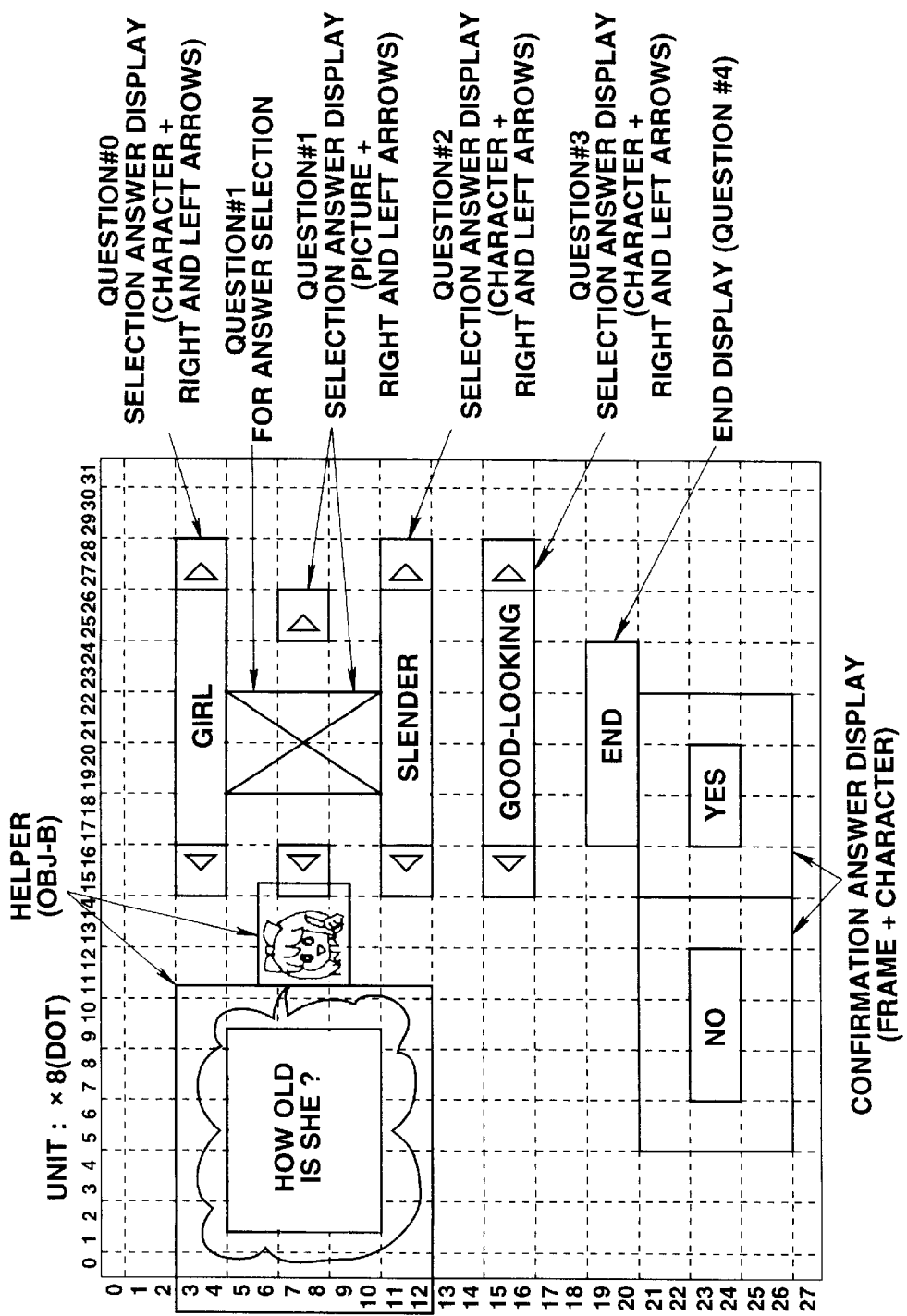
FIG. 37 is a layout view of a questionnaire screen (No. 2)
Figure 38:
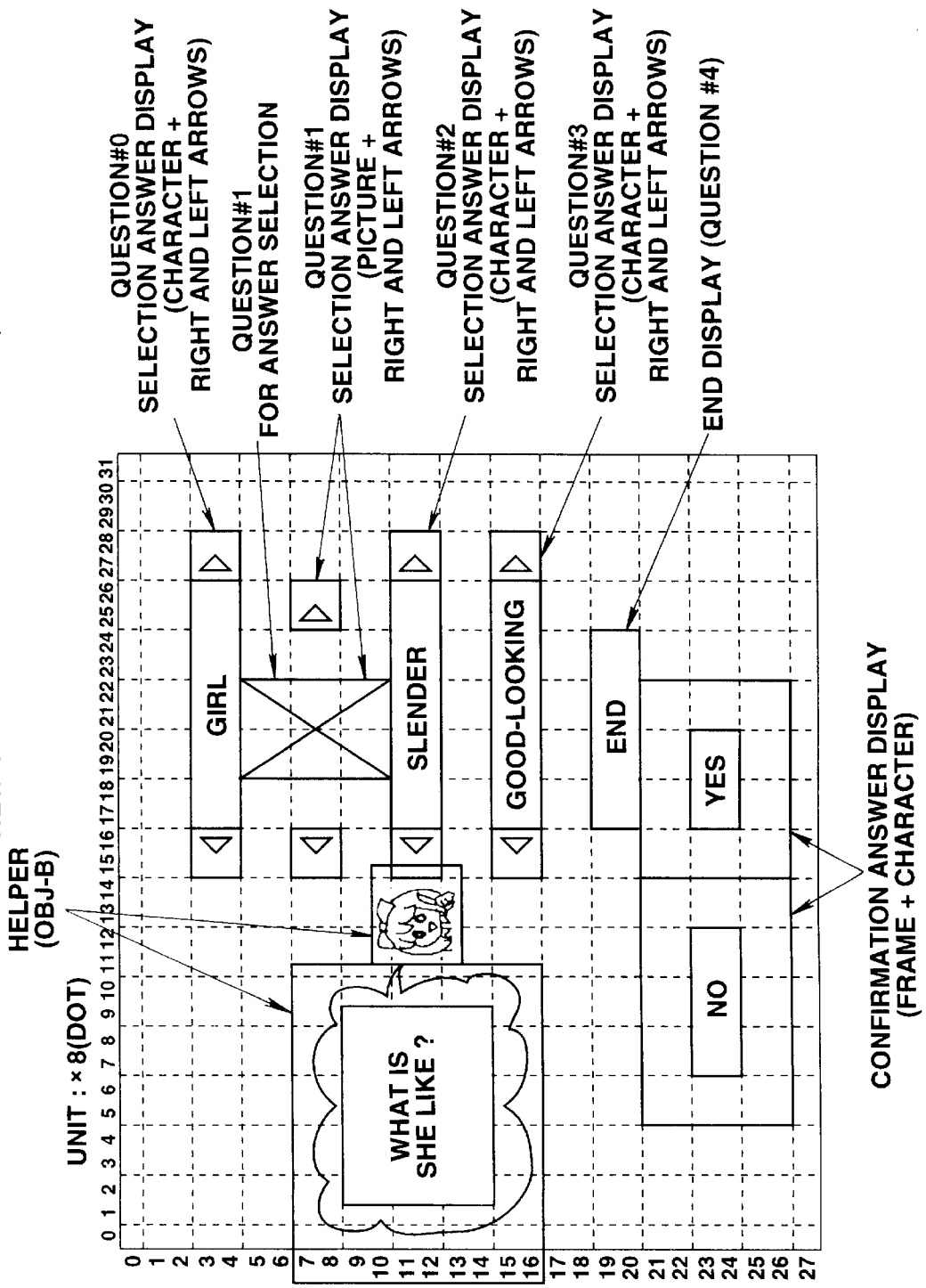
FIG. 38 is a layout view of a questionnaire screen (No. 3)

As the questionnaire screen, as shown in FIG. 36, there are displayed a selective answer display of each question number of #1 to #3 (in question number 1, a picture for answer selection), an end display "END", a confirmation answer display including display of "YES" and "NO", and a helper, which is formed of a balloon indicating the display presently selected and a picture of a doll. In an initial state, the helper indicates the selective answer display of question number 0. The helper is displayed by object image data transferred to the storage area of the OBJ-B screen of SRAM 303 by the CPU 301. The CPU 301 transfers suitable coordination data to the object attribute memory section 407 from the program/data ROM 307 through the CPU interface section 401, the address bus 416, and the data bus 417. Then, the object generator section 404 refers to transferred data, thereby the indication position of the helper is controlled. The confirmation answer display of FIG. 36 is not displayed in the initial state.

If the user turns on the SEL switch 201 of FIG. 2 or the down switch (SW) 204, the result of the discrimination in step 1702 is YES, and the question number (#), which is set in the register (not shown), is incremented by 1 in step 1703. As a result, when step 1701 is executed next, the indication position of the helper is moved to the position of the selective answer display of question number 1 from the position of the selective answer display of the question number 0. This operation is realized as an operation in which the CPU 301 transfers coordinate data corresponding to each indication position to the object attribute memory 407 of FIG. 4. Every time when the user turns on the SEL switch 201 or the down switch 204 and the question number is incremented, the indication position of the helper is changed in the order as shown in FIGS. 36→37→38→39. At the same time, the content of the balloon is changed as shown in the above figures, or FIGS. 45B to 45D. This operation is realized as an operation in which the CPU 301 transfers object image data corresponding to the respective displays to the storage area of the OBJ-B screen of the SRAM 303 through the VDP 302.

Figure 39:
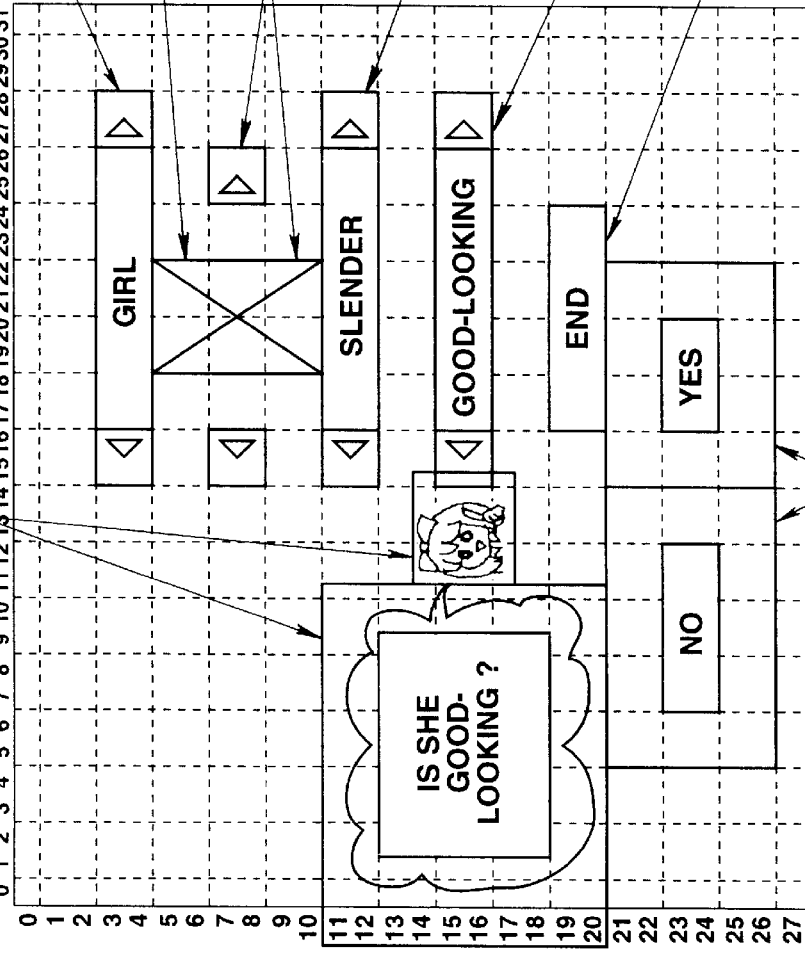
FIG. 39 is a layout view of a questionnaire screen (No. 4)

Conversely, every time when the user turns on the up switch 203 of FIG. 2, the result of the discrimination in step 1704 is YES. In step 1705, the question number (#), which is set in the register (not shown), is decremented by 1. As a result, when step 1701 is executed, the indication position of the helper is changed in the order as shown in FIGS. 39→38→37→36.

If the user turns on a right switch 206 or a left switch 205, the result of the discrimination in step 1706 or 1708 is YES. In step 1707 or 1709, the selective answer display is replaced with the other answer to be displayed as moving in the selective answer display group, which is prepared in advance to correspond to the question answer set in the register (not shown), in a forward direction or a backward direction. This operation is realized as an operation in which the CPU 301 transfers background image data corresponding to the selective answer display to the storage area of the BG-A screen or the BG-B screen of the SRAM 303 through the VDP 302.

In a case where the value of the question number is not 4, the result of the discrimination in step 1710 is No, and the confirmation answer display (FIG. 36) is erased.

If the user turns on the SEL switch 201 or the down switch 204, the question number, which is set in the register (not shown), is incremented in step 1703. As a result, if the value of the question number becomes 4, the result of the discrimination in step 1710 is YES. If the ENTER switch 202 of FIG. 2 is not turned on, the result of the discrimination in step 1712 is NO, and the end display "END" is emphatically displayed. This operation is realized as an operation in which the CPU 301 transfers background image data corresponding to the emphatic end display to the storage area of the BG-A screen or the BG-B screen of the SRAM 303 through the VDP 302. If the user turns on the ENTER switch 202 of FIG. 2 when the value of the question number, which is set in the register (not shown), is 4 and the end display is emphatically displayed, the result of discrimination in step 1712 is YES. As a result, in step 1713 of FIG. 18, the confirmation answer display including "YES" and "NO" is displayed. In the initial state, "YES" is emphatically displayed. This operation is realized as an operation in which the CPU 301 transfers background image data corresponding to the confirmation answer display to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 1714 to 1718 after step 1713.

In other words, if the user turns on the right switch 206 or the left switch 205 of FIG. 2 after the confirmation answer is displayed, the result of the discrimination in step 1714 or 1716 is YES, either "YES" or "NO" is emphatically displayed in step 1715 or 1716. These operations are realized as an operation in which the CPU 301 transfers background image data corresponding to each of the above displays to the storage area of the BG-A screen or the BG-B screen of the SRAM 303 through the VDP 302. Data, showing which display of "YES" and "NO" is being emphatically displayed presently, is set in the register (not shown).

If the user turns on the ENTER switch 202 of FIG. 2 in the state that the confirmation answer is displayed and the result of the discrimination in step 1718 is YES, step 1719 is realized.

In step 1719, by referring to the register, it is discriminated which of "YES" and "NO" is being emphatically displayed presently.

If it is discriminated that "NO" is emphatically displayed in step 1719, the confirmation answer display is erased in step 1720. Thereafter, the operation goes back to the processing of step 1701 of FIG. 17. In other words, the display is returned to the initial display of the questionnaire screen in which the helper indicates the selective answer display of question number 0. The content of the register in which the question number is stored is also reset to 0.

If it is discriminated that "YES" is emphatically displayed in step 1719, the CPU 301 loads image data of the portrait, which corresponds to the selective answer displayed on the present questionnaire screen corresponding to the respective question numbers 0 to #3, to the respective storage areas of the SRAM 303 or the DP-RAM 304 shown in FIG. 7 or 8 from the program/data ROM 307 through the CPU interface section 401 of FIG. 4, the address bus 416, and the SRAM interface section 402, or the DP-RAM interface section 403. Also, the CPU 301 transfers coordinate data of each of the objects to be transferred to the SRAM 303 to the object attribute memory section 407 from the program/data ROM 307 through the CPU interface section 401, the address bus 416, and the data bus 417 (FIG. 9).

Thereafter, the operation goes to the processing of the basic system screen (step 1722). The movement from step 1721 to step 1722 corresponds to the movement from step 1402 of FIG. 14 to 1404 (step 1501 of FIG. 15), or the movement from step 1608 of FIG. 16 to step 1610.

Processing Flow (Load) of File Operation Screen

Figure 19:
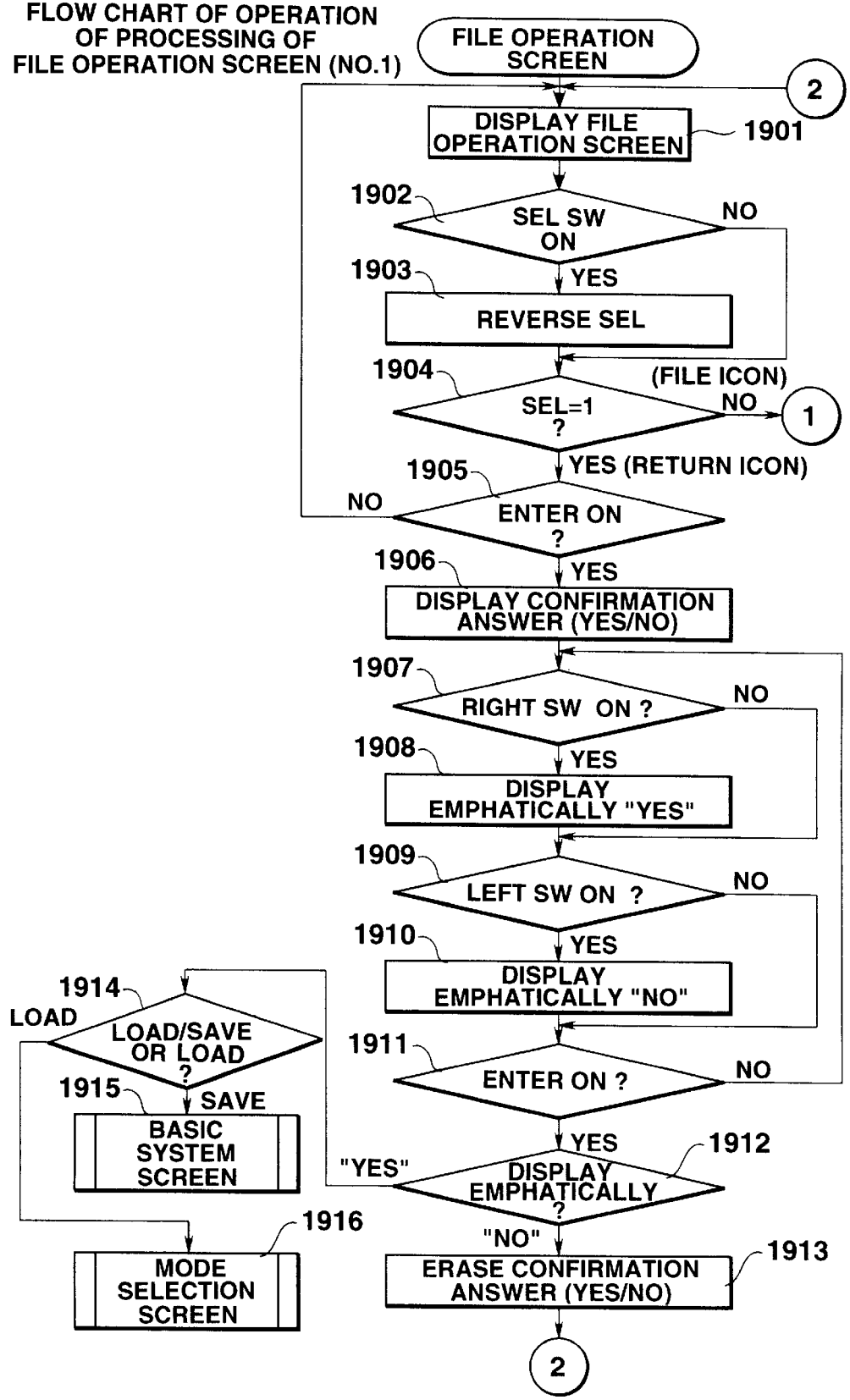
FIG. 19 is a flow chart of an operation of processing of a file operation screen (No. 1)
Figure 20:
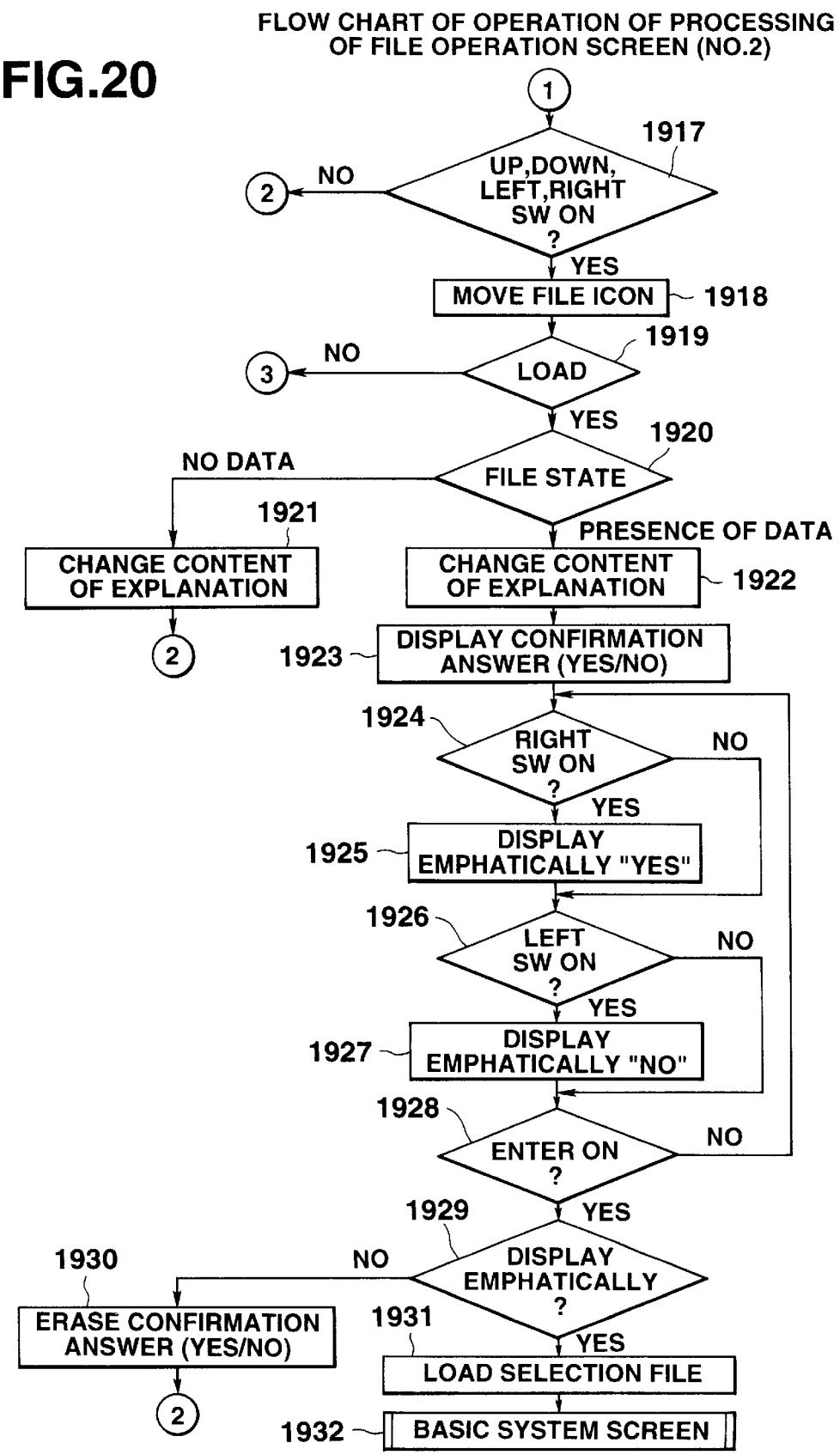
FIG. 20 is a flow chart of an operation of processing of a file operation screen (No. 2)
Figure 21:
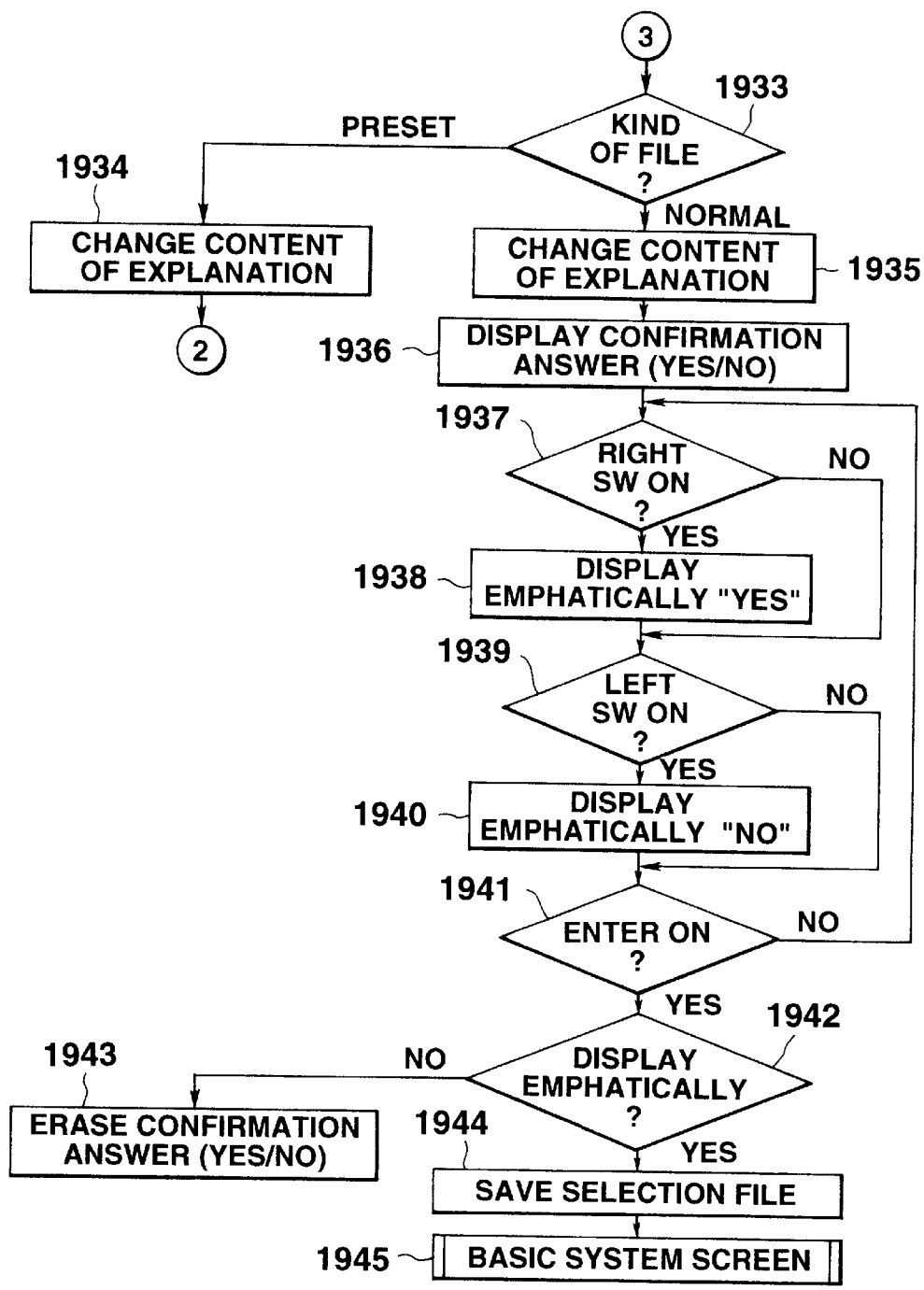
FIG. 21 is a flow chart of an operation of processing of a file operation screen (No. 3)

FIGS. 19 to 21 are operation flow charts showing the processing of the file operation screen, which is executed as step 1609 of FIG. 16 or a part of processing of step 1610. The user can load the image data file of the saved portrait or save image data of the prepared portrait as a file on the file operation screen. The following will explain the load processing.

As mentioned above, mode 2 is selected on the mode selection screen, the operation flow charts of the file operation screen of FIGS. 19 to 21 are executed as step 1403 of FIG. 14 or step 1609 of FIG. 16. On this file operation screen, there can be performed the operation for loading portrait data from the work RAM 308 of FIG. 3 to which battery backup is provided.

In the repetition of steps 1901 (FIG. 19) to 1904→1905 or 1917 (FIG. 20), there is executed the processing, which corresponds to the SEL switch 201, the ENTER switch 202, or up, down, left, right switches 203 to 206, which are turned on by the user in the control pad 313 of FIG. 2 or 3.

First, in step 1901, the file operation screen is displayed. More specifically, for example, for the vertical blank period (FIG. 11), the CPU 301 of FIG. 3 transfers background image data for file operation screen to the respective storage areas of the BG-A screen and the BG-B screen of SRAM 303 (FIG. 7) from the program/data ROM 307 through the CPU interface section 401 of FIG. 4, the address bus 416, the data bus 417, and the SRAM interface section 402. As a result, the VDP 302 having the structure shown in FIG. 4 displays image data for the file operation screen transferred to the respective storage areas of SRAM 303 on the TV 311 of FIG. 3.

Figure 40:
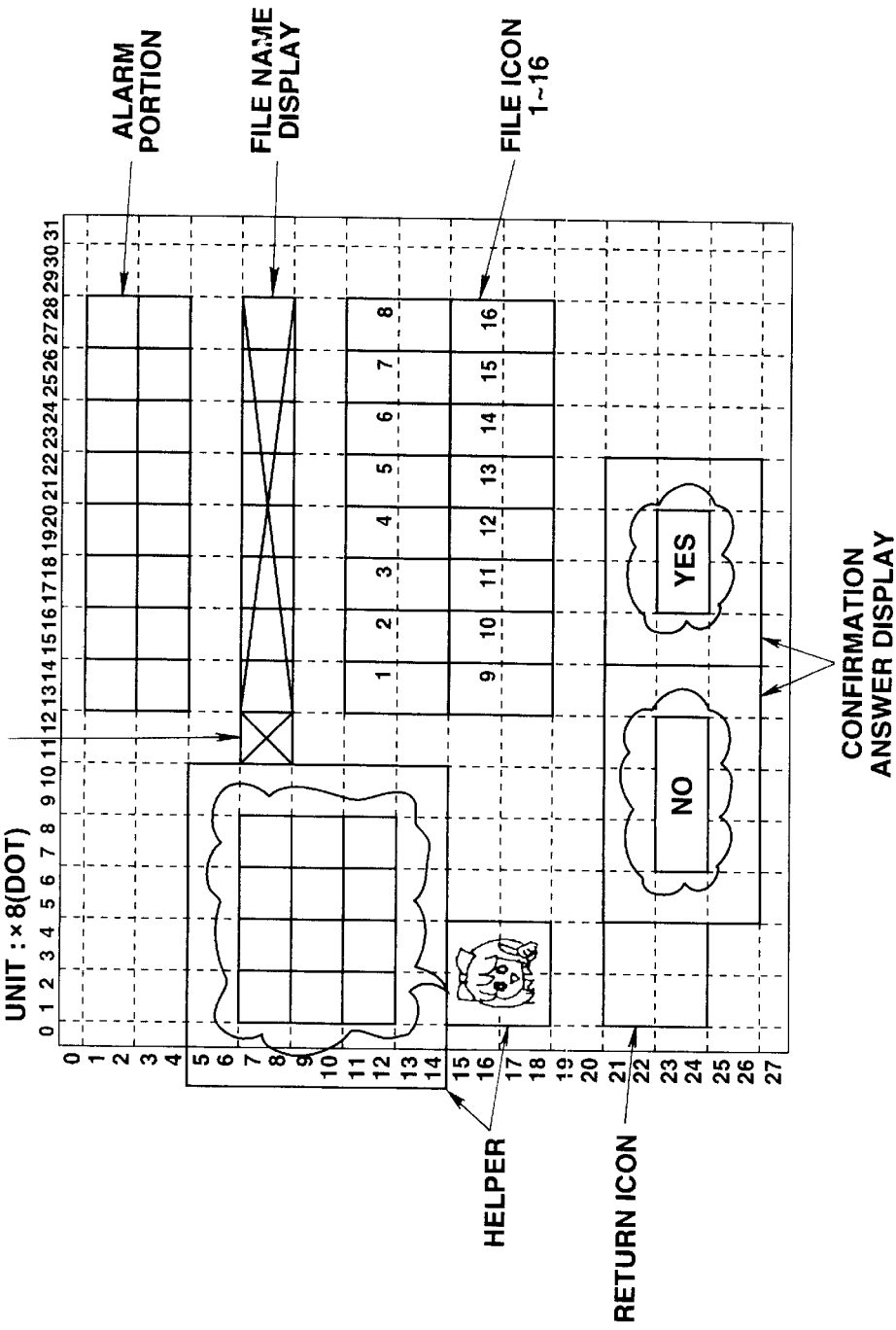
FIG. 40 is a layout view of a file operation screen.
Figure 46A:
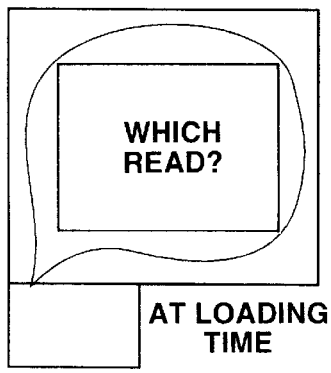
FIGS. 46A–46G are views showing the content of a balloon in a file operation screen.

As the file operation screen, as shown in FIG. 40, there are displayed an alarm display displaying an alarm at the time of saving the file, a present file number display and a file name display, a file icon displaying a kind of the file as a picture, a confirmation answer display including display of "YES" and "NO", a helper, which is formed of a balloon displaying explanation and a picture of a doll, and a return icon indicating the cancellation of the processing of the filing operation screen. In a case where the file operation screen is displayed in step 1403 of FIG. 14 or 1609 of FIG. 16, the content shown in FIG. 46A is displayed as an initial display of the balloon of the helper. The confirmation answer display of FIG. 40 is not displayed in the initial state.

If the user turns on the SEL switch 201 of FIG. 2, the result of the discrimination in step 1902 is YES. Then, in step 1903, the values, 1, 0, of the SEL register are alternately reversed.

In step 1904, it is discriminated whether or not the value of the SEL register is 1.

Figure 46B:
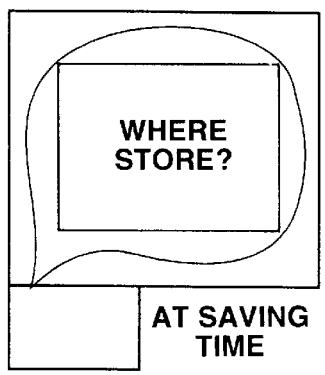
Figure 46C:
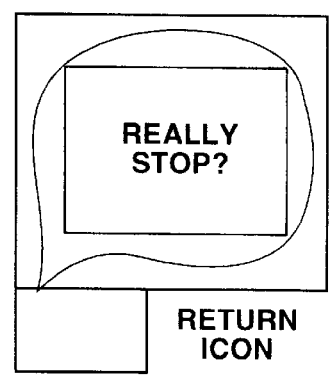

In a case where the value of the SEL register is 1 and the result of the discrimination in step 1904 is YES, and the ENTER switch 202 of FIG. 2 is not turned on, the return icon of FIG. 40 is emphatically displayed when the result of the discrimination in step 1905 is No and step 1901 is executed next. As the display of the balloon of the helper, the content shown in FIG. 46C is displayed. These operations are realized as an operation in which the CPU 301 transfers background image data, corresponding to the above display, to the storage area of the BG-A screen or the BG-B screen of the SRAM 303 through the VDP 302.

On the other hand, in a case where the value of the SEL register is 0 and the result of the discrimination in step 1904 is NO, and the up, down, right and left switches 203 to 206 of FIG. 2 are not turned on, any one of file icons #1 to #16 of FIG. 40 is emphatically displayed when the result of the discrimination in step 1916 is No and step 1901 is executed next. Also, in a case where the file operation screen is displayed in step 1403 of FIG. 14 or step 1609 of FIG. 16, the content shown in FIG. 46A is displayed as the display of the balloon of the helper. These operations are realized as an operation in which the CPU 301 transfers background image data, corresponding to the above display, to the storage area of the BG-A screen or the BG-B screen of the SRAM 303 through the VDP 302.

As mentioned above, the user can alternately select the return icon and the file icon every time when the user returns the SEL switch 201 on the file operation screen.

When the return icon of FIG. 40 is emphatically displayed (the value of the SEL register is 1), the result of the discrimination in step 1905 is YES if the user turns on the ENTER switch 202 of FIG. 2. Then, in step 1906, the confirmation answer display including "YES" and "NO" is displayed. The user can select whether or not the processing of the file operation screen is canceled by selecting either "YES" or "NO." In this case, "NO" is emphatically displayed in the initial state. Moreover, the content shown in FIG. 46C is displayed as the display of the balloon of the helper. These operations are realized as an operation in which the CPU 301 transfers background image data, corresponding to the above display, to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 1907 to 1911 after step 1906.

In other words, if the user turns on the right switch 206 of FIG. 2 or the left switch 205 after the confirmation answer display is displayed, the result of the discrimination in step 1907 or 1909 is YES, either "YES" or "NO" is emphatically displayed in step 1908 or 1910. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in and step 1911 is YES, step 1912 is executed.

In step 1912, by referring to the register, it is discriminated which display of "YES" and "NO" is being emphatically displayed presently.

If it is discriminated that "NO" is emphatically displayed in step 1912, the confirmation answer display is erased in step 1913. Thereafter, the operation goes back to the processing of step 1901 in which the display is returned to the display of the file operation screen.

If it is discriminated that "YES" is emphatically displayed in step 1912, it is discriminated whether the present file operation is the save operation of the file or the load operation.

In a case where the mode 2 is selected on the mode selective screen, so that the file operation screen is displayed to load portrait data in step 1403 of FIG. 14 or 1609 of FIG. 16, the control of the processing of the mode selective screen is returned in step 1916 (steps 1609 of FIG. 16→1601) since it is discriminated that the present file operation is the load operation of the file in step 1914.

On the other hand, in a case where the save operation of the file is selected from the basic system screen, so that the file operation screen is displayed in step 1503 of FIG. 15, the control of the processing of the basic system screen is returned in step 1915 (steps 1503 of FIG. 15→1501) since it is discriminated that the present file operation is the save operation of the file in step 1914.

In a case where the user turns on any one of up, down, right and left switches 203 to 206 when any one of the file icons #1 to #16 of FIG. 40 is emphatically displayed (the value of SEL register is 0), the result of the discrimination in step 1927 of FIG. 20 is YES. Then, in step 1918, the file icon to be emphatically displayed is changed to the file icon next to the file icon, which is being emphatically displayed presently, in accordance with a direction of the turned-on switch. At the same time, the file number which corresponds to the number of the file icon newly emphatically displayed, and the file name are displayed on the area of the present file number display (FIG. 40) and that of the present file name display. These operations are realized as an operation in which the CPU 301 transfers background image data, corresponding to the above display, to the storage area of the BG-A screen or the BG-B screen of the SRAM 303 through the VDP 302.

After the processing in step 1918, it is discriminated whether or not the present file operation is the load operation of the file.

In a case where the mode 2 is selected on the mode selective screen, so that the file operation screen is displayed to load portrait data in step 1403 of FIG. 14 or 1609 of FIG. 16, steps 1920 to 1932 are executed since the result of the discrimination in step 1919 is YES.

First, in step 1920, it is discriminated whether or not the file of portrait data is present at the position of the file icon, which is being emphatically displayed presently.

Figure 46D:
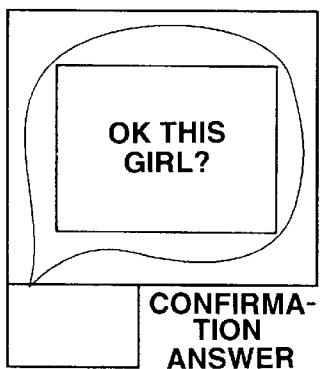
Figure 46E:
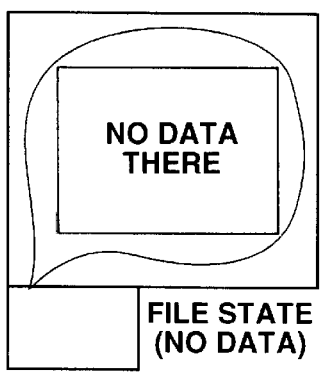

If it is discriminated that the file of portrait data is not present at the position of the file icon, which is being emphatically displayed presently, in step 1920, the display of the balloon of the helper is changed to the content shown in FIG. 46E in step 1921. Thereafter, the display is returned to the display of the file operation screen in the step 1901 of FIG. 19. This operation is realized as an operation in which the CPU 301 transfers background image data, corresponding to the above display, to the storage area of the BG-A screen or the BG-B screen of the SRAM 303 through the VDP 302.

On the other hand, if it is discriminated that the file of portrait data is present at the position of the file icon, which is being emphatically displayed presently, the confirmation answer display including "YES" and "NO" is displayed in step 1923 after the display of the balloon of the helper is changed to the content shown in FIG. 46D in step 1922. The user can select whether the load operation of the file is executed or canceled by selecting either "YES" or "NO." In this case, "YES" is emphatically displayed in the initial state. These operations are realized as an operation in which the CPU 301 transfers background image data, corresponding to the above display, to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 1924 to 1928 after step 1923.

In other words, if the user turns on the right switch 206 of FIG. 2 or the left switch 205 after the confirmation answer display is displayed, the result of the discrimination in step 1924 or 1926 is YES, either "YES" or "NO" is emphatically displayed in step 1925 or 1927. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 1928 is YES, and step 1929 is executed.

In step 1929, by referring to the register, it is discriminated which display of "YES" and "NO" is being emphatically displayed presently.

If it is discriminated that "NO" is emphatically displayed in step 1929, the confirmation answer display is erased in step 1930. Thereafter, the operation goes back to the processing of step 1901 in which the display is returned to the display of the file operation screen.

If it is discriminated that "YES" is emphatically displayed in step 1929, the CPU 301 loads the file of image data of the portrait, which corresponds to the file icon of the selected emphatic display, to the respective storage areas of the SRAM 303 or the DP-RAM 304 shown in FIG. 7 or 8 from the program/data ROM 307 or the work RAM 308 through the CPU interface section 401 of FIG. 4, the address bus 416, the data bus 417, and the SRAM interface section 402, or the DP-RAM interface section 403. Also, the CPU 301 transfers coordinate data of each of the objects to be transferred to the SRAM 303 to the object attribute memory section 407 from the program/data ROM 307 through the CPU interface section 401, the address bus 416, and the data bus 417 (FIG. 9)

Thereafter, the operation goes to the processing of the basic system screen (step 1932). The movement from step 1931 to step 1932 corresponds to the movement from step 1403 of FIG. 14 to 1404 (step 1501 of FIG. 15), or the movement from step 1609 of FIG. 16 to step 1610.

In the state that the save operation of the file is selected from the basic system screen to be described later, so that the file operation screen is displayed in step 1503 of FIG. 15, the processing in steps 1933 to 1945 of FIG. 20 in the case where it is discriminated that the present file operation is the save operation of the file in step 1919 will be explained after the explanation of the processing of the basic system screen.

Processing Flow of Basic System Screen

FIGS. 22 to 25 are operation flow charts showing the processing of the basic system screen to be executed as step 1501 of FIG. 15. By use of the basic system screen, the user can prepare the portrait and execute the print processing relevant to the present invention.

First, in step 2201, the basic system screen is displayed. More specifically, for example, during the vertical blank period (FIG. 11), the CPU 301 of FIG. 3 transfers background image data for basic system to the storage areas of the BG-B screen of SRAM 303 (FIG. 7) from the program/data ROM 307 through the CPU interface section 401 of FIG. 4, the address bus 416, the data bus 417, and the SRAM interface section 402. Also, in step 1721 of FIG. 18 or step 1931 of FIG. 20, image data of portrait is loaded to the storage area of the SRAM 303 of FIG. 7 or that of the DP-RAM 304 of FIG. 8 and the object attribute memory section 407 of the VDP 302 of FIG. 4. As a result, the VDP 302 having the structure shown in FIG. 4 displays image data for the basic system screen and image data of portrait, which are transferred to the respective areas of the SRAM 303 and the DP-RAM 304, on TV 311 of FIG. 3 to be superimposed on each other.

Figure 47A:
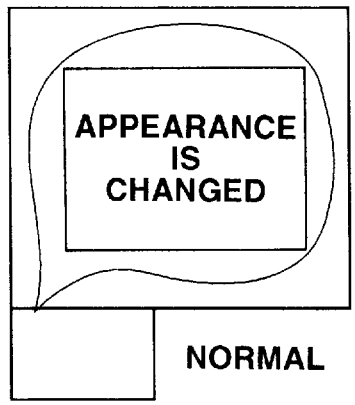
FIGS. 47A–47D are views showing the content of a balloon in a basic system screen.

As the basic system screen, there are displayed seven selection icons for which the user selects a part of a portrait at the time of preparing the portrait, a selecting cursor showing the icon, which is selected presently, up and down arrows, a part kind icon showing a picture of a part corresponding to the icon presently selected, five kinds of command icons, a confirmation answer display including "YES" and "NO", and a helper, formed of a balloon for displaying explanation and a picture of a doll. The content shown in FIG. 47A is displayed as an initial display of the balloon of the helper. Also, the confirmation display of FIG. 41 is not displayed in the initial state.

If the user turns on the SEL switch of FIG. 2, the result of the discrimination in step 2202 is YES. Then, in step 2203, the values, 1 and 0, of the SEL register are alternatively reversed. In a case where the value of the SEL register is 1, any one of command icons of FIG. 41 is emphatically displayed when step 2201 is executed next. On the other hand, in a case where the value of the SEL register is 0, the selecting cursor, which is placed on any one of the selection icons of FIG. 41, is emphatically displayed.

The following will explain the operations of the selection icons.

Figure 23:
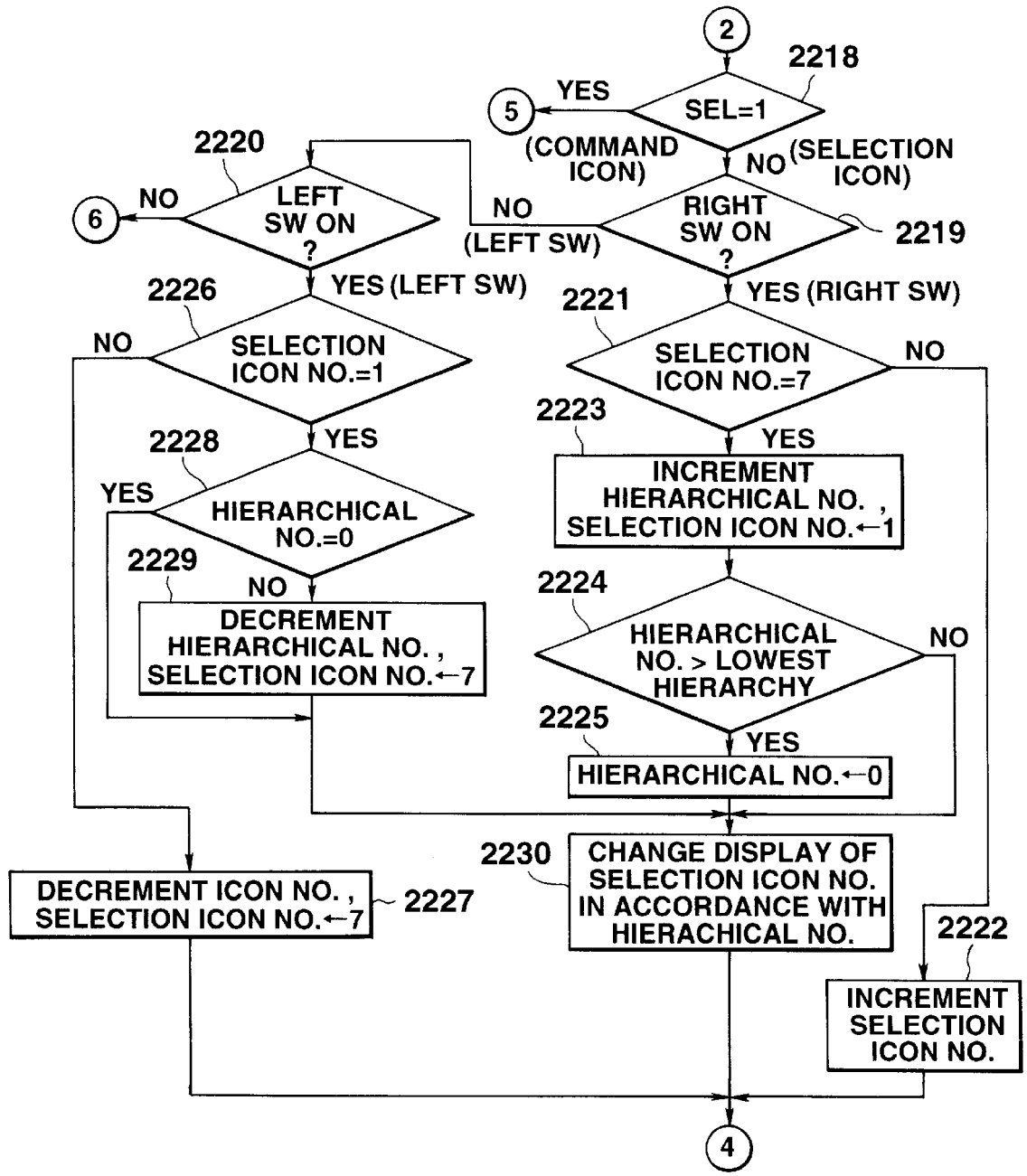
FIG. 23 is a flow chart of an operation of processing of a basic system screen (NO. 2)
Figure 24:
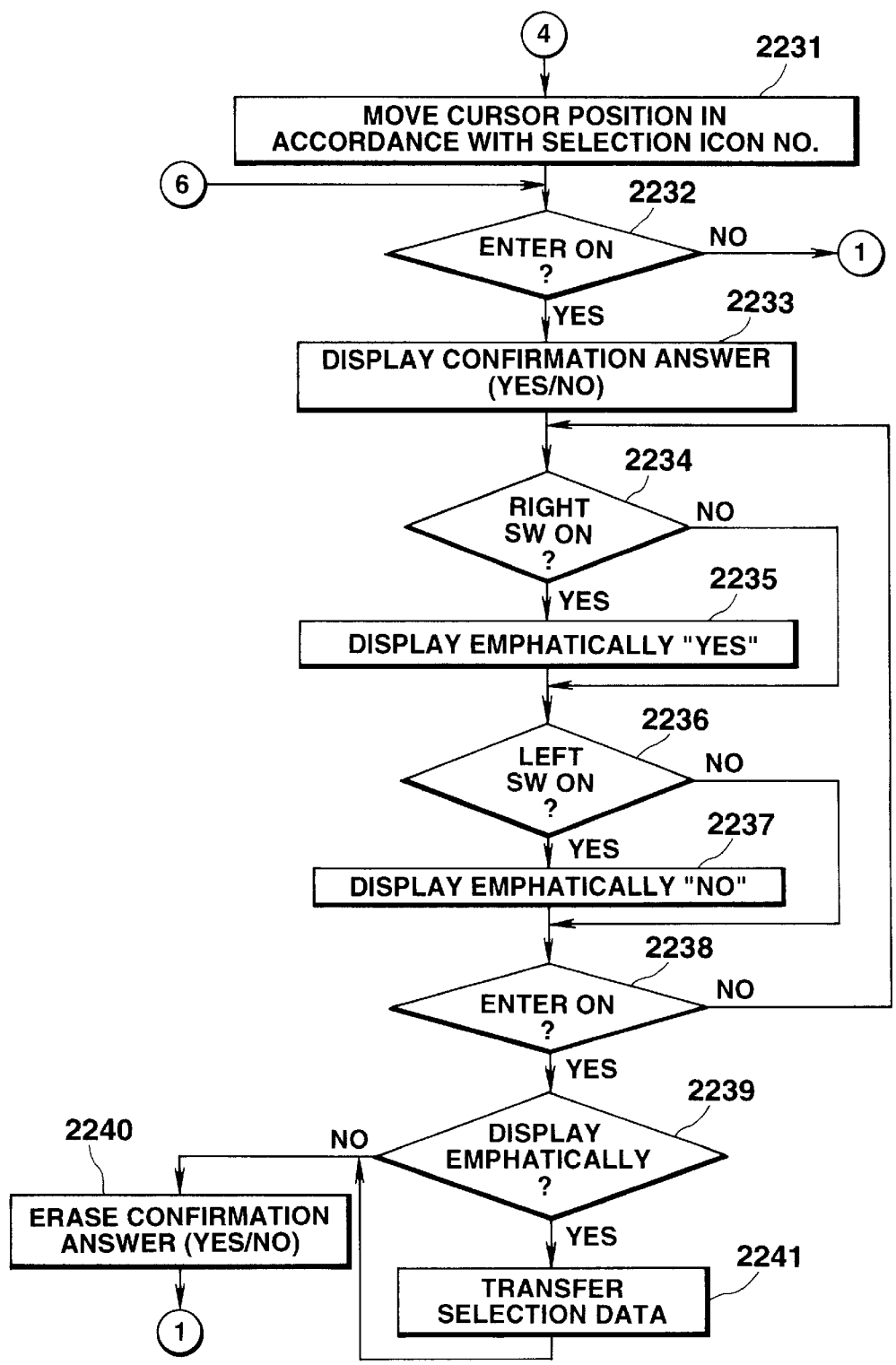
FIG. 24 is a flow chart of an operation of processing of a basic system screen (NO. 3)
Figure 41:
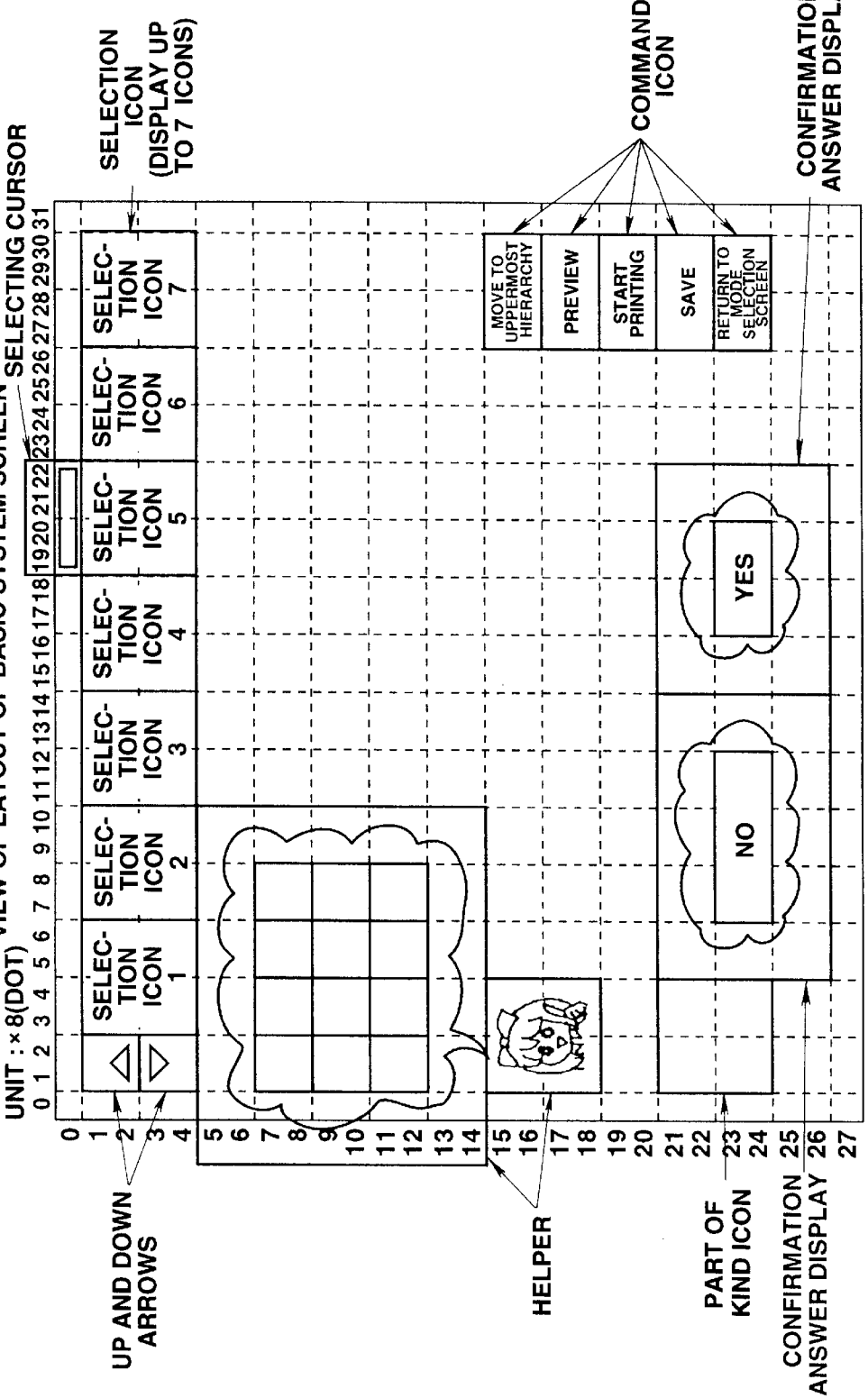
FIG. 41 is a layout view of a basic system screen.

If the selecting cursor, which is placed on any one of the selection icons of FIG. 41, is emphatically displayed (the value of the SEL register is 0), and the user turns on either the right switch 206 of FIG. 2 or the left switch 205, the result of the discrimination in step 2204 is NO and the result of the discrimination in step 2218 of FIG. 23 is NO. Then, steps 2219 to 2230 and steps 2231 and 2232 of FIG. 24 are executed.

Figure 22:
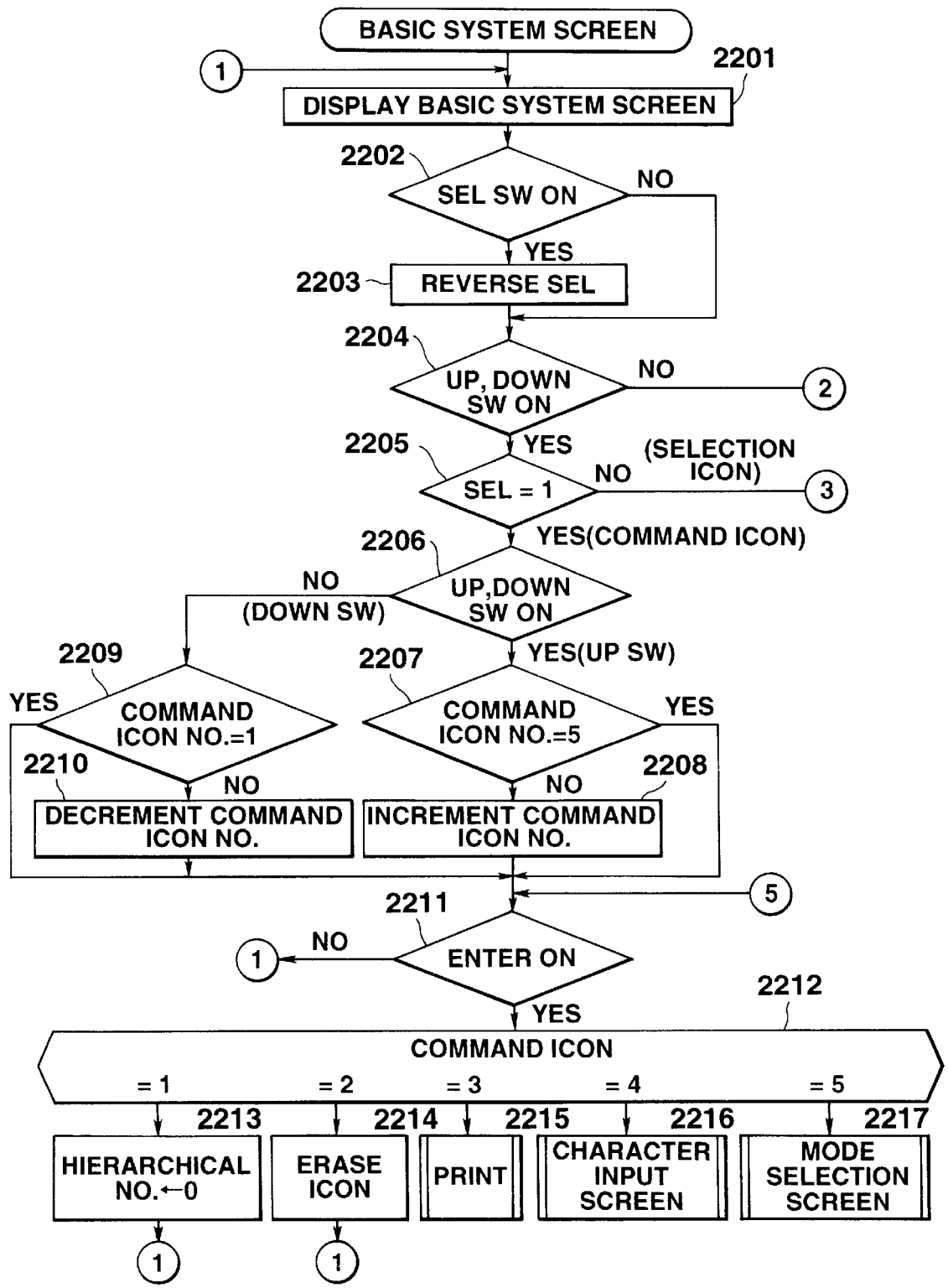
FIG. 22 is a flow chart of an operation of processing of a basic system screen (NO. 1)

In these series of processings, a hierarchical number and a value of the selection icon number, which are set in two registers (not shown), are controlled. When step 2201 of FIG. 22 is executed, the selecting cursor is placed on the selection icon corresponding to the selection icon number set in one of the above registers. The content of each of seven selection icons is displayed in accordance with the hierarchical number set in one of the above register. The selection icon allocated to the upper hierarchy is displayed as the value of the hierarchical number becomes smaller. As the selection icons, the large categories of parts such as "hair", "eyes", "eyebrows", "nose", "mouth", "contour", and "balloon" are displayed in a case where the hierarchical number is 0 (uppermost hierarchy). If the hierarchical number is 1, the parts in which the categories of the parts shown by the selection icons where the selecting cursor is positioned is further classified are displayed. Then, as the hierarchical number is sequentially increased, the parts in which the categories of the parts shown by the selection icons where the selecting cursor is positioned is further classified are displayed. The user can freely control the display based on the above hierarchical number and the selection icon number by the up, down, right and left switches 203 to 206 of FIG. 2. Then, at the time when the user turns on the ENTER switch 202 of FIG. 2 at a desired position, image data of the selection icon where the selecting cursor is positioned can be selected as image data of the portrait.

First, in step 2219, it is discriminated whether or not the right switch 206 of FIG. 2 is turned on.

If the result of the discrimination in step 2219 is YES (right switch 206 is turned on), the selection icon number set in the register (not shown) is not 7. Then, if the result of the discrimination in step 2221 is NO, the value of the selection icon number set in the register is incremented. Thereafter, in step 2231 of FIG. 24, the position of the selecting cursor is moved to the selection icon one right from the selection icon where the cursor is being positioned presently. This operation is realized as an operation in which the CPU 301 transfers background image data corresponding to the above display to the storage area of the BG-B screen of the SRAM 303 through the VDP 302. If the result of the discrimination in step 2221 is YES (selection icon number is 7), the hierarchical number, which is set in the register (not shown), is incremented, and the value of the selection icon number, which is set in the above register, is set to 1. Then, if the hierarchical number, which is set in the above register, exceeds the number corresponding to the lowest hierarchy, the result of the discrimination in step 2224 is YES, and the value of the hierarchical number, which is set in the above register, is reset to 0 showing the uppermost hierarchy in step 2225. Thereafter, in step 2230, the content of the display of the selection icon of FIG. 41 is changed to the content of the display corresponding to the hierarchical number set in the above register. Then, in step 2231 of FIG. 24, the position of the selecting cursor is moved to the left-end selection icon corresponding to the selection icon number=1 set in the above register. These operations are realized as an operation in which the CPU 301 transfers background image data corresponding to the above display to the storage area of the BG-B screen of the SRAM 303 through the VDP 302.

On the other hand, if the left switch 205 is turned on, the result of the discrimination in step 2219 is NO, and the result of the discrimination in step 2220 is YES, the selection icon number set in the above register is not 1. Then, if the result of the discrimination in the next step 2226 is NO, the value of the selection icon number set in the above register is decremented in step 2227. Thereafter, in step 2231 of FIG. 24, the position of the selecting cursor is moved to the selection icon one left from the selection icon where the cursor is being positioned presently. If the selection icon number is 1, and the result of the discrimination in step 2226 is YES, the value of the hierarchical number, which is set in the above register, is not 0 corresponding to the uppermost hierarchy. Then, the result of the discrimination in step 2228 is NO, the hierarchical number, which is set in the above register, is decremented, and the value of the selection icon number, which is set in the above register, is set to 7.

Thereafter, in step 2230, the content of the display of the selection icon of FIG. 41 is changed to the content of the display corresponding to the hierarchical number set in the above register. Then, in step 2231 of FIG. 24, the position of the selecting cursor is moved to the right-end selection icon corresponding to the selection icon number=7 set in the above register.

Figure 25:
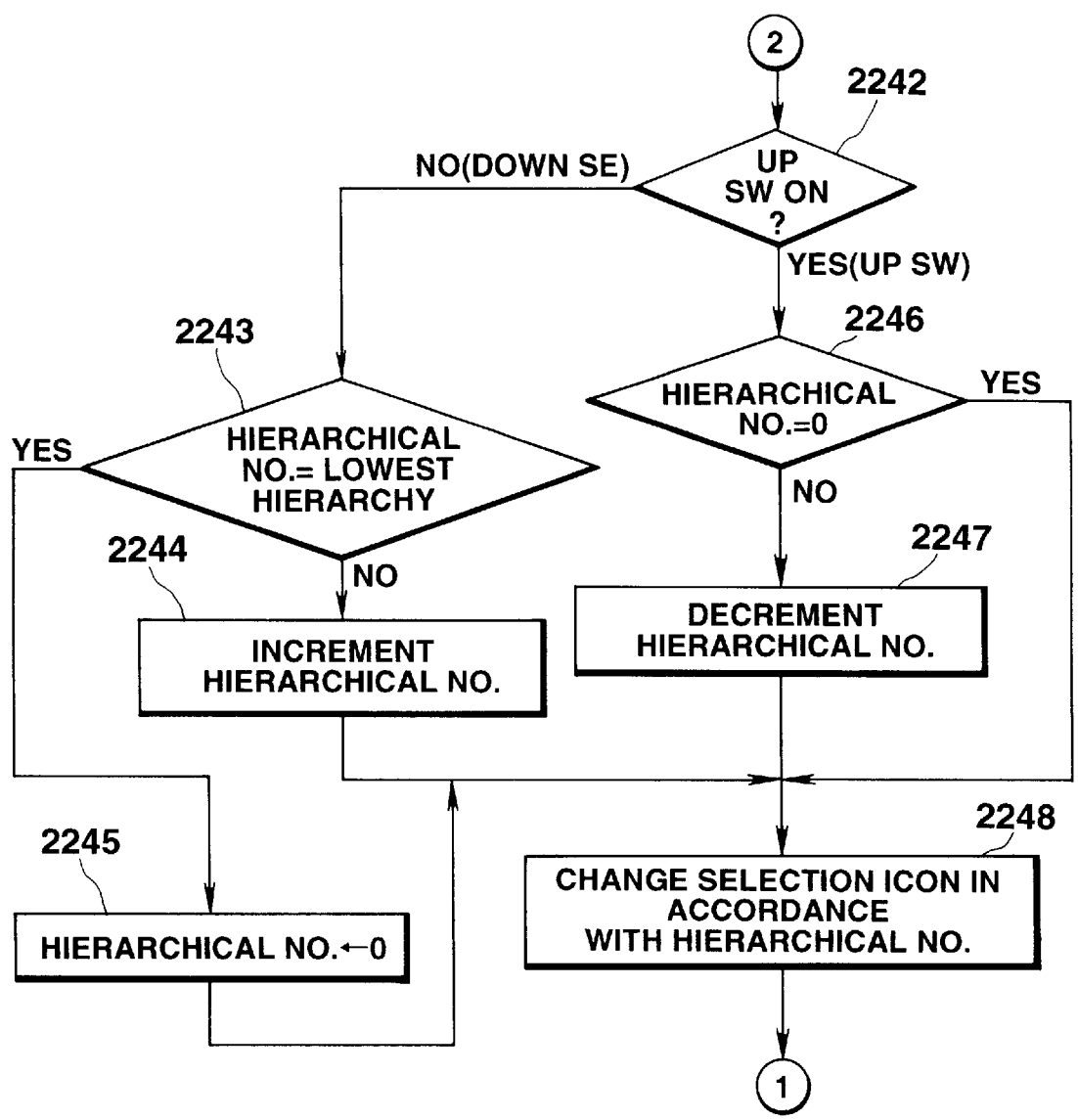
FIG. 25 is a flow chart of an operation of processing of a basic system screen (NO. 4)

If the selecting cursor, which is placed on any one of the selection icons of FIG. 41, is emphatically displayed (the value of the SEL register is 0), and the user turns on the up and down switches 203 and 204, the result of the discrimination in step 2204 of FIG. 22 is YES and the result of the discrimination in step 2205 is NO. Then, steps 2242 to 2248 of FIG. 25 are executed.

First, in step 2242, it is discriminated whether or not the up switch 203 of FIG. 2 is turned on.

If the result of the discrimination is YES (up switch 203 is turned on), the hierarchical number set in the above register is not 0. Then, if the result of the discrimination in the next step 2246 is NO, the value of the hierarchical number set in the register is decremented. If the hierarchical number is 0, and the result of the discrimination in step 2246 is YES, step 2247 is not executed and the value of the register is not incremented.

On the other hand, if the down switch 204 is turned on, and the result of the discrimination in step 2242 is NO, the hierarchical number set in the above register is not the number corresponding to the lowest hierarchy. Then, if the result of the discrimination in step 2243 is NO, the value of the hierarchical number set in the above register is incremented. If the hierarchical number is the number corresponding to the lowest hierarchy, and the result of the discrimination in step 2243 is YES, the value of the hierarchical number set in the above register is reset to 0 showing the uppermost hierarchy.

After the processing of steps 2242 to 2247, in step 2248, the content of the display of the selection icon of FIG. 41 is changed to the content of the display corresponding to the hierarchical number set in the above register. This operation is realized as an operation in which the CPU 301 transfers background image data corresponding to the above display to the storage area of the BG-B screen of the SRAM 303 through the VDP 302.

Sequentially, if the selecting cursor, which is placed on any one of the selection icons of FIG. 41, is emphatically displayed (the value of the SEL register is 0), and the user turns on the ENTER switch 202 of FIG. 2, the result of the discrimination in step 2204 of FIG. 22 is NO and the result of the discrimination in each of steps 2218, 2219, 2220 is NO. Moreover, the result of the discrimination in step 2232 of FIG. 24 is YES. Or, the result of the discrimination in step 2204 of FIG. 22 is NO, that of the discrimination in step 2219 or 2220 of FIG. 23 is YES, and the processing of steps 2221 to 2230 is executed. Thereafter, the result of the discrimination in step 2232 of FIG. 24 is YES.

Then, the confirmation answer display including "YES" and "NO" is displayed. The user selects either "YES" or "NO", and thereby the selection icon where the selecting cursor is positioned can be used as image data of the portrait or canceled. In this case, "YES" is emphatically displayed in the initial state. Moreover, these operations are realized as an operation in which the CPU 301 transfers background image data, corresponding to the above display, to the storage area of the BG-B screen of the SRAM 303 through the VDP 302.

The selective operation including "YES" and "NO" and the decisive operation, which are performed by the user after the confirmation answer display is displayed, are detected in the repetition of steps 2234 to 2238 after step 2233.

In other words, if the user turns on the right switch 206 of FIG. 2 or the left switch 205 after the confirmation answer display is displayed, the result of the discrimination in step 2234 or 2236 is YES, either "YES" or "NO" is emphatically displayed in step 2235 or 2237. These operations are realized as an operation in which the CPU 301 transfers background image data, corresponding to each of the above displays, to the storage area of the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 2238 is YES, and step 2239 is executed.

In step 2239, by referring to the register, it is discriminated which display of "YES" and "NO" is being emphatically displayed presently.

If it is discriminated that "NO" is emphatically displayed in step 2239, the confirmation answer display is erased in step 2240. Thereafter, the operation goes back to the processing of step 2201 in which the display is returned to the display of the basic system screen.

If it is discriminated that "YES" is emphatically displayed in step 2239, the CPU 301 loads the file of image data of the portrait, which corresponds to the selection icon where the selecting cursor is positioned, to the respective storage areas of the SRAM 303 or the DP-RAM 304 shown in FIG. 7 or 8 from the program/data ROM 307 through the CPU interface section 401 of FIG. 4, the address bus 416, the data bus 417, and the SRAM interface section 402, or the DP-RAM interface section 403. In addition, the CPU 301 transfers coordinate data of each of the objects to be transferred to the SRAM 303 to the object attribute memory section 407 from the program/data ROM 307 through the CPU interface section 401, the address bus 416, and the data bus 417 (FIG. 9). Then, after the confirmation answer display is erased in step 2240, the operation goes back to step 2201 of FIG. 22, and the display is returned to the basic system screen. By this operation, image data of the selection icon, which the user selects, is reflected on the portrait, which is being prepared.

The following will explain the operation of the command icons.

In a case where any one of the command icons of FIG. 41 is emphatically displayed (the value of the SEL register is 1) and the user turns on the up and down switches 203 or 204, the result of the discrimination in steps 2204 of FIG. 22 and step 2205 is YES, and the processing of steps 2206 to 2211 is executed.

First, in step 2206, it is discriminated whether or not the up switch 203 of FIG. 2 is turned on.

If the result of the discrimination is YES (up switch 203 is turned on), the command icon number set in the register (not shown) is not 5. Then, if the result of the discrimination in the next step 2207 is NO, the value of the command icon number set in the above register is incremented in step 2208. If the command icon number is 5 and the result of the discrimination in step 2207 is YES, step 2208 is not executed and the value of the register is not incremented.

On the other hand, if the down switch 204 is turned on, and the result of the discrimination in step 2206 is NO, the command icon number set in the above register is not 1. Then, the result of the discrimination in step 2209 is NO, the value of the command icon number set in the above register is decremented in step 2210. If the command icon number is 1, and the result of the discrimination in step 2209 is YES, step 2210 is not executed, and the value of the register is not decremented.

Figure 47B:
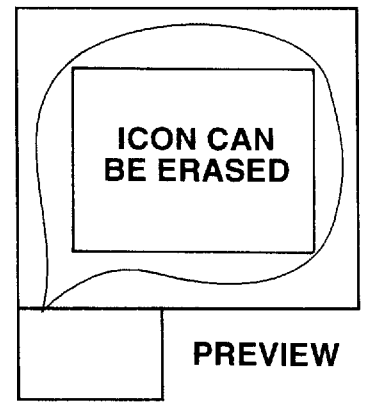
Figure 47C:
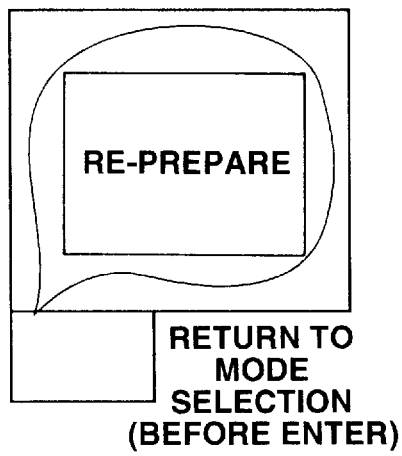
Figure 47D:
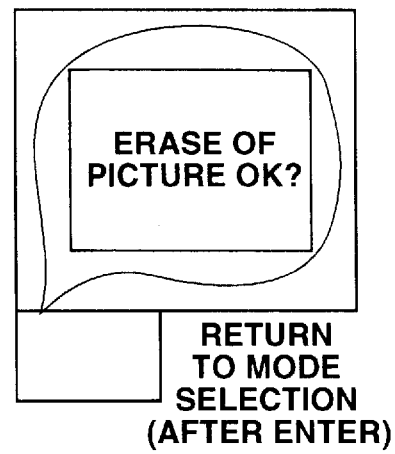

After the processing of steps 2206 to 2210, if the user does not turn on the ENTER switch of FIG. 2, the result of the discrimination in step 2111 is NO. Then, if step 2201 is executed next, only the command icon, which corresponds to the command icon number set in the above register among five command icons of FIG. 41, is emphatically displayed. In this case, if the command icon, "PREVIEW", is emphatically displayed, the content shown in FIG. 47B is displayed as the balloon of the helper. Also, the command icon, "RETURN TO MODE SELECTION SCREEN", is emphatically displayed, the content shown in FIG. 47C is displayed as the balloon of the helper. This operation is realized as an operation in which the CPU 301 transfers background image data, corresponding to the above display, to the storage area of the BG-B screen of the SRAM 303 through the VDP 302.

In a case where any one of the command icons of FIG. 41 is emphatically displayed (the value of the SEL register is 1) and the user turns on the ENTER switch 202, the result of the discrimination in step 2204 is NO, the result of the discrimination in steps 2218 of FIG. 23 is YES. Moreover, the result of the discrimination in steps 2211 of FIG. 22 is YES. Or, the result of the discrimination in each of steps 2204 and 2205 is YES, and the processing of steps 2206 to 2210 is executed. Thereafter, the result of the discrimination in step 2211 is YES.

After the result of the discrimination in step 2211 is YES, the value of the command icon number set in the above register is discriminated in step 2212.

If the user turns on the ENTER switch 202 of FIG. 2 when it is discriminated that the value of the command icon number is 1 in step 2212, that is, the icon, "MOVE TO UPPERMOST HIERARCHY" is emphatically displayed, the value of the hierarchical number set in the above register (not shown) is reset to 0 showing the uppermost hierarchy in step 2213. As a result, in the next step 2221 of FIG. 22, the display content of the selection icon of FIG. 41 is changed to the display content of the uppermost hierarchy, which corresponds to the hierarchical number=0 set in the above register. This operation is realized as an operation in which the CPU 301 transfers background image data, corresponding to the above display, to the storage area of the BG-B screen of the SRAM 303 through the VDP 302. As mentioned above, the user selects the icon "MOVE TO UPPERMOST HIERARCHY" to be executed, thereby the content of the selection icon can be instantaneously changed to the display content of the uppermost hierarchy.

If the user turns on the ENTER switch 202 of FIG. 2 when it is discriminated that the value of the command icon number is 2 in step 2212, that is, the icon, "PREVIEW" is emphatically displayed, the processing for erasing the icon is executed in step 2214. In this processing, there are erased the display on the basic system screen such as the selection icon, the selecting cursor, the command icon, the part kind icon, and the confirmation answer display. More specifically, the CPU 301 deletes background image data such as the above-mentioned icons forming the basic system screen stored in the BG-B screen of SRAM 303 (FIG. 7). In this case, the helper is not erased in a case where the user selects the preparation of the speech in the selection icon and prepares the speech by the processing of the character input screen to be described later. In this way, the user selects the "PREVIEW" icon to be executed, and thereby the portrait, which is being prepared, can be previewed.

If the user turns on the ENTER switch 202 of FIG. 2 when it is discriminated that the value of the command icon number is 3 in step 2212, that is, the icon, "PRINT START" is emphatically displayed, the print processing is executed in step 2215. This processing is particularly relevant to the present invention, and explained later by use of the operation flow charts of FIGS. 29 to 35.

If the user turns on the ENTER switch 202 of FIG. 2 when it is discriminated that the value of the command icon number is 4 in step 2212, that is, the icon, "SAVE" is emphatically displayed, the processing for the character input screen is executed to input a file name to be saved in step 2216. This processing is explained later by use of the operation flow charts of FIGS. 26 to 28. Then, after ending the character input processing, the processing for the file operation screen is executed. The processing for the character input screen is driven such that the speech of the balloon is input by the user even in a case where the user selects the preparation of the speech in the selection icon (step 1501 of FIG. 15→1504). This processing is also explained later by use of the operation flow charts of FIGS. 26 to 28.

If the user turns on the ENTER switch 202 of FIG. 2 when it is discriminated that the value of the command icon number is 5 in step 2212, that is, the icon, "RETURN TO MODE SELECTION SCREEN" is emphatically displayed, the processing for returning to the mode selection screen is executed in step 2217. The details of this processing are omitted. However, for example, in a case where the display of the balloon of the helper is changed to the content shown in FIG. 47C, the confirmation answer display of FIG. 41 is displayed, and the user selects "YES", the display on the TV 311 of FIG. 3 is changed from the display of the basic system screen in the portrait preparation mode of step 1404 of FIG. 14 or step 1610 of FIG. 16 to the display of the mode selection screen of step 1404 of FIG. 14 or step 1610 of FIG. 16. If the user selects "NO", the display is returned to the display of the basic system screen.

Processing Flow of Character Input Screen

Figure 26:
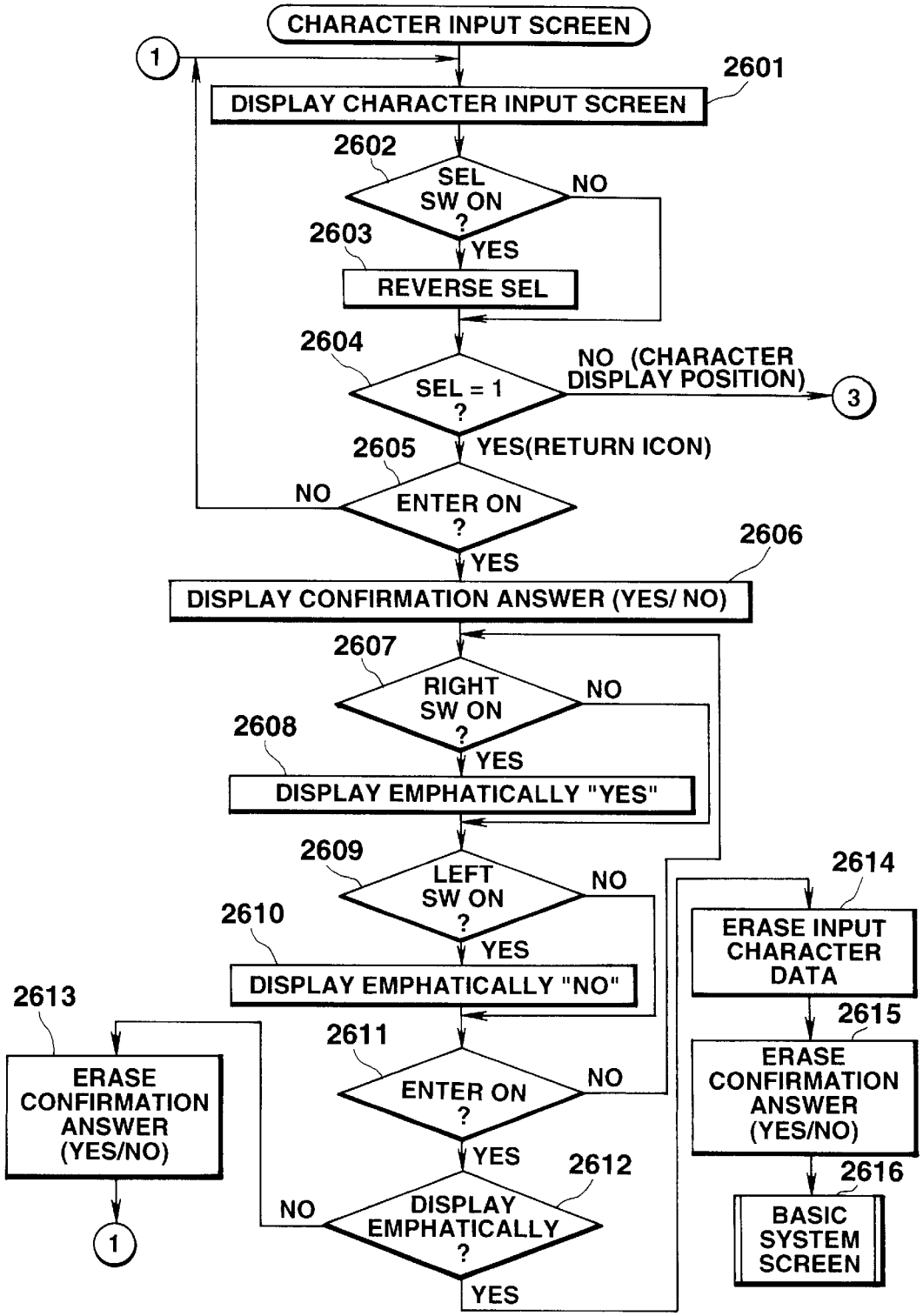
FIG. 26 is a flow chart of an operation of processing of character input screen (NO. 1)
Figure 27:
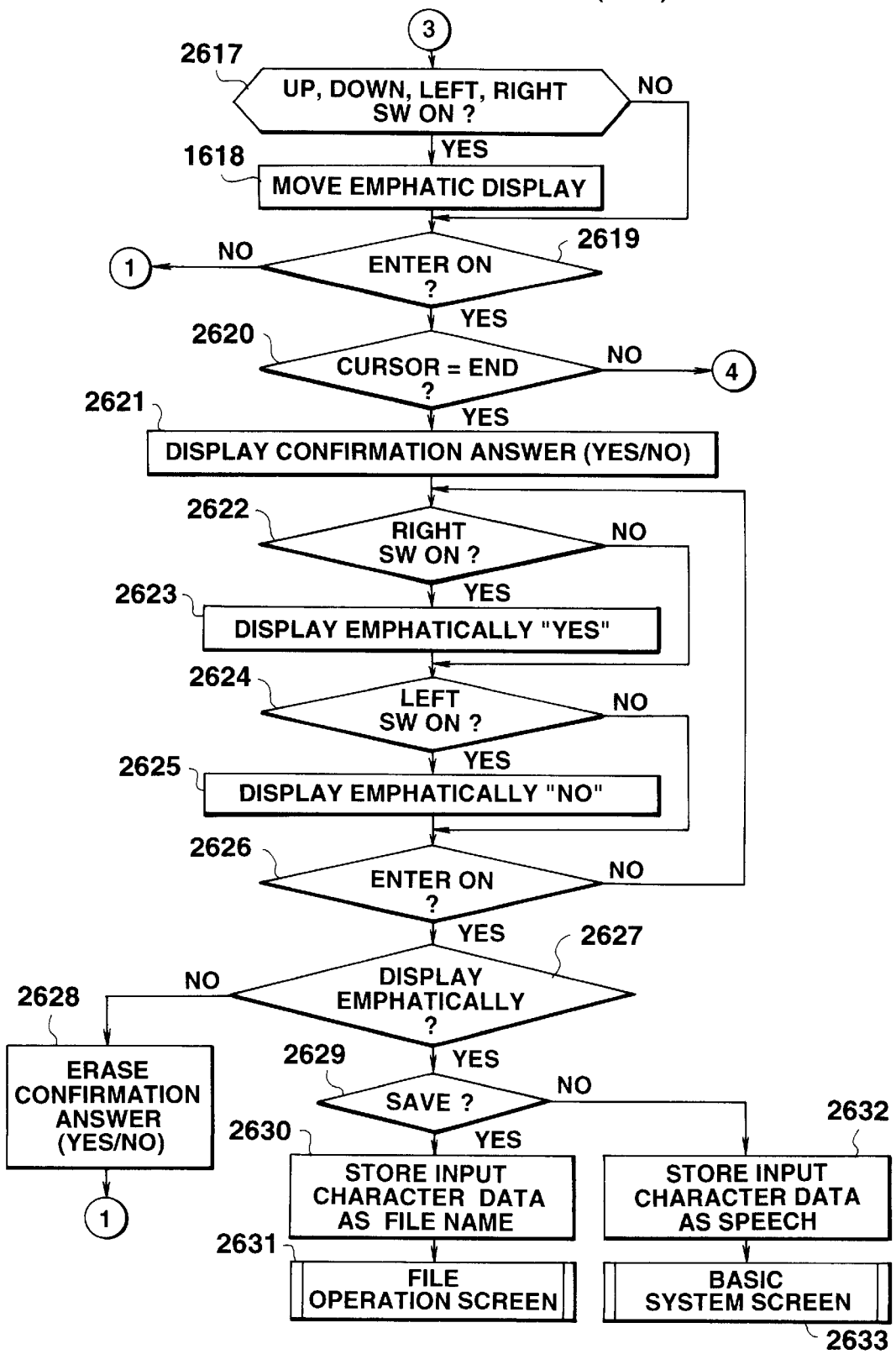
FIG. 27 is a flow chart of an operation of processing of character input screen (NO. 2)
Figure 28:
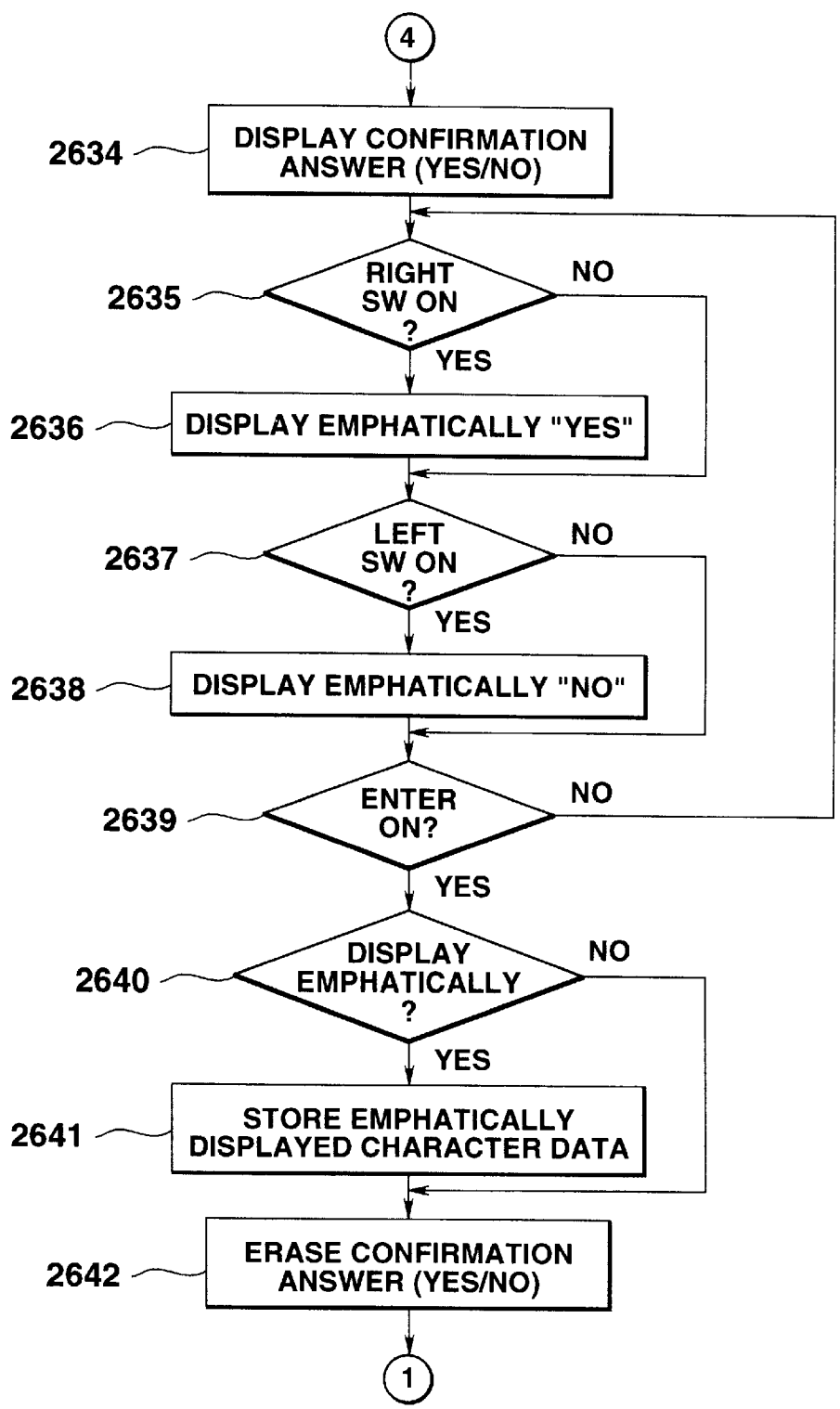
FIG. 28 is a flow chart of an operation of processing of character input screen (NO. 3)

FIGS. 26 to 28 are flow charts showing the processing for the character input screen as step 1502 of FIG. 15. On the character input screen, the user can input the file name to be saved, or the speech to the balloon.

As explained above, if the user turns on the ENTER switch 202 of FIG. 2 when the basic system screen of FIG. 41 is displayed on the TV 311 and the icon, "SAVE" is emphatically displayed, the processing for the character input screen to input the file name (operation flow charts of FIGS. 26 to 28) is executed as the processing of step 1502 of FIG. 15 or that of step 2216 of FIG. 22. Moreover, if the user turns on the ENTER switch 202 of FIG. 2 when the selection icon showing the preparation of the speech on the basic system screen is emphatically displayed, the processing for the character input screen to prepare the speech of the balloon (operation flow charts of FIGS. 26 to 28) is executed as step 1504 of FIG. 15.

In the repetition of steps 2601 to 2604→2605 or 2617 to 2619, there is executed the processing, which corresponds to the SEL switch 201, the ENTER switch 202, or up, down, left, right switches 203 to 206, which are turned on by the user in the control pad 313 of FIG. 2 or 3.

First, in step 2601, the character input screen is displayed. More specifically, for example, during the vertical blank period (FIG. 11), the CPU 301 of FIG. 3 transfers background image data for the character input screen to the respective storage areas of the BG-A screen and the BG-B screen of SRAM 303 (FIG. 7) from the program/data ROM 307 through the CPU interface section 401 of FIG. 4, the address bus 416, the data bus 417, and the SRAM interface section 402. As a result, the VDP 302 having the structure shown in FIG. 4 displays image data for the character input screen transferred to the respective storage areas of SRAM 303 on the TV 311 of FIG. 3.

Figure 42:
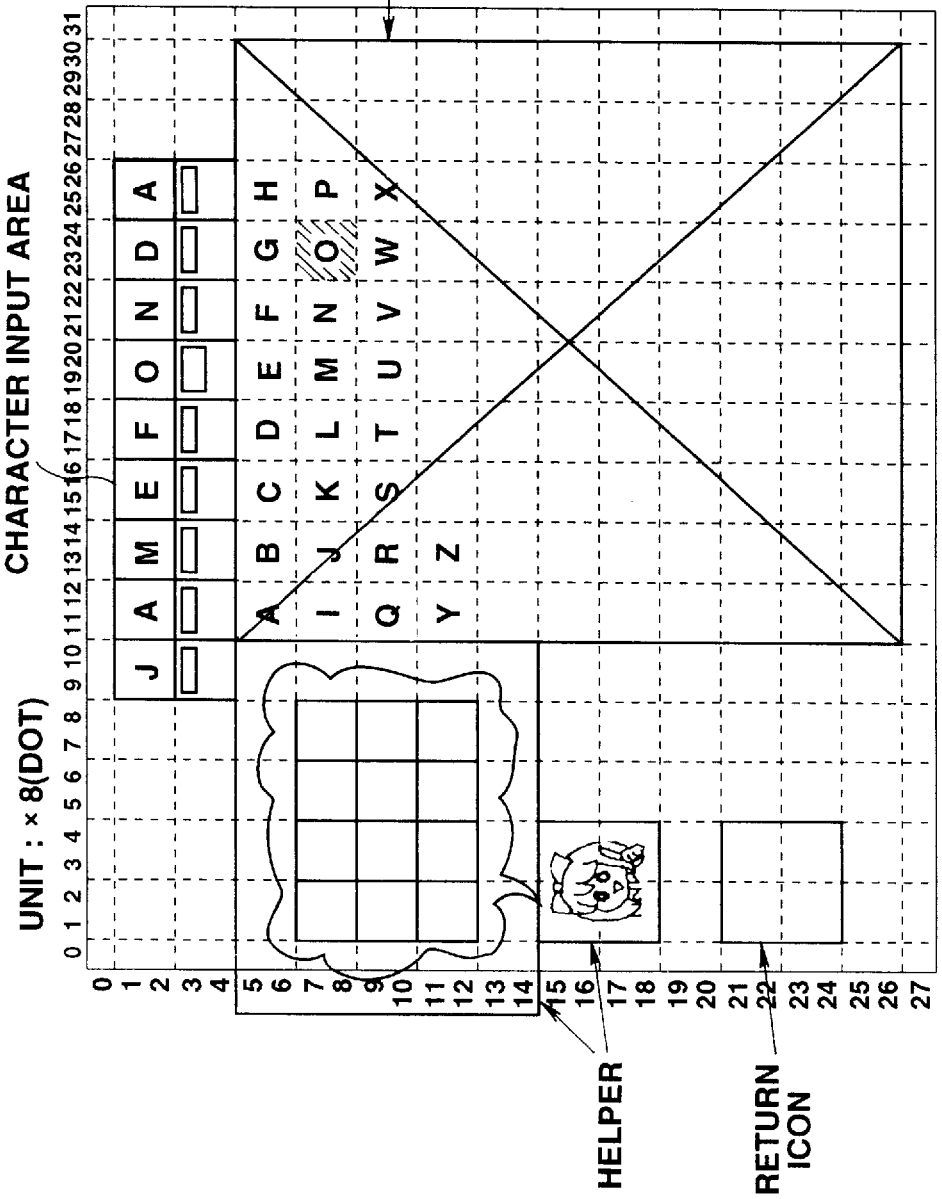
FIG. 42 is a layout view of a character input screen (No. 1)
Figure 43:
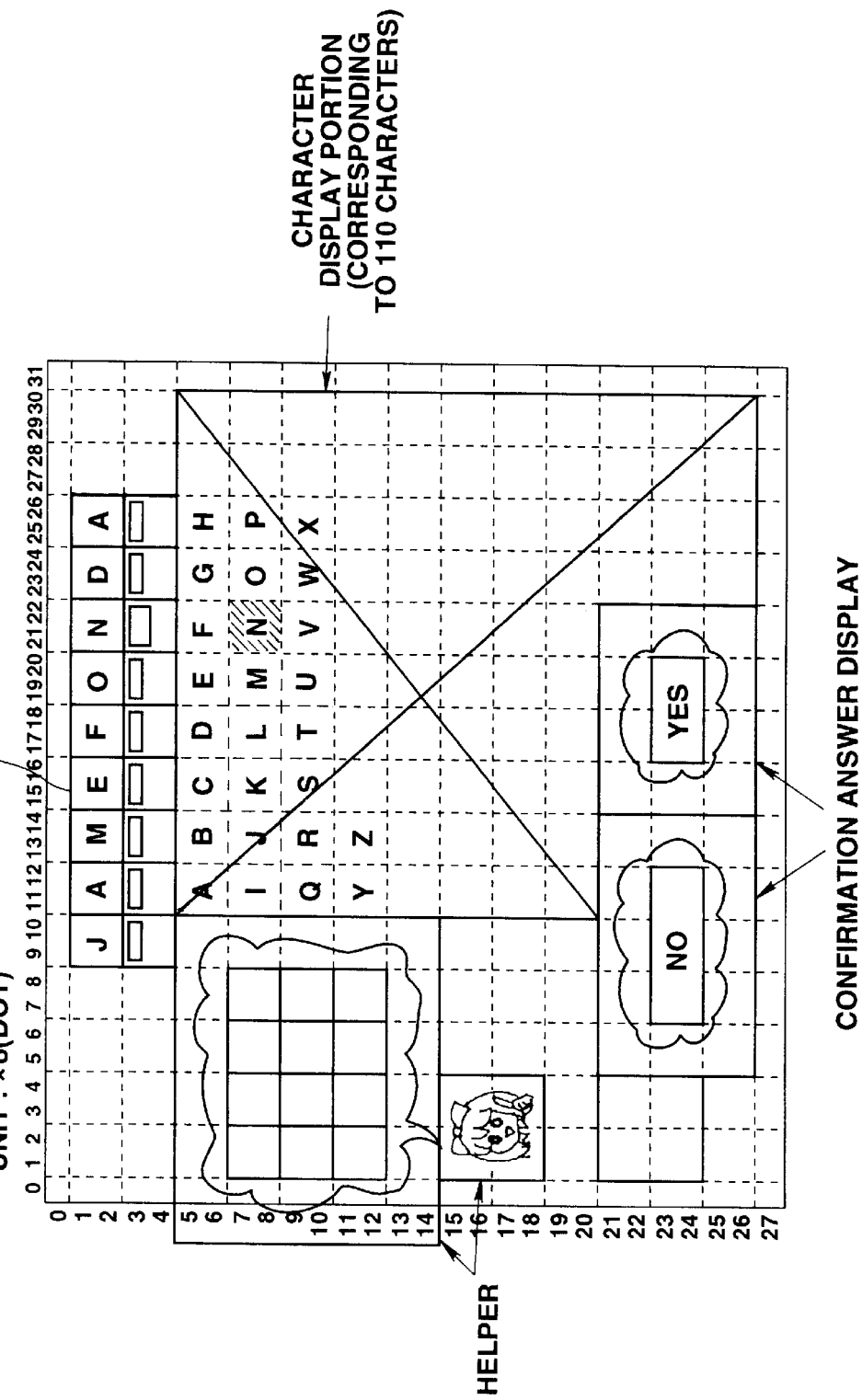
FIG. 43 is a layout view of a character input screen (No. 2)
Figure 48A:
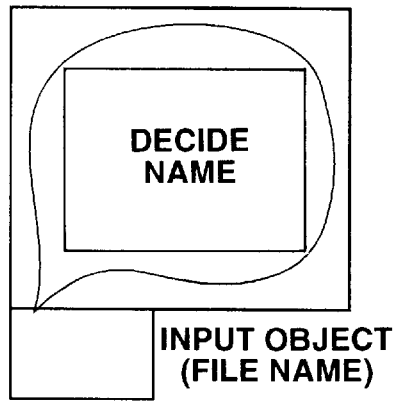
FIGS. 48A–48D are views showing the content of a balloon in a character input screen.
Figure 48B:
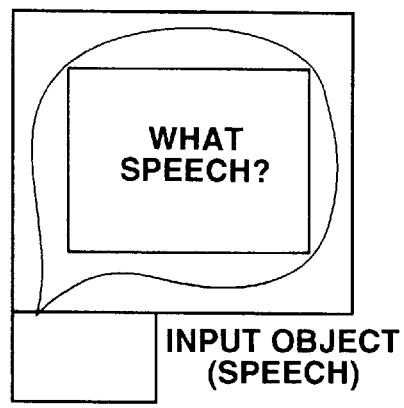

As the character input screen, as shown in FIG. 42 or 43, there are displayed a character display portion displaying characters corresponding to 110 characters, which are needed when the user selects the characters, a character input area displaying the characters input by the user, a helper, which is formed of a balloon displaying explanation and a picture of a doll, a return icon indicating the cancellation of the processing of the character input screen, and a confirmation answer display including display of "YES" and "NO." In a case where the icon "SAVE" on the basic system screen is selected to input the file name to be saved, and the character input screen is displayed, the content shown in FIG. 48A is displayed as an initial display of the balloon of the helper. On the other hand, in a case where the selection icon showing the preparation on the basic system screen is selected to input the speech, and the character input screen is displayed, the content shown in FIG. 48B is displayed as an initial display of the balloon of the helper. Also, the confirmation answer display of FIG. 43 is not displayed in the initial state.

If the user turns on the SEL switch 201 of FIG. 2, the result of the discrimination in step 2602 is YES. Then, in step 2603, the values, 1, 0, of the SEL register are alternately reversed.

In step 2604, it is discriminated whether or not the value of the SEL register is 1.

Figure 48C:
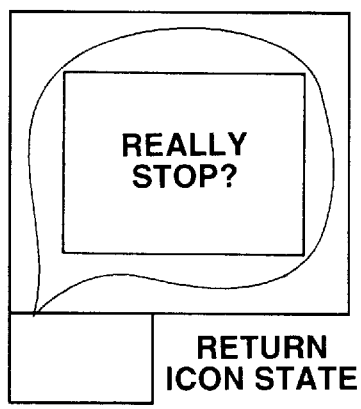

In a case where the value of the SEL register is 1 and the result of the discrimination in step 2604 is YES, and the ENTER switch 202 of FIG. 2 is not turned on, the return icon of FIG. 42 is emphatically displayed when the result of the discrimination in step 2605 is No and step 1901 is executed next. As the display of the balloon of the helper, the content shown in FIG. 48C is displayed. These operations are realized as an operation in which the CPU 301 transfers background image data, corresponding to the above display, to the storage area of the BG-A screen or the BG-B screen of the SRAM 303 through the VDP 302. On the other hand, in a case where the value of the SEL register is 0, the result of the discrimination in step 2604 is NO, and the up, down, right and left switches 203 to 206 of FIG. 2, and the ENTER switch 202 are not turned on, any one of characters of the character display portion of FIG. 42 is emphatically displayed when the result of the discrimination in each of steps 2617 and 2619 is No and step 2601 is executed next.

Also, in a case where the icon "SAVE" on the basic system screen is selected to input the file name to be saved, and the character input screen is displayed, the content shown in FIG. 48A is displayed as the display of the balloon of the helper. On the other hand, in a case where the selection icon showing the preparation on the basic system screen is selected to input the speech, and the character input screen is displayed, the content shown in FIG. 48B is displayed as an initial display of the balloon of the helper. These operations are realized as an operation in which the CPU 301 transfers background image data, corresponding to the above display, to the storage area of the BG-A screen or the BG-B screen of the SRAM 303 through the VDP 302.

As mentioned above, the user can alternately select the return icon and the character display portion every time when the user returns the SEL switch 201 on the character input screen.

When the return icon of FIG. 42 is emphatically displayed (the value of the SEL register is 1), the result of the discrimination in step 2605 is YES if the user turns on the ENTER switch 202 of FIG. 2. Then, in step 2606, the confirmation answer display including "YES" and "NO" is displayed (FIG. 43). The user can select whether or not the processing for the character input screen is canceled by selecting either "YES" or "NO." In this case, "NO" is emphatically displayed in the initial state. Moreover, the content shown in FIG. 48C is displayed as the display of the balloon of the helper. These operations are realized as an operation in which the CPU 301 transfers background image data, corresponding to the above display, to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 2607 to 2611 after step 2606.

In other words, if the user turns on the right switch 206 of FIG. 2 or the left switch 205 after the confirmation answer display is displayed, the result of the discrimination in step 2607 or 2609 is YES, either "YES" or "NO" is emphatically displayed in step 2608 or 2610. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 2611 is YES, and step 2612 is executed.

In step 2612, by referring to the register, it is discriminated which display of "YES" and "NO" is being emphatically displayed presently.

If it is discriminated that "NO" is emphatically displayed in step 2612, the confirmation answer display is erased in step 2613. Thereafter, the operation goes back to the processing of step 2601 in which the display is returned to the display of the character input screen.

If it is discriminated that "YES" is emphatically displayed in step 2612, input character data of the work RAM 308 of FIG. 3, which corresponds to the display content of the character input are of the character input screen of FIG. 42, is erased in step 2614. Then, the confirmation answer display is erased in step 2615. Thereafter, in step 2616, the operation goes back to the processing of the basic system screen (steps of FIG. 15, 1502→1501).

In a case where the user turns on any one of up, down, right and left switches 203 to 206 when any one of the characters of the character display portion of FIG. 42 is emphatically displayed (the value of SEL register is 0), the result of the discrimination in step 2627 of FIG. 27 is YES. Then, in step 2618, the character display portion to be emphatically displayed is changed to the character next to the character which is being emphatically displayed presently, in accordance with a direction of the turned-on switch. These operations are realized as an operation in which the CPU 301 transfers background image data, corresponding to the above display, to the storage area of the BG-A screen of the SRAM 303 through the VDP 302.

If the user turns on the ENTER switch 202 of FIG. 2 when any one of characters of the character display portion of FIG.42 is emphatically displayed, the result of the discrimination in step 2619 is YES. Then, if the ENTER switch 202 is turned on in step 2620, it is discriminated whether or not the character, which is emphatically displayed in the character display portion, is a character showing "END". The character showing "END" is a control character for instructing the end of the character input.

Figure 48D:
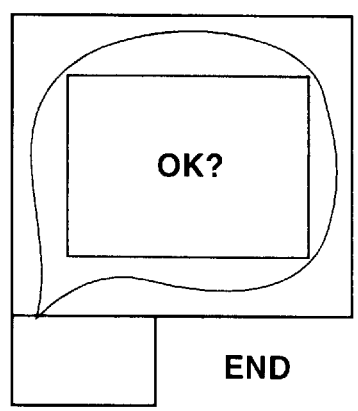

If the character, which is emphatically displayed in the character display portion, is not the character showing "END" when the ENTER switch 202 is turned on, and the result of the discrimination in step 2620 is NO, the confirmation answer display including "YES" and "NO" is displayed (FIG. 43). The user can select whether or not the character, which is emphatically displayed in the character display portion when the ENTER switch 202 is turned on, is used by selecting either "YES" or "NO." In this case, "YES" is emphatically displayed in the initial state. Moreover, the content shown in FIG. 48D is displayed as the display of the balloon of the helper. These operations are realized as an operation in which the CPU 301 transfers background image data, corresponding to the above display, to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 2635 to 2639 after step 2634.

In other words, if the user turns on the right switch 206 of FIG. 2 or the left switch 205 after the confirmation answer display is displayed, the result of the discrimination in step 2635 or 2637 is YES, either "YES" or "NO" is emphatically displayed in step 2636 or 2638. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 2639 is YES, and step 2640 is executed.

In step 2640, by referring to the register, it is discriminated which display of "YES" and "NO" is being emphatically displayed presently.

If it is discriminated that "YES" is emphatically displayed in step 2640, data corresponding to the character, which is emphatically displayed in the character display portion, is stored in step 2641. Then, the confirmation answer display is erased in 2642. Thereafter, the display is returned to the character input screen in step 2601. As a result, step 2601 is executed, and the newly input character is reflected on the character input area of FIG. 42.

If it is discriminated that "NO" is emphatically displayed in step 2612, step 2641 is not executed. After the confirmation answer display is erased in step 2642, the display is returned to the character input screen in step 2601.

On the other hand, if the character, which is emphatically displayed in the character display portion, is the character showing "END" when the ENTER switch 202 is turned on, and the result of the discrimination in step 2620 is YES, the confirmation answer display including "YES" and "NO" is displayed (FIG. 43) in step 2621 of FIG. 27. The user can select whether or not the character input is ended by selecting either "YES", or "NO." In this case, "YES" is emphatically displayed in the initial state. Moreover, the content shown in FIG. 48D is displayed as the display of the balloon of the helper. These operations are realized as an operation in which the CPU 301 transfers background image data, corresponding to the above display, to the storage area of the BG-A screen or the BG-B screen of the SRAM 303 through the VDP 302.

The selective operation including "YES" and "NO" and the decisive operation, which are performed by the user after the confirmation answer display is displayed, are detected in the repetition of steps 2622 to 2626 after step 2621.

In other words, if the user turns on the right switch 206 of FIG. 2 or the left switch 205 after the confirmation answer display is displayed, the result of the discrimination in step 2622 or 2624 is YES, either "YES" or "NO" is emphatically displayed in step 2623 or 2625. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 2626 is YES, and step 2627 is executed.

In step 2627, by referring to the register, it is discriminated which display of "YES" and "NO" is being emphatically displayed presently.

If it is discriminated that "NO" is emphatically displayed in step 2627, the confirmation answer display is erased in step 2628. Thereafter, the display is returned to the display of the character input screen in step 2601.

When it is discriminated that "YES" is emphatically displayed in step 2627, it is discriminated whether or not the present character input operation is used to input the file name to be saved in step 2629. This discrimination is realized as an operation for discriminating the content of the register (not shown). In other words, in a case where the user turns on the ENTER switch 202 of FIG. 2 to execute the processing of the character input screen for inputting the file name to be saved when the icon "SAVE" of the basic system screen of FIG. 41 is emphatically displayed, a flag showing a file save is set to the above register. On the other hand, in a case where the user turns on the ENTER switch 202 of FIG. 2 to execute the processing of the character input screen for preparing the speech of the balloon when the selection icon showing the preparation of the speech on the basic system screen is emphatically displayed, a flag showing a file save is not set to the above register. In step 2627, the content of the register is discriminated.

In a case where the present character input operation is used to input the file name to be saved, that is, the result of the discrimination in step 2627 is YES, input character data, which corresponds to the display content of the character input area of FIG. 42, is stored in the work RAM 308 as a save file name in step 2630. Thereafter, in step 2631, the operation goes to the processing of the file operation screen (step 1502 of FIG. 15→1503).

On the other hand, in a case where the present character input operation is used to prepare the speech of the balloon, the result of the discrimination in step 2627 is YES, input character data, which corresponds to the display content of the character input area of FIG. 42, is stored in the work RAM 308 as a speech in step 2632. Thereafter, in step 2633, the operation goes to the processing of the basic system screen (step 1504 of FIG. 15→1501). As a result, by the operation of the selection icon on the basic system screen of FIG. 41, the user can freely display the input speech as the balloon of the helper together with the portrait.

Processing Flow (SAVE) of File Operation Screen

The processing of the file operation screen, which is driven by the processing of step 2631 of FIG. 27, will be shown by the operation flow charts of FIGS. 19 to 21.

Figure 49A:
FIGS. 49A and 49B are views showing the content of an alarming column on the file operation screen.
Figure 49B:
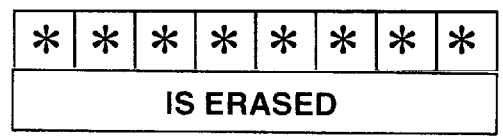

First, on the file operation screen of FIG. 40, the content shown in FIG. 49A is displayed on the alarm portion. In this display, the content of input character data, which is stored in the work RAM 308 as the save file name by the processing of step 2630 of FIG. 27, displayed in "* * * * * * * *." Also, the content shown in FIG. 46B is displayed as the initial display of the balloon of the helper. These operations are realized as the operation in which the CPU 301 transfers background image data corresponding to the above display to the storage area of BG-A screen or the BG-B screen of the SRAM 303 through the VDP 302.

When any one of the file icons #1 to #16 of FIG. 40 is emphatically displayed (the value of SEL register is 0) and the user turns on any one of up, down, right and left switches 203 to 206 of FIG. 2, the result of the discrimination in step 1917 of FIG. 20 is YES, the file icon to be emphatically displayed is changed from the file icon, which is being emphatically displayed presently, to the next file icon in accordance with a direction of the turned-on switch in step 1918. At the same time, the file number and the file name corresponding to the file icon number, which is newly emphatically displayed, are displayed on the present file number display area of FIG. 40 and the file name display area. These operations are realized as the operation in which the CPU 301 transfers background image data corresponding to the above display to the storage area of BG-A screen or the BG-B screen of the SRAM 303 through the VDP 302.

After the processing of step 1918, the result of the discrimination in step 1919 is NO, and steps 1933 of FIG. 21 to 1945 are executed.

First, in step 1933, the kind of the file corresponding to the file icon, which is being emphatically displayed presently, is discriminated. There are provided a present file and a normal file. The present file is a file of image data of the portrait, which is present in advance. The normal file is a file of image data of the portrait, which is prepared and saved by the user.

Figure 46F:
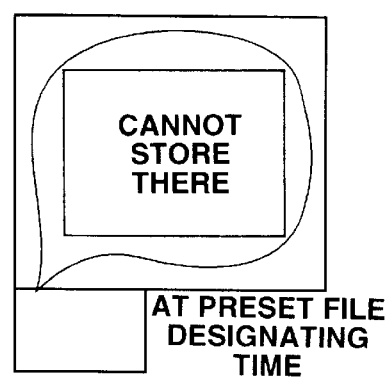

In a case where it is discriminated that the kind of the file corresponding to the file icon, which is being emphatically displayed presently, is the present file in step 1933, the display content of the balloon of the helper is changed to the display content shown in FIG. 46F in step 1934. Thereafter, the display is returned to the file operation screen of step 1919 of FIG. 19. This operation is realized as the operation in which the CPU 301 transfers background image data corresponding to the above display to the storage area of BG-A screen or the BG-B screen of the SRAM 303 through the VDP 302.

Figure 46G:
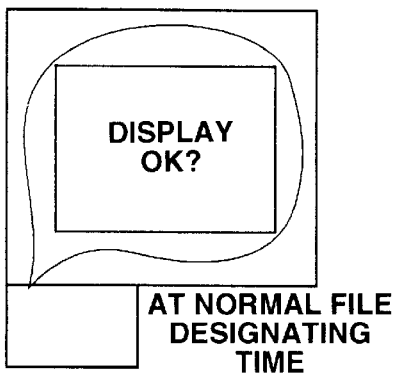

On the other hand, if it is discriminated that the kind of the file corresponding to the file icon, which is being emphatically displayed presently, is the normal file in step 1933, the display content of the balloon of the helper is changed to the display content shown in FIG. 46G in step 1935. Also, the display content of the alarm portion is changed to the display content shown in FIG. 49B. Thereafter, in step 1936, the confirmation answer display including "YES" or "NO" is displayed. The user can select whether the save operation of the file is executed or canceled by selecting either "YES" or "NO." In this case, "YES" is emphatically displayed in the initial state. These operations are realized as the operation in which the CPU 301 transfers background image data corresponding to the above display to the storage area of BG-A screen or the BG-B screen of the SRAM 303 through the VDP 302.

The selective operation including "YES" and "NO" and the decisive operation, which are performed by the user after the confirmation answer display is displayed, are detected in the repetition of steps 1937 to 1941 after step 1936.

In other words, if the user turns on the right switch 206 of FIG. 2 or the left switch 205 after the confirmation answer display is displayed, the result of the discrimination in step 1937 or 1939 is YES, either "YES" or "NO" is emphatically displayed in step 1938 or 1940. These operations are realized as an operation in which the CPU 301 transfers background image data, corresponding to each of the above displays, to the storage area of the BG-A screen or the BG-B screen of the SRAM 303 through the VDP 302. In this case, data, showing which display of "YES" and "NO" is being emphatically displayed presently, is set in the register (not shown).

If the user turns on the ENTER switch 202 of FIG. 2 in the state that the confirmation answer display is displayed, the result of the discrimination in step 1941 is YES, and step 1942 is executed.

In step 1942, by referring to the register, it is discriminated which display of "YES" and "NO" is being emphatically displayed presently.

If it is discriminated that "NO" is emphatically displayed in step 1942, the confirmation answer display is erased in step 1943. Thereafter, the operation is returned to the processing of step 1901 of FIG. 19 in which the display is back to the display of the file operation screen.

When it is discriminated that "YES" is emphatically displayed in step 1942, image data of the portraits, which are prepared so far, and coordinate data are saved in the work RAM 308 of FIG. 3 as a file of image data of the portrait corresponding to the selected file icon, which is being emphatically displayed. In this case, image data of the portraits are stored in each of the storage areas (FIGS. 7 and 8) of SRAM 303 and DP-RAM 304 of FIG. 3 and displayed together with the basic system screen of FIG. 41. Moreover, coordinate data is stored in the object attribute memory section 407 of the VDP 302 of FIG. 4.

Thereafter, the operation moves to the processing of the basic system screen (step 1945). The movement from step 1944 to step 1945 corresponds to the movement from step 1503 to step 1501.

Processing Flow of Print

Figure 29:
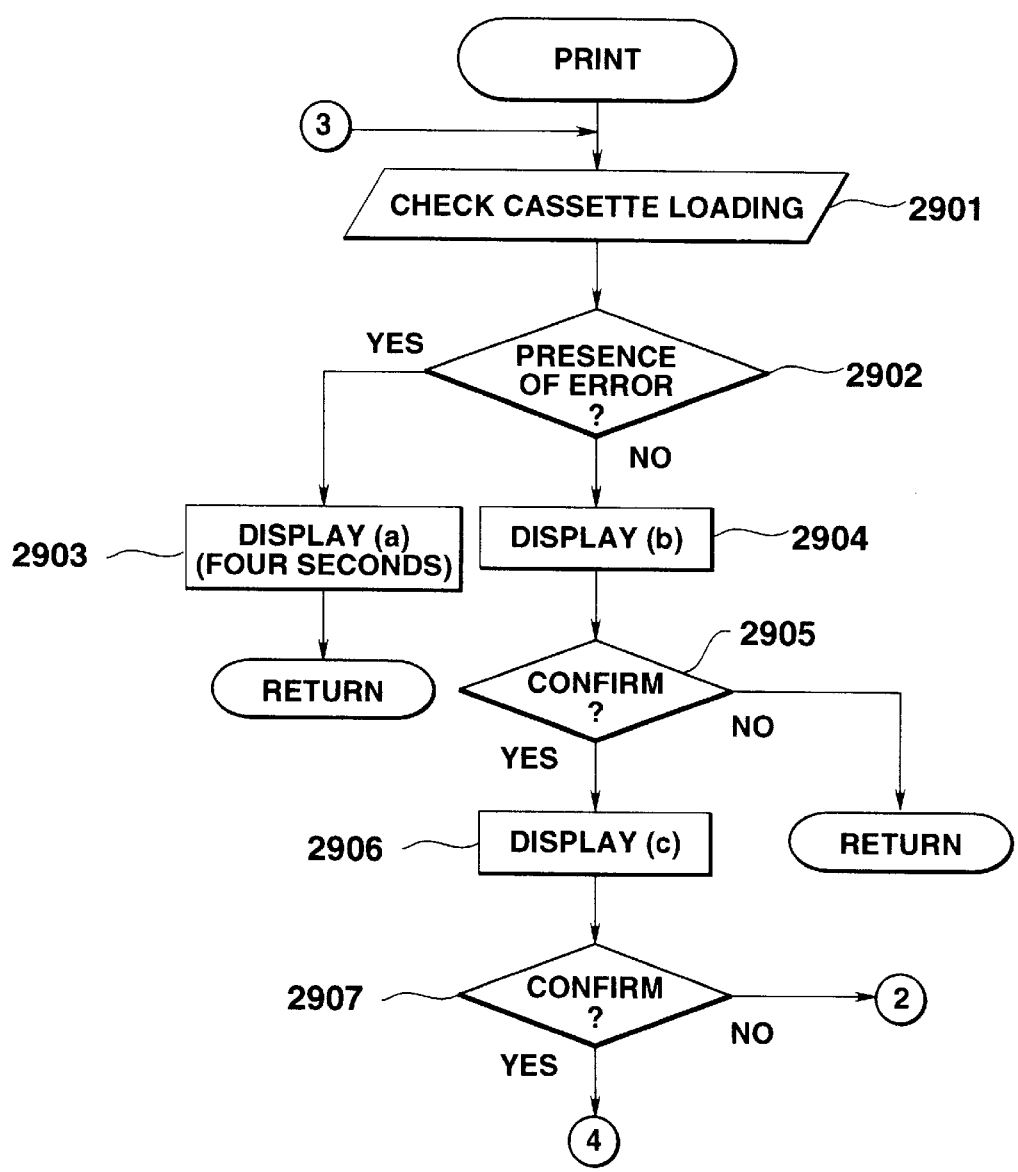
FIG. 29 is a flow chart of a general printing processing (No. 1)
Figure 30:
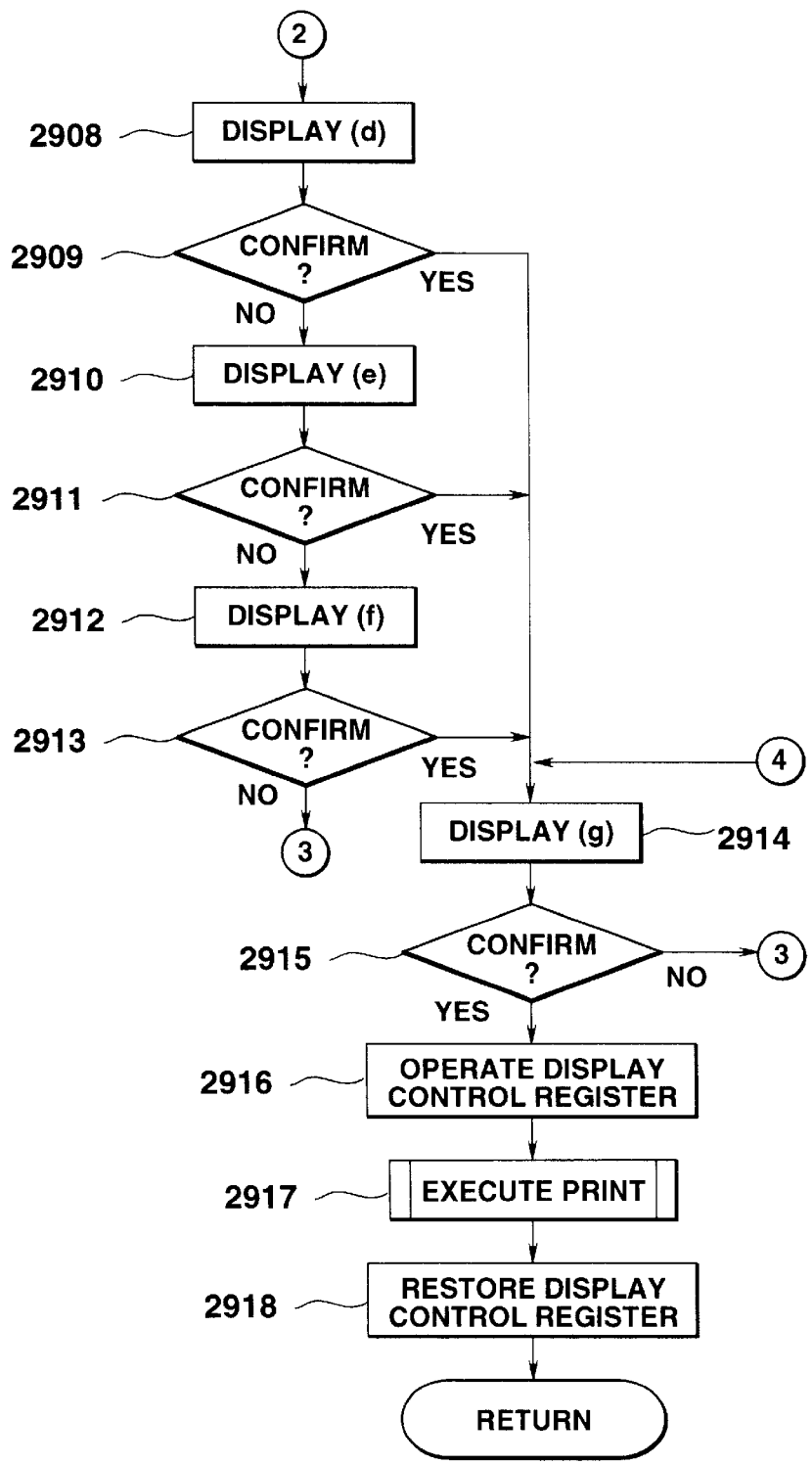
FIG. 30 is a flow chart of a general printing processing (No. 2)

FIGS. 29 and 30 are flow charts showing print processing to be executed on the basic system screen. If the user turns on the ENTER switch 202 of FIG. 2 when the icon "PRINT START" is emphatically displayed on the basic system screen of FIG. 41, the print processing is executed in step 2215 of FIG. 22. In this print processing, only the portrait image is printed in a state that the icon of the basic system screen is erased.

First, in step 2901 of FIG. 29, it is checked whether or not a cassette of printing paper is loaded on the cassette section 101 (main body) (FIG. 1).

Figure 50A:
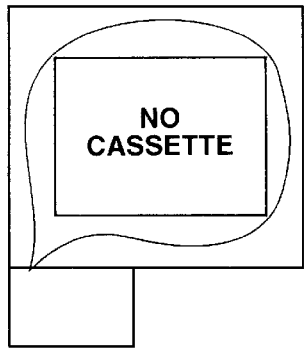
FIGS. 50A–50F are views showing the content of a balloon in a print processing (No. 1)

As a result, in a case where an error is generated, the result of the discrimination in step 2902 is YES. Then, in step 2903, on the basic system screen of FIG. 41, there is displayed the balloon of the helper having the display content of FIG. 50A showing the cassette is not loaded for only four seconds. Thereafter, the print processing of the step 2215 of FIG. 22 is ended, and the display is returned to the display of the basic system screen of step 2201 of FIG. 22.

Figure 50B:

In a case where no error is generated, the result of the discrimination in step 2902 is NO. Then, in step 2904, on the basic system screen of FIG. 41, there is displayed the balloon of the helper having the display content of FIG. 50B showing the print start. Thereafter, the confirmation answer display including "YES" and "NO" is displayed on the basic system screen of FIG. 41 to urge the user to perform the selection. The above processing is the same as the series of processing of steps 2233 to 2239 of FIG. 24. The user can change the emphatic display between "YES" and "NO" by the right switch 206 or the left switch 205, and select the confirmation answer "YES" or "NO" by the ENTER switch 202 of FIG. 2.

If the user turns on the ENTER switch 202 when the balloon of the helper of FIG. 50B showing the print start is displayed and "NO" of the confirmation answer display is emphatically displayed, the print processing of step 2215 of FIG. 22 is ended, the display goes back to the display of the basic system screen of step 2201 of FIG. 22.

Figure 50C:

On the other hand, if the user turns on the ENTER switch 202 when the balloon of the helper of FIG. 50B showing the print start is displayed and "YES" of the confirmation answer display is emphatically displayed, there is displayed the balloon of the helper having the display content of FIG. 50C for confirming a normal multiple print (one time) on the basic system screen of FIG. 41 in step 2906. Thereafter, in step 2907, the confirmation answer display including "YES" and "NO" is displayed on the basic system screen of FIG. 41 to urge the user to perform the selection.

Figure 50D:
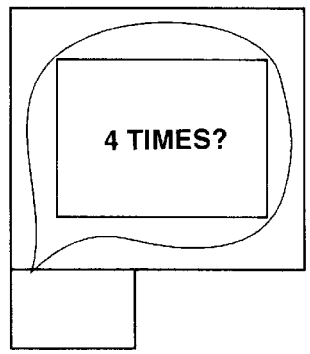

If the user turns on the ENTER switch 202 when the balloon of the helper of FIG. 50C for confirming the normal multiple print is displayed, and "NO" of the confirmation answer display is emphatically displayed, the balloon of the helper having the display content of FIG. 50D for confirming confirming a print of 4 times is displayed in step 2908. Thereafter, in step 2909, the confirmation answer display including "YES" and "NO" is displayed on the basic system screen of FIG. 41 to urge the user to perform the selection.

Figure 50E:
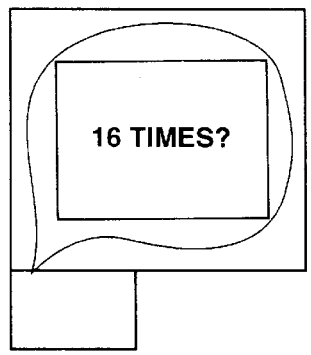

If the user turns on the ENTER switch 202 when the balloon of the helper of FIG. 50D for confirming the print of 4 times is displayed, and "NO" of the confirmation answer display is emphatically displayed, the balloon of the helper having the display content of FIG. 50E for confirming a print of 16 times is displayed in step 2910. Thereafter, in step 2911, the confirmation answer display including "YES" and "NO" is displayed on the basic system screen of FIG. 41 to urge the user to perform the selection.

Figure 50F:
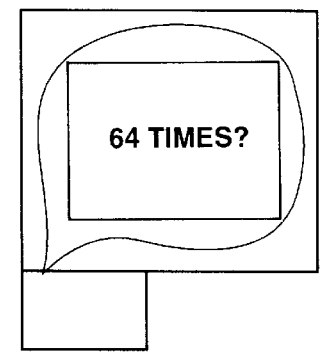

If the user turns on the ENTER switch 202 when the balloon of the helper of FIG. 50E for confirming the print of 16 times is displayed, and "NO" of the confirmation answer display is emphatically displayed, the balloon of the helper having the display content of FIG. 50F for confirming a print of 64 times is displayed in step 2912. Thereafter, in step 2913, the confirmation answer display including "YES" and "NO" is displayed on the basic system screen of FIG. 41 to urge the user to perform the selection.

If the user turns on the ENTER switch 202 when the balloon of the helper of FIG. 50F for confirming the print of 64 times is displayed, and "NO" of the confirmation answer display is emphatically displayed, the operation is returned to the processing of step 2909 of FIG. 29.

Figure 51A:
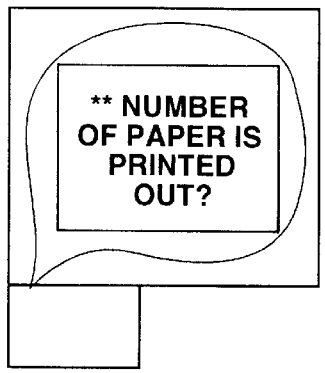
FIGS. 51A–51E are views showing the content of a balloon in a print processing (No. 2)
Figure 51B:
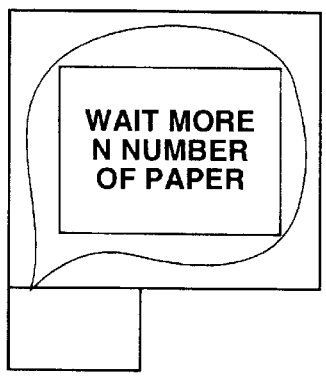

If the user turns on the ENTER switch 202 when "YES" is emphatically displayed in the confirmation answer display of any one of steps 2907 of FIG. 29, 2909, 2911, or 2929 of FIG. 30 to confirm the print of each multiple, there is displayed the balloon of the helper showing the display content of FIG. 51A showing a number of paper * *, which corresponds to the print of each multiple, is printed. The number of paper * * is one in the case of the normal multiple print, 4 in the case of the print of 4 times, 16 in the case of the print of 16 times, and 64 in the case of the print of 64 times, respectively. Thereafter, in step 2915, the confirmation answer display including "YES" and "NO" is displayed on the basic system screen of FIG. 41 to urge the user to perform the selection. In this case, the number of paper * *, which corresponds to the print of each multiple, is maintained in the register (not shown) as a value n.

If the user turns on the ENTER switch 202 when the balloon of the helper of FIG. 51A, which shows that the number of paper * * corresponding to the print of each multiple is printed, is displayed, and "NO" is emphatically displayed in the confirmation answer display, the operation is returned to the processing of step 2901 of FIG. 29.

On the other hand, if the user turns on the ENTER switch 202 when the balloon of the helper of FIG. 51A, which shows that the number of paper * * corresponding to the print of each multiple is printed, is displayed, and "YES" is emphatically displayed in the confirmation answer display, a value "0" is set to a bit position 1 in step 2916. The bit position 1 corresponds to the BG-B screen of a display control register (not shown) of the VDP 302 having a data format of FIG. 10. As a result, in a state that the icons forming the basic system screen is erased in a screen extraction processing to be described later, only image data of the portrait is extracted to be printed.

Sequentially, in step 2917, a print execution processing, which is shown by the operation flow charts of FIGS. 31 to 33 to be described later, is started.

If the print execution processing is ended, the value of the bit position 1, which corresponds to the BG-B screen of the above display control register, is restored to "1." As a result, the display of the icons forming the basic system screen on the display screen is restored.

After the processing of step 2918, the display is returned to the basic system screen of step 2201 of FIG. 22.

Figure 31:
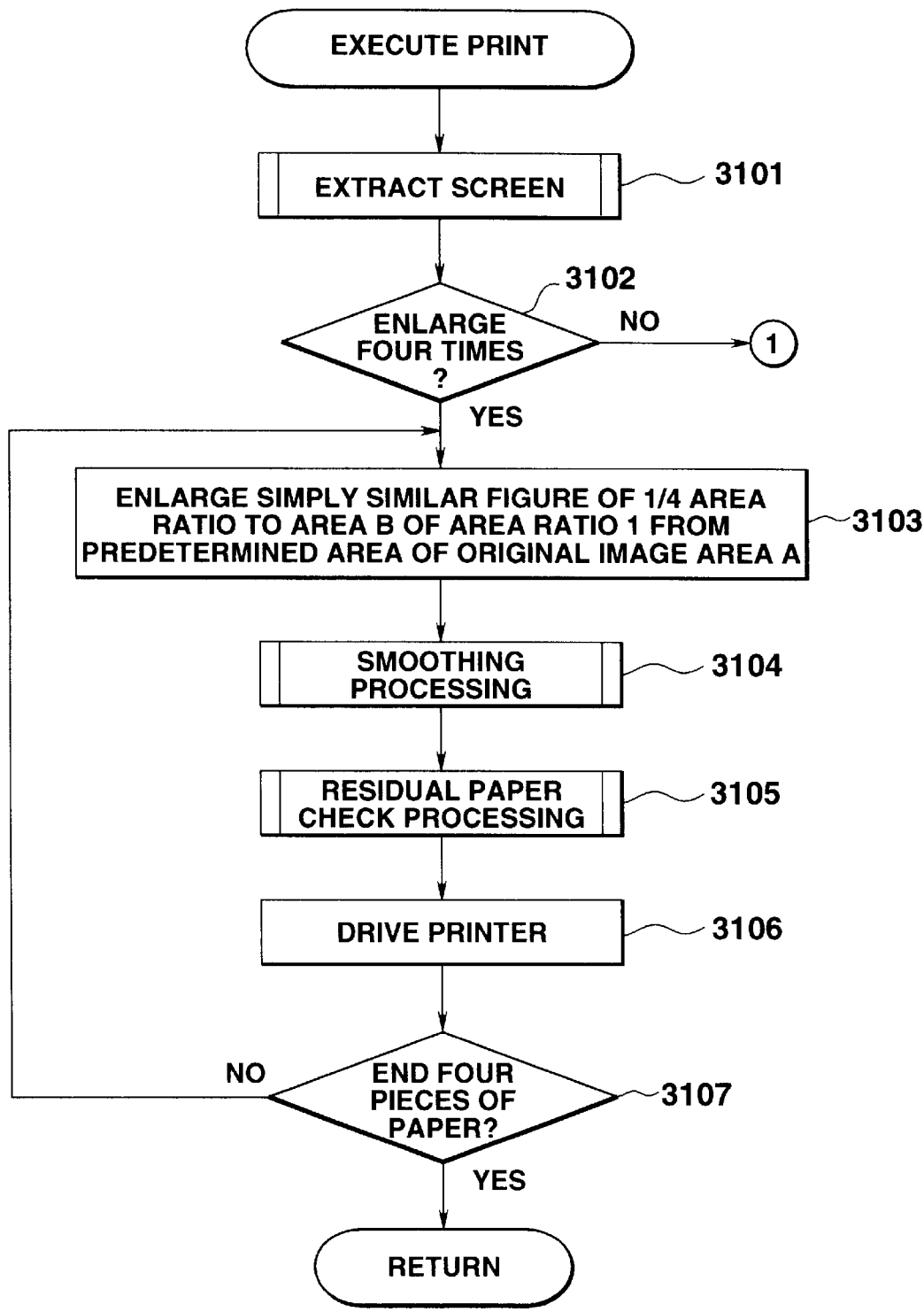
FIG. 31 is a flow chart of an operation of a print execution processing (NO. 1)
Figure 32:
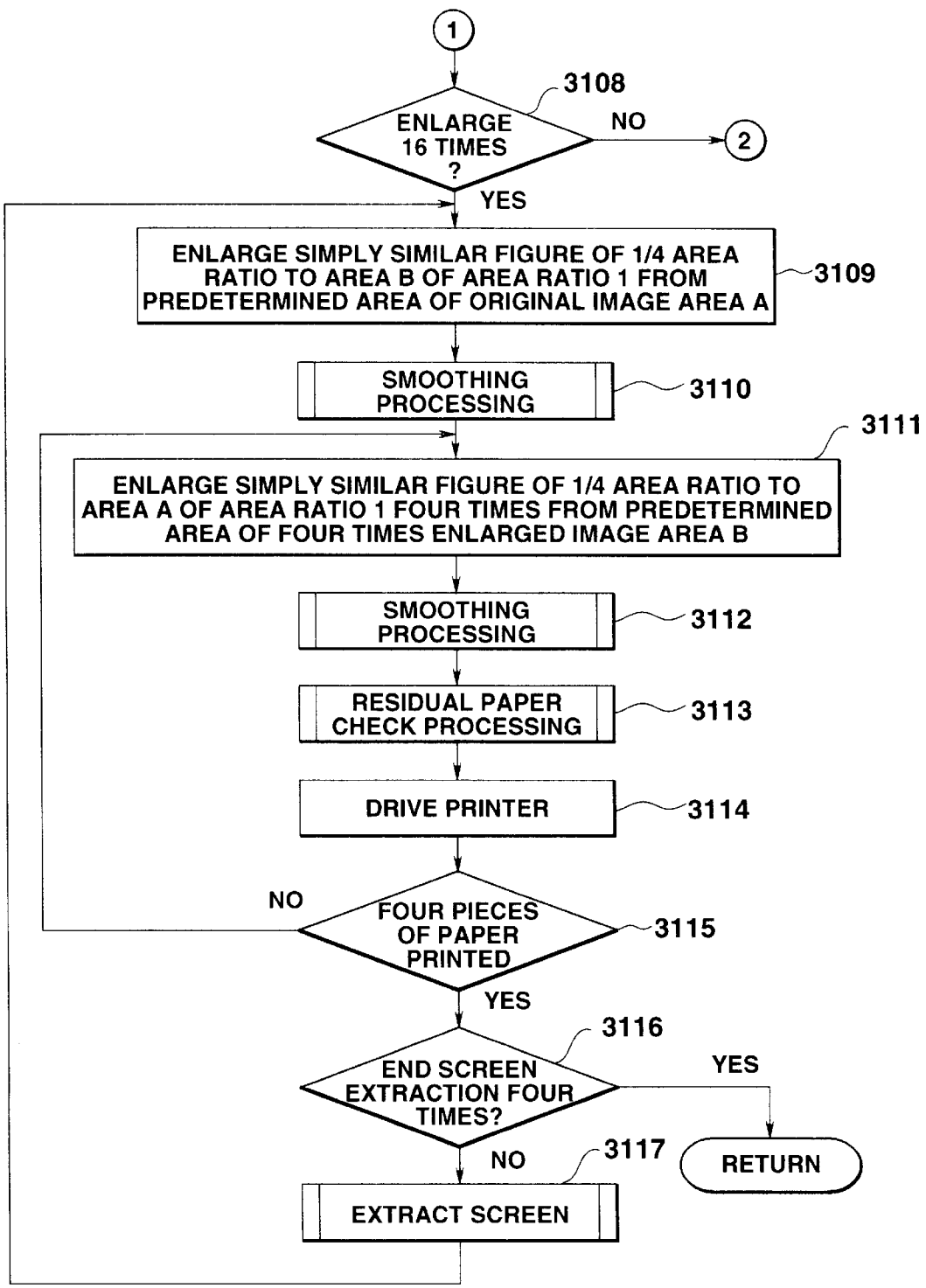
FIG. 32 is a flow chart of an operation of a print execution processing (NO. 2)
Figure 33:
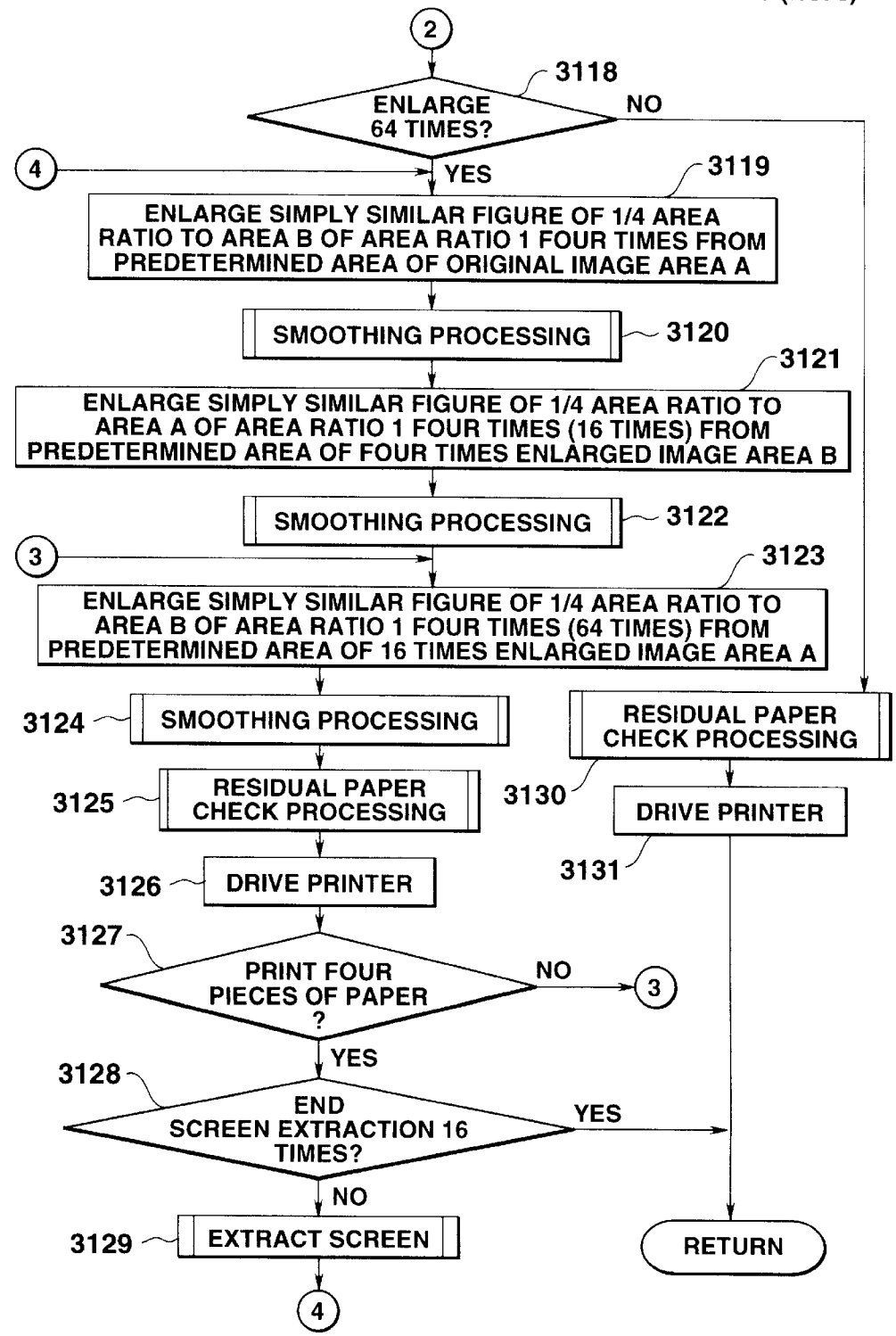
FIG. 33 is a flow chart of an operation of a print execution processing (NO. 3)

FIGS. 31 to 33 are the operation flow charts of the print execution processing to be executed in step 2917 of FIG. 29.

First, in step 311, the screen extraction processing is executed. The details of the processing will be described later with reference to the operation flow chart of FIG. 35. By executing the processing, RGB digital data for one screen to be displayed on TV 311 of FIG. 3, which is output from the color-lookup table section 409 shown in FIG. 4 of the VDP (FIG. 3), is transferred to the original image area A of the work RAM 308 through the RGB buffer section 415 shown in FIG. 4 of the VDP 302 (FIG. 3).

In the above-mentioned print processing, the user turns on the ENTER switch 202 of FIG. 2 when "YES" is emphatically displayed in the confirmation answer display of step 2907 of FIG. 29. Thereby, in a case where the normal multiple print is designated, the result of the discrimination of each of steps 3102 of FIG. 31, step 3108 of FIG. 32, and step 3118 of FIG. 33 is NO, and steps 3130 and 3131 are executed.

First, in step 3130, a residual paper check processing is executed. The details of this processing will be described later with reference to the operation flow chart of FIG. 34.

In a case where the result of the check of the residual paper check processing is OK, the printer section 312 of FIG. 3 is actually driven in step 3131, and an image for one screen, which is transferred to the original image area A of the work RAM 308 of FIG. 8 and which is displayed on the present TV 311, is printed on one paper.

Thereafter, the print execution processing of step 2917 of FIG. 30 is ended.

In the above-mentioned print processing, the user turns on the ENTER switch 202 of FIG. 2 when "YES" is emphatically displayed in the confirmation answer display of step 2909 of FIG. 30. Thereby, in a case where the print of 4 times is designated, the screen extraction processing is executed in step 3101 of FIG. 31. Thereafter, the result of the discrimination of step 3102 is YES, and steps 3103 to 3107 are executed.

First, in step 3103, image data is transferred to an image area B having a storage capacity corresponding to one screen of the work RAM 308 from one of four areas, which are obtained by equally dividing the original image area A of the work RAM 308. In this case, image data is transferred to the image area B as being enlarged four times.

Next, in step 3104, a predetermined smoothing processing is provided to image data transferred to the image area B. The explanation of this smoothing processing is omitted since it is not particularly relevant to the present invention. However, in the image, which is expressed based on image data on the image area B, the smoothing processing is executed to amend a stepwise oblique portion due to the enlargement.

Sequentially, in step 3105, the residual paper check processing is executed. The details of this processing will be described later with reference to the operation flow chart of FIG. 34.

In a case where the result of the check of the residual paper check processing is OK, the printer section 312 of FIG. 3 is actually driven in step 3106, and the ¼ area of the image for one screen, which is transferred to the image area B of the work RAM 308 of FIG. 8 and which is displayed on the present TV 311, is enlarged four times to be printed on one paper.

Thereafter, in step 3107, it is discriminated whether or not the printing to four papers is ended. If the result of the discrimination is NO, the operation goes back to step 3103. Then, regarding the other one of four areas, which are obtained by equally dividing the original image area A of the work RAM 308, the processings of the above-mentioned steps 3103 to 3106 are repeated.

By repeating the above printing operation four times, the image corresponding to one screen, which is displayed on the present TV 311, is enlarged four times to be printed on four papers.

Thereafter, if the result of the discrimination of step 3107 is YES, the print execution processing of step 2917 of FIG. 30 is ended.

In the above-mentioned print processing, the user turns on the ENTER switch 202 of FIG. 2 when "YES" is emphatically displayed in the confirmation answer display of step 2911 of FIG. 30. Thereby, in a case where the print of 16 times is designated, the screen extraction processing is executed in step 3101 of FIG. 31. Thereafter, the result of the discrimination of step 3102 is YES, the result of the discrimination of step 3108 is YES, and steps 3109 to 3117 are executed.

First, in step 3109, image data is transferred to the image area B from one of four areas, which are obtained by equally dividing the original image area A. In this case, image data is transferred to the image area B as being enlarged four times.

Next, in step 3110, the same smoothing processing as the processing of step 3104 of FIG. 31 is provided to image data transferred to the image area B.

Sequentially, in steps 3111 to 3115, similar to the operation of the print of 4 times of steps 3103 to 3107 of FIG. 31, as using the image area A where the original image is stored, image data is transferred to the image area B from each of four areas, which are obtained by equally dividing the original image area A. In this case, image data is transferred to the image area B as being enlarged four times. Then, the printing operation is repeated four times. Thereby, four areas of 16 areas of the image corresponding to one screen, which is displayed on the present TV 311, are enlarged 16 times to be printed on four papers.

If the repeating processing of steps 3111 to 3115 is ended four times, it is discriminated whether or not the screen extraction processing is already ended four times in step 3116.

If the result of the discrimination of step 3116 is NO, in step 3117, there is executed the screen extraction processing in which RGB digital data for one screen is transferred again to the original image area A of the work RAM 308 from the VDP 302 of FIG. 3.

Thereafter, in step 3109, image data is transferred to the image area B from one of the other four unprocessed areas, which are obtained by equally dividing the original image area A. In this case, image data is transferred to the image area B as being simply enlarged four times. Thereafter, the above-mentioned processing of steps 3110 to 3115 is executed again. Thereby, another four areas of 16 areas of the image corresponding to one screen, which is displayed on the present TV 311, are enlarged 16 times to be printed on four papers.

The above-mentioned processing of steps 3109 to 3117 is repeated until it is discriminated whether or not the screen extraction processing is ended four times in step 3116. Thereby, the image for one screen displayed on the present TV 311 is enlarged 16 times to be printed on 16 papers.

In the above-mentioned print processing, the user turns on the ENTER switch 202 of FIG. 2 when "YES" is emphatically displayed in the confirmation answer display of step 2913 of FIG. 30. Thereby, in a case where the print of 64 times is designated, the screen extraction processing is executed in step 3101 of FIG. 31. Thereafter, the result of the discrimination of each of step 3102 of FIG. 31 and step 3108 of FIG. 32 is NO, the result of the discrimination of step 3118 is YES, and steps 3119 to 3129 are executed.

First, in step 3119, image data is transferred to the image area B from one of four areas, which are obtained by equally dividing the original image area A. In this case, image data is transferred to the image area B as being enlarged four times.

Next, in step 3120, the same smoothing processing as the processing of step 3104 of FIG. 31 is provided to image data transferred to the image area B.

Then, in step 3121, image data is simply enlarged four times and transferred to the image area A to which the original image is stored so far from one of four areas, which are obtained by equally dividing the image area B.

Moreover, in step 3122, the same smoothing processing as the processing of step 3104 of FIG. 31 is provided to image data transferred to the image area A.

Sequentially, in steps 3123 to 3127, similar to the operation of the print of 4 times of steps 3103 to 3107 of FIG. 31, image data is transferred to the image area B from each of four areas, which are obtained by equally dividing the original image area A. In this case, image data is transferred to the image area B as being enlarged four times. Then, the printing operation is repeated four times. Thereby, four areas of 64 areas of the image corresponding to one screen, which is displayed on the present TV 311, are enlarged 64 times to be printed on four papers.

If the repeating processing of steps 3123 to 3127 is ended four times, it is discriminated whether or not the screen extraction processing is already ended 16 times in step 3128.

If the result of the discrimination of step 3128 is NO, in step 3129, there is executed the screen extraction processing in which RGB digital data for one screen is transferred again to the original image area A of the work RAM 308 from the VDP 302 of FIG. 3.

Thereafter, in step 3119, image data is transferred to the image area B from one of the other unprocessed areas, which are obtained by equally dividing the original image area A. In this case, image data is transferred to the image area B as being simply enlarged four times. Thereafter, the smoothing processing is provided to image data in step 3112. Sequentially, in step 3121, image data is simply enlarged four times and transferred to the image area A to which the original image is stored so far from one of the other unprocessed areas, which are obtained by equally dividing the original image area B. Then, the smoothing processing is provided to image data in step 3121. Thereafter, the processing of steps 3123 to 3127 is executed again. Thereby, another four areas of 64 areas of the image corresponding to one screen, which is displayed on the present TV 311, are enlarged 64 times to be printed on four papers.

The above-mentioned processing of steps 3119 to 3129 is repeated 16 times until it is discriminated whether or not the screen extraction processing is ended 16 times in step 3116. Thereby, the image for one screen displayed on the present TV 311 is enlarged 64 times to be printed on 64 papers.

As mentioned above, in this embodiment, the print processing is repeated as image data is alternatively transferring between two image areas each having the storage area for one image of the work RAM 308. Thereby, the enlarged print of the multiplier of 2 can be efficiently executed with a small amount of memories.

Figure 34:
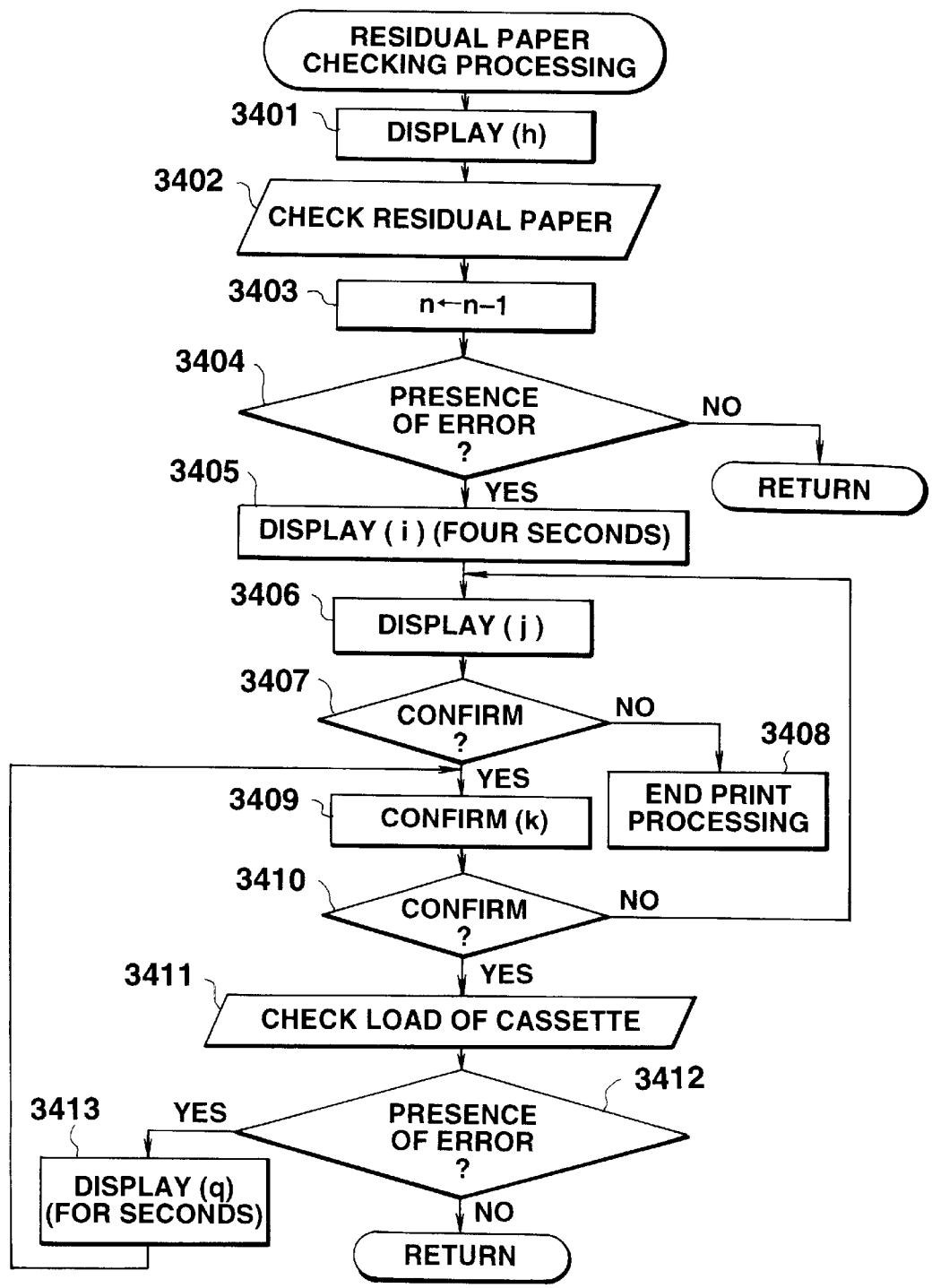
FIG. 34 is a flow chart of an operation of a residual paper checking processing.

FIG. 34 is the operation flow chart of the residual check processing as executed as step 3105 of FIG. 31, step 3113 of FIG. 32, 3125 of FIG. 33, or step 3130 of FIG. 33.

In FIG. 34, the balloon of the helper of FIG. 51A is displayed. Also, on the basic system screen of FIG. 41, there is displayed the display content of FIG. 51B including a value n in which the number of paper **\*\***, which corresponds to each multiple number, is maintained as an initial value in the register (not shown) as the balloon of the helper.

Then, in step 3402, the number of residual paper of paper cassette is checked.

Sequentially, in step 3403, the value n of the register is decremented.

In step 3404, it is discriminated whether or not an error is generated as the result of the processing of step 3402.

As a result, if it is discriminated that no error is generated, the residual paper check of FIG. 34 is ended.

Figure 51C:
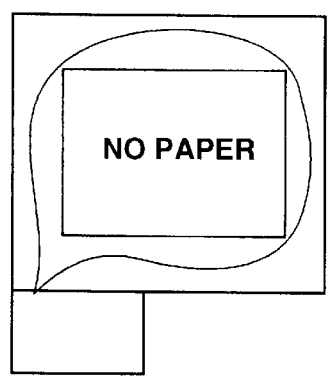

On the other hand, if it is discriminated that the error is generated in step 3404, the balloon of the helper having the display content of FIG. 51C showing no paper is displayed on the basic screen content of FIG. 41 for, e.g., only four seconds in step 3405. Moreover, the balloon of the helper having the display content of FIG. 51D asking whether or not the paper cassette is replaced with a new one is displayed thereon. Thereafter, in step 2907, the confirmation answer display including "YES" and "NO" is displayed on the basic system screen of FIG. 41 to urge the user to perform the selection.

Figure 51D:
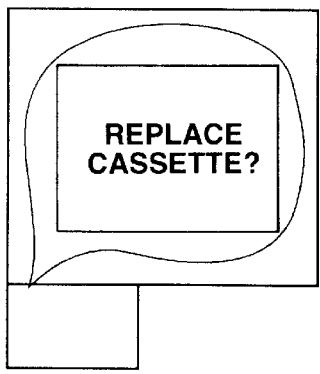

If the balloon of the helper of FIG. 51D is displayed and the user turns on the ENTER switch 202 of FIG. 2 when "NO" is emphatically displayed in the confirmation answer display, the print processing of step 2215 of FIG. 22 is ended in step 3408, and the display is returned to the display of the basic system screen of step 2201 of FIG. 22.

Figure 51E:
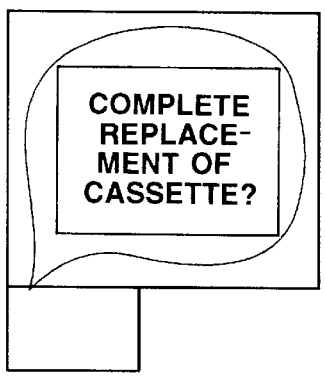

If the balloon of the helper of FIG. 51D is displayed and the user turns on the ENTER switch 202 of FIG. 2 when "YES" is emphatically displayed in the confirmation answer display, the balloon of the helper having the display content of FIG. 51E confirming the end of the replacement of the paper cassette is displayed in step 3409. Thereafter, in step 3410, the confirmation answer display including "YES" and "NO" is displayed on the basic system screen of FIG. 41 to urge the user to perform the selection.

If the balloon of the helper of FIG. 51E is displayed and the user turns on the ENTER switch 202 of FIG. 2 when "NO" is emphatically displayed in the confirmation answer display, the operation is returned to the display processing of step 3406.

If the balloon of the helper of FIG. 51E is displayed and the user turns on the ENTER switch 202 of FIG. 2 when "YES" is emphatically displayed in the confirmation answer display, it is checked whether or not the paper cassette is loaded on the cassette section 101 (FIG. 1) in step 3411.

As a result, if the error is not generated, the result of the discrimination of step 3412 is NO, and the residual paper check processing is ended.

On the other hand, if the error is generated, the result of the discrimination of step 3412 is YES, the balloon of the helper having the display content of FIG. 50A showing no cassette is loaded on the basic screen content of FIG. 41 for, e.g., only four seconds in step 3413. Thereafter, the operation goes back to the display processing of step 3409.

Figure 35:
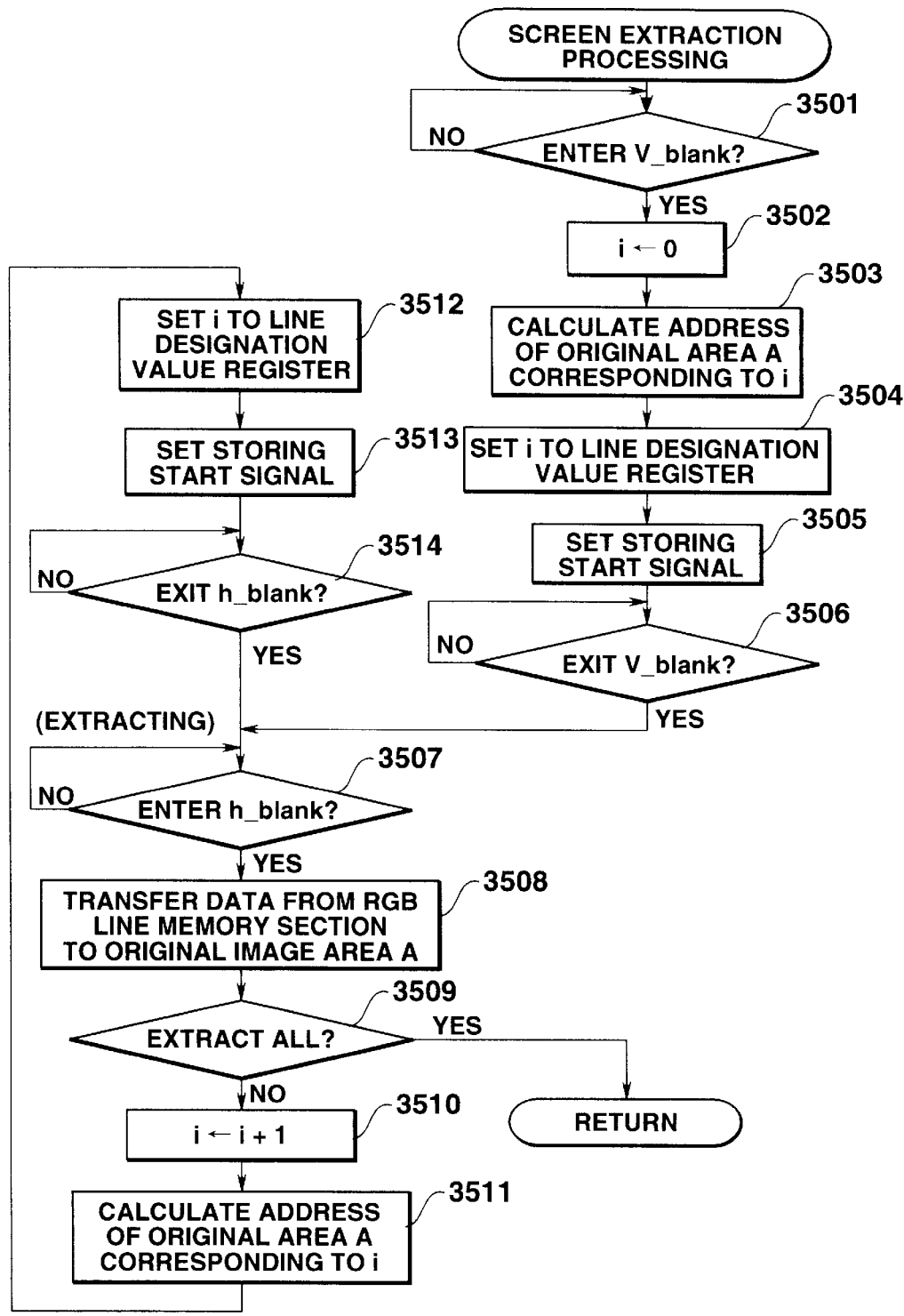
FIG. 35 is a flow chart of an operation of a screen extraction processing.

FIG. 35 is the operation flow chart of the screen extraction processing executed by the CPU 301 of FIG. 3 as step 3102 of FIG. 31, step 3117 of FIG. 32, and step 3129 of FIG. 33. RGB digital data for one screen to be displayed on TV 311 of FIG. 3, which is output from the color-lookup table section 409 shown in FIG. 4 of the VDP (FIG. 3), is transferred to the original image area A of the work RAM 308 through the RGB buffer section 415 shown in FIG. 4 of the VDP 302 (FIG. 3). In this case, the RGB buffer section 415 has a capacity for storing RGB digital data output from the color-lookup table section 409 by one line (256 dots) of the display screen of the TV 311 of FIG. 3.

In step 3501, it is discriminated whether or not screen display timing enters a vertical blank period (v#blank). Then, until the result of the discrimination is YES, the operation is kept in a standby state. The discrimination is realized as an operation for monitoring that the value of a vertical synch counter value 1211 output externally from the decoder section 413 of the VDP 302 of FIG. 4 is changed from the value corresponding to the vertical display period to the vertical blank period (FIG. 11).

After the result of the discrimination of step 3501, steps 3502 to 3505 are executed for the vertical blank period.

In step 3502, the value "i", which is set to the register (not shown), is reset to 0. The value "i" designates the line position of the screen where the transfer processing is performed, and corresponds to the vertical synch counter value 1211 of the vertical display period. Therefore, the initial value 0 of the register value "i", which is set in step 3502, designates the first line of the screen.

In step 3503, the address of the original image area A of the work RAM 308, which corresponds to the register value "i" is calculated. The calculated value of this case is the head address of the original image area A.

In step 3504, the register value "i"=0 is set to a line designation value register 1213 of FIG. 12, which is set in the RGB buffer section 415 of FIG. 4 through the CPU interface section 401 of FIG. 4 provided in the VDP 302 of FIG. 3.

Also, in step 3505, a storing start signal 1203 of FIG. 12 is set to an address control section 1202 of FIG. 21, which is provided in the RGB buffer section 415 of FIG. 4, from the CPU 301 of FIG. 3 through the CPU interface section 401 of FIG. 4 provided in the VDP 302 of FIG. 3.

Thereafter, in step 3506, it is discriminated whether or not the screen display timing is out of the vertical blank period. Then, until the result of the discrimination is YES, the operation is kept in a standby state in step 3506.

After the result of the discrimination of step 3506 is YES, it is discriminated whether or not screen display timing enters a vertical blank period (h#blank) between the first and second lines in step 3507. Then, until the result of the discrimination is YES, the operation is kept in a standby state in step 3507.

During the period of the standby state, the following processing is executed in the RGB buffer 415 of FIG. 4 having the structure of FIG. 12 provided in the VDP 302 of FIG. 3. In other words, in FIG. 12, the address control section 1202 receives the storing start signal 1203 from the CPU 301. Thereafter, the address control section 1202 sequentially generates a memory address 1206, which corresponds to the horizontal synch counter value 1204 output from the decoder section 413 of FIG. 4, and a pulse of a read/write signal 1207 designating writing by the following timing so as to be supplied to the RGB line memory section 1201. The timing is when a coincide signal 1215 is output from a comparator 1214. More specifically, the coincide signal 1215 shows that a CPU line designation value 1212, which designates the first line set to the line designation value register 1213, and a vertical synch counter value 1211, which is output from the decoder section 413 of FIG. 4, coincides with each other. As a result, input RGB data 1205 for one line (256 dots), which corresponds to the first line input from the color-lookup table section 409, is written to the RGB line memory 1201.

After the result of the discrimination of step 3507 is YES, steps 3508 to 3513 are executed during the horizontal blank period of the first line.

In step 3508, output RGB data 1210 (FIG. 12) of the first line is transferred to the original image area A of the work RAM 308 of FIG. 3 through the data bus 417 of FIG. 4 from the RGB line memory section 1201 of FIG. 12. More specifically, the CPU 301 of FIG. 3 receives a storing end signal 1208 from the address control section 1202 of FIG. 12 through the CPU interface section 401 of FIG. 4. Thereafter, a CPU address 1209 is supplied to the address control section 1202 from the CPU 401 of FIG. 4 through the address bus 416. The address control section 1202 sequentially supplies the CPU address 1209 to the RGB line memory section 1201 as a memory address 1206, directly. Also, the address control section 1202 sequentially supplies the pulse of the read/write signal 1207 for designating the reading to the RGB line memory section 1201. Moreover, the CPU 301 sets the address calculated in the step 3503 (step 3511 to be described later) of the original image area A to the work RAM 308 as a transfer start address.

After the transfer processing of step 3508 is ended, it is discriminated whether or not the processing for all lines is ended in step 3509. More specifically, it is discriminated whether or not the register value "i" is a value 223 showing a 224th line.

If the result of the discrimination of step 3509 is NO, the register value "i" is incremented. Thereafter, in step 3511, the address of the original image area A of the work RAM 308 of FIG. 3 corresponding to the register value "i" is calculated. Then, in step 3512, similar to step 3504, the register value "i" is set to the line designation value register 1213 of FIG. 12. In step 3513, similar to step 3505, the storing start signal 1203 is set to the address control section 1202 of FIG. 12.

Thereafter, in step 3514, it is discriminated whether or not the screen display timing is out of the horizontal blank period between the line corresponding to the register value "i" and a line one before the previous line. Then, until the result of the discrimination is YES, the operation is kept in a standby state.

After the result of the discrimination of step 3514 is YES, steps 3507 to 3514 is repeatedly executed. Thereby, output RGB data 1210 (FIG. 12) of the screen, which is being displayed presently on the TV 311 of FIG. 3, is transferred to the original image area A of the work RAM 308 of FIG. 3 from the RGB line memory section 1201 of FIG. 12 through the data bus 417 of FIG. 4.

As the result of the repetition of the above operation, if it is discriminated that the processing of all lines is ended in step 3509, the screen extraction processing of FIG. 35 is ended.

By the above-mentioned screen extraction processing, output RGB data 1210 for one screen displayed on the TV 311 can be transferred to the original image area of the work RAM 308 from the VDP 302.

Explanation of Second Embodiment

The following will explain a second embodiment of the present invention. The second embodiment differs from the first embodiment in the structure of the RGB buffer section 415 of FIG. 12 and the screen extraction processing of FIG. 35.

FIG. 52 is the structural view of the second embodiment in the RGB buffer section 415 of FIG. 4.

The above structure of the second embodiment is different from the structure of FIG. 12 in the following point.

The RGB line memory section 1201 of FIG. 12 is replaced with a first RGB line memory section 5201 and a second RGB line memory section 5202 in the second embodiment of FIG. 52. Data lines for connecting the first RGB line memory section 5201 to the second RGB line memory section 5202 are connected to each other in parallel every bit in connection with all bits. In FIG. 52, the portions to which the same numbers as the case of FIG. 12 have the same function.

Figure 53:
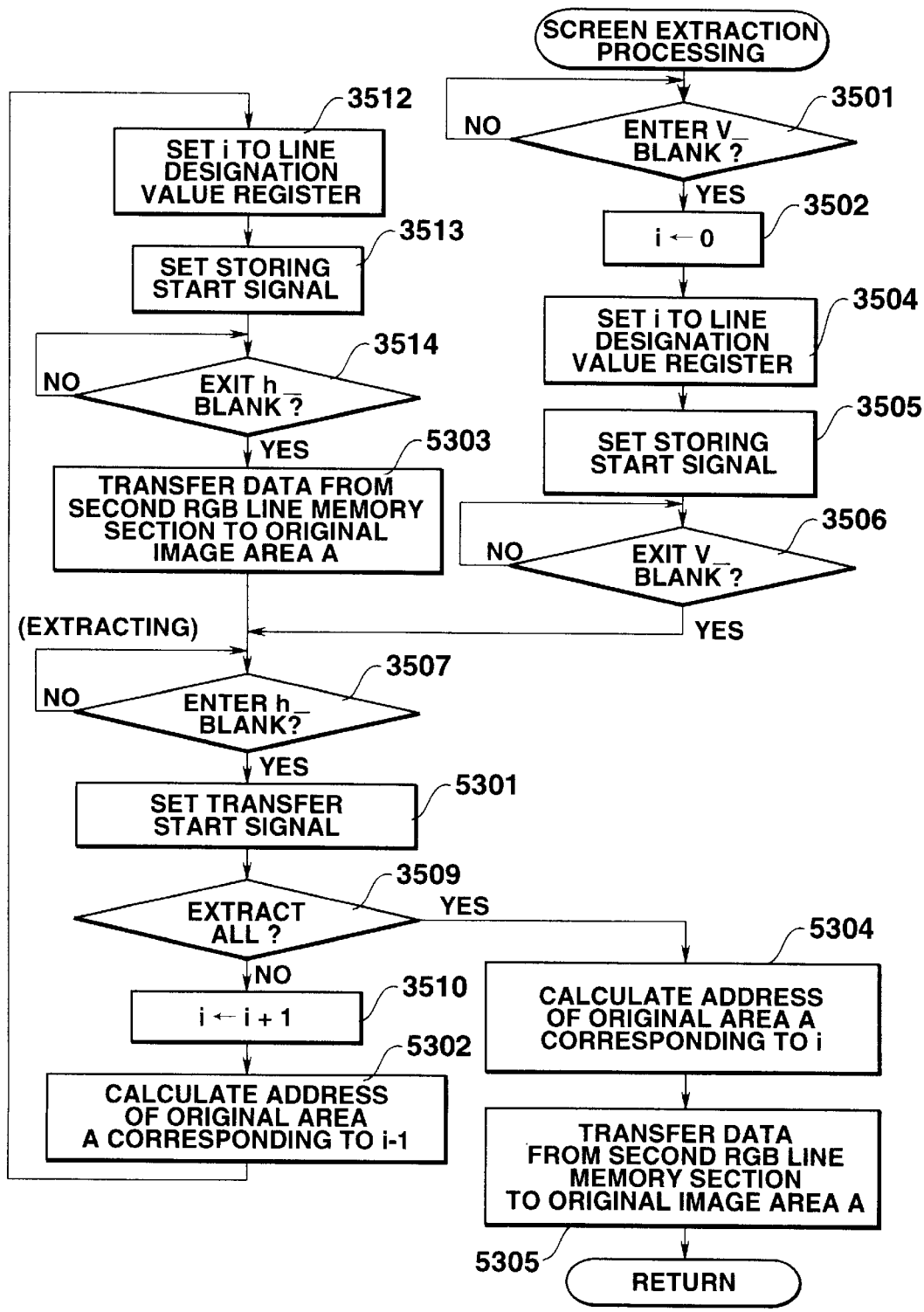
FIG. 53 is a flow chart of an operation of a screen extraction processing of the second embodiment.

FIG. 53 is an operation flow chart of the second embodiment of the screen extraction processing in which the CPU 301 of FIG. 3 executes step 3101 of FIG. 31, step 3117 of FIG. 32, or step 3129 of FIG. 33. The different point between the flow chart of FIG. 53 and that of FIG. 35 is explained as follows. In this case, in FIG. 53, the processing to which the same step number as the case of FIG. 35 is added has the same function.

First of all, the processing of each of steps 3503 and 3508 is not executed.

Figure 54:
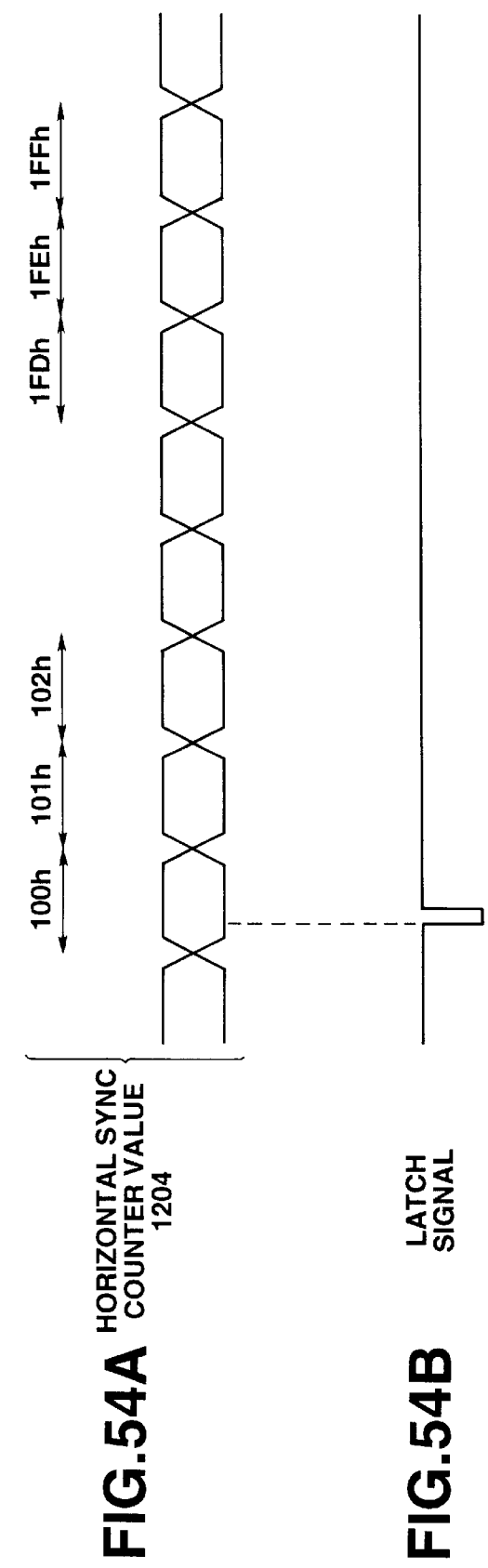
FIGS. 54A and 54B are timing charts of a transfer timing of RGB data for one horizontal blanking period of the second embodiment.

Instead, in step 5301 of FIG. 53, which is executed for the horizontal blank period, the CPU 301 of FIG. 3 receives the storing end signal 1208 from the address control section 1202 of FIG. 52 through the CPU interface section 401. Thereafter, a transfer start signal 5203 is set to the address control section 1202 of FIG. 52, which is provided in the RGB buffer 415 of FIG. 4, through the CPU interface section 401 of FIG. 4 provided in the VDP 302 of FIG. 3. As a result, a latch signal (not shown) is output to the first and second RGB line memory sections 5201 and 5202 from the address control section 1202 by time shown in FIG. 54B. Thereby, RGB data (corresponding to input RGB data 1205), which is stored in the first RGB line memory section 5201 of FIG. 52 for the horizontal display period just before the present horizontal blank period, is transferred to the second RGB line memory section 5202 in parallel at one time by timing of the horizontal synch counter value 1204 of FIG. 54A corresponding to the head of the present horizontal blank period.

Next, in step 5302 (corresponding to step 3502 of FIG. 35), an address of the original image area A of the work RAM 308 of FIG. 3 is calculated. The address corresponds to the value, which is obtained by decrementing 1 from the register value "i."

Then, in step 5302 of FIG. 53, which is executed during a next horizontal display period, RGB data of the line, which corresponds to one previous horizontal display period stored in the second RGB line memory section 5202, is transferred to the original image area A of the work RAM 308 of FIG. 3 through the data bus 417 of FIG. 4 as output RGB data 1210. More specifically, the CPU 301 supplies the CPU address 1209 to the address control section 1202 from the CPU interface section 401 through the address bus 416. The address control section 1202 sequentially supplies the CPU address 1209 to the second RGB line memory section 5202 as a memory address (not shown) directly. Also, the address control section 1202 sequentially supplies the pulse of the read signal (not shown) to the second RGB line section 5202. Moreover, the CPU 301 sets the address of the original image area A calculated in step 3502 to the work RAM 308 as the transfer start address. As mentioned in the explanation of step 5302, the transfer start address corresponds to the value, which is obtained by decrementing 1 from the register value "i", that is, one previous horizontal display period from the present horizontal display period.

At the same time, during the horizontal display period, the address control section 1202 receives the storing start signal 1203 from the CPU 301. Thereafter, the address control section 1202 sequentially generates the memory address 1206, which corresponds to the horizontal synch counter value 1204 output from the decoder section 413 of FIG. 4, and the pulse of a read/write signal 1207 designating writing by the following timing so as to be supplied to the RGB line memory section 5201. The timing is when the coincide signal 1215 is output from the comparator 1214. More specifically, the coincide signal 1215 shows that the CPU line designation value 1212, which designates the first line set to the line designation value register 1213, and the vertical synch counter value 1211, which is output from the decoder section 413 of FIG. 4, coincides with each other. As a result, input RGB data 1205 for one line (256 dots), which corresponds to the first line input from the color-lookup table section 409, is written to the RGB line memory 5201.

Also, in step 5304, the address of the original image area A of the work RAM 308 is calculated. The address corresponds to the register value "i" corresponding to the final line. Then, in step 3503, RGB data of the line, which corresponds to the final horizontal display period stored in the second RGB line memory section 5202, is transferred as the output RGB data 1210 after the transfer start address of the original image area A of the work RAM 308 calculated through the data bus 417 in step 5304.

By the above-mentioned operation of the second embodiment, in the system in which output RGB data 1210 for one line cannot be fully transferred to the work RAM 308 from the VDP 302 during the horizontal blank period, the horizontal display period, which is longer than the horizontal blank period, is used, so that output RGB data 1210 for one line can be transferred to the work RAM 308 from the VDP 302.

Explanation of Third Embodiment

The following will explain the third embodiment of the present invention. The third embodiment is a modification of the second embodiment, and the structure of the details of the RGB buffer section 415 of FIG. 52 is different from the case of the second embodiment. The operation flow chart of the screen extraction processing of the third embodiment is the same as the operation flow chart of FIG. 53 relevant to the second embodiment.

In the structure of FIG. 52, unlike the second embodiment, the data lines for connecting the first RGB line memory section 5201 to the second RGB line memory section 5202 are not connected to each other in parallel every bit in connection with all bits. In other words, for example, the data lines are connected to each other in parallel every ¼ bit in connection with all bits.

In the screen extraction processing of FIG. 53, if the transfer start signal 5203 is set to the address control section 1202 of FIG. 52 from the CPU 301 of FIG. 3 in step 5301, which is executed during the horizontal blank period, the following operation is executed.

Figure 55:
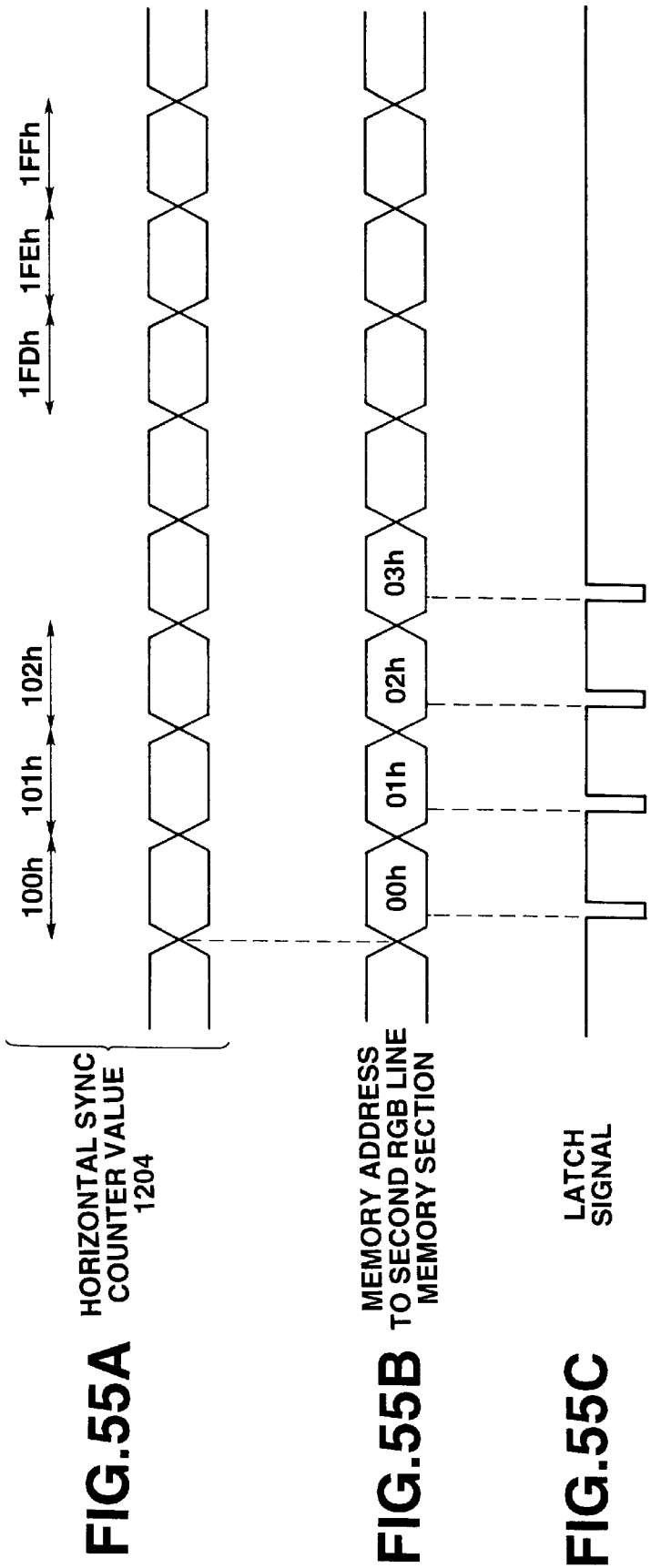
FIGS. 55A–55C are timing charts of a transfer timing of RGB data for one horizontal blanking period of a third embodiment.

More specifically, the address control section 1202 outputs not only one latch signal (FIG. 54B) but, e.g., four latch signals to the first and second RGB line memory sections 5201 and 5202 sequentially. In synchronism with these signals, the address control section 1202 sequentially outputs four memory address values of FIG. 55B.

As a result, RGB data of the memory area of the first RGB line memory section 5201, which corresponds to the memory address designated from the address control section 1202, is transferred to the memory area of the second RGB line memory section 5202 in parallel every ¼ bit in connection with all bits.

By the above structure of the third embodiment, an I/O (input/output) bit width between the first RGB line memory section 5201 and the second RGB line memory section 5202 can be reduced, the hardware scale of the portion can be reduced.

Fourth Embodiment

The following will explain the fourth embodiment of the present invention. The fourth embodiment is also an modification of the second embodiment.

Figure 56:
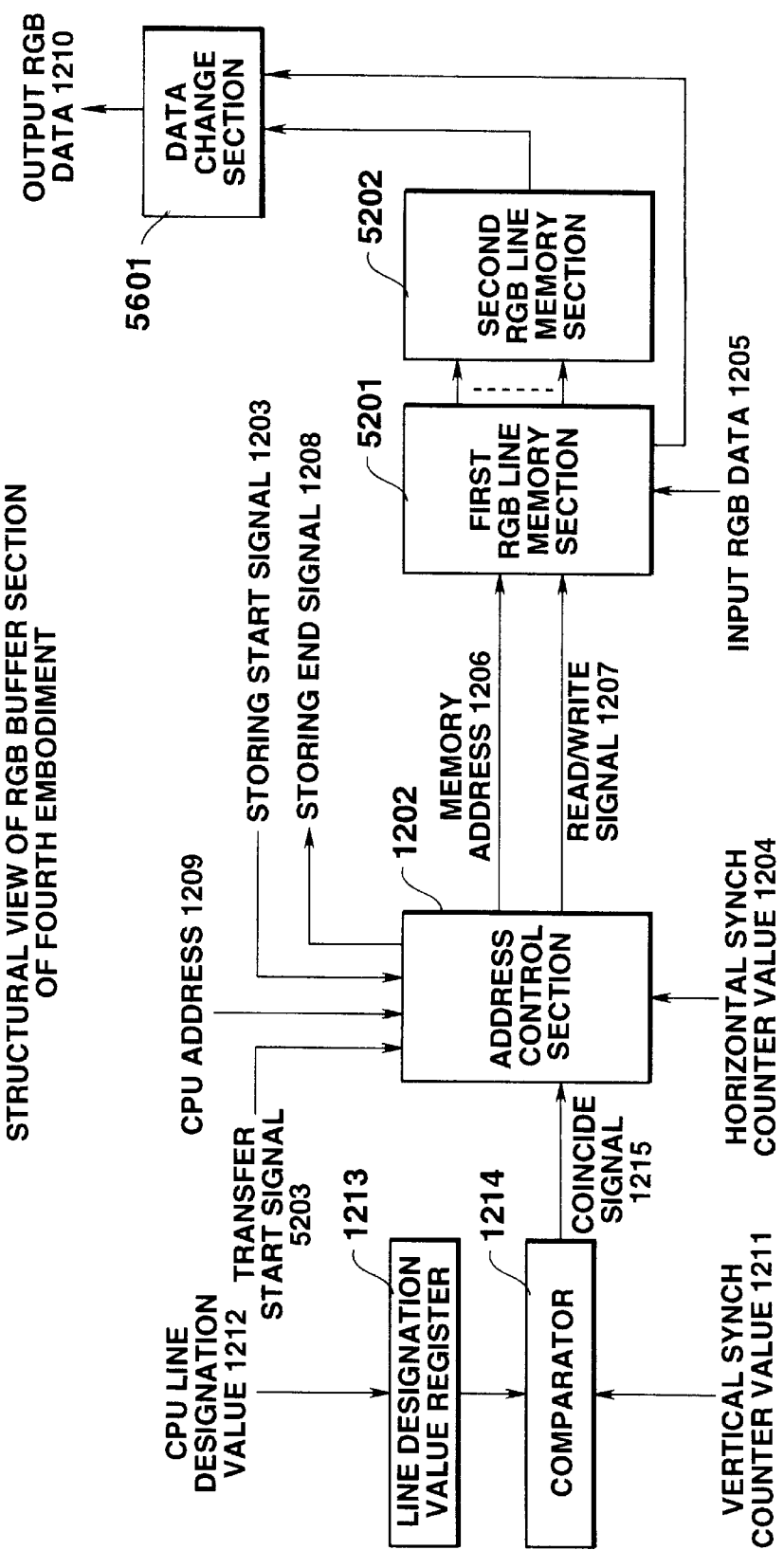
FIG. 56 is a structural view of an RGB buffer section of a fourth embodiment.

FIG. 56 is the structural view of the fourth embodiment of the RGB buffer section 425 of FIG. 4. The difference between the structure of FIG. 56 and that of the second embodiment lies in the following point.

More specifically, an output line, which has the same data width as the data bus 417 of FIG. 4, is stretched from the first RGB line memory section 5201. A data change-over section 5601 for selecting the output of the first RGB line memory section 5201 and that of the second RGB line memory section 5202 is provided before the data bus 417. In FIG. 56, the portions to which the same numbers as the case of FIG. 52 are added have the same function as the case of FIG. 52.

Then, during each of the horizontal blank periods, the CPU 301 reads RGB data from the first RGB line memory section 5201. Then, residual RGB data, which is not read during the horizontal blank period, is once transferred to the second RGB line memory section 5202. Then, the CPU 301 reads residual RGB data transferred to the second RGB line memory section 5202 during the next horizontal display period.

Figure 57:
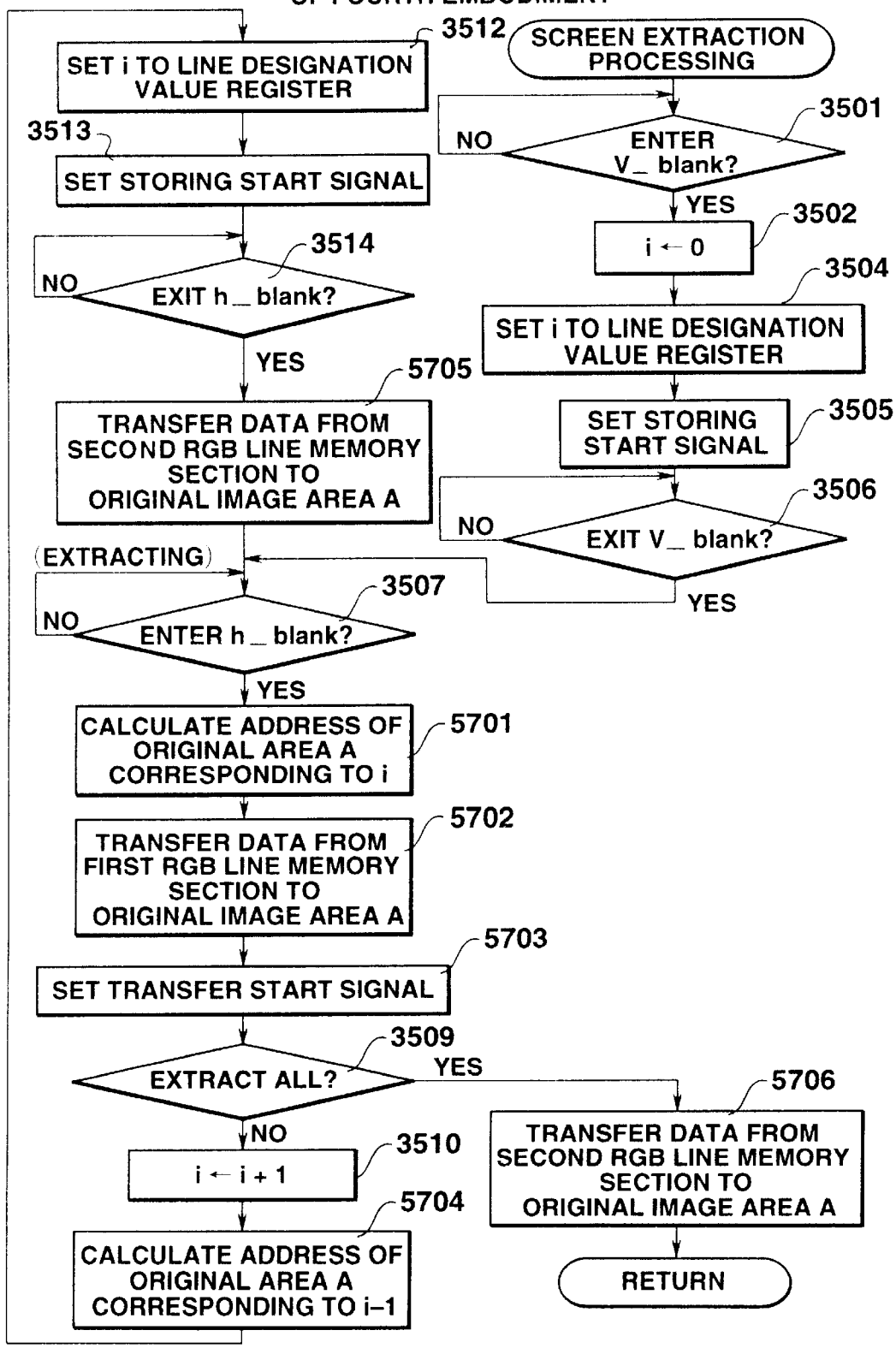
FIG. 57 is a flow chart of an operation of a screen extraction processing of the fourth embodiment.

FIG. 57 is an operation flow chart of the fourth embodiment of the screen extraction processing in which the CPU 301 of FIG. 3 executes step 3101 of FIG. 31, step 3117 of FIG. 32, or step 3129 of FIG. 33. The different point between the flow chart of FIG. 57 and that of FIG. 35 is explained as follows. In this case, in FIG. 57, the processing to which the same step number as the case of FIG. 35 is added has the same function.

More specifically, first, the processing of step 3503 of FIG. 35 is not executed.

On the other hand, in step 5701 of FIG. 57, which is executed during the horizontal blank period, the CPU 301 receives the storing end signal 1208 from the address control section of FIG. 56 through the CPU interface section 401 of FIG. 4. Thereafter, an address of the original image area A of the work RAM 308 of FIG. 3, which corresponds to the register value "i", is calculated in step 5701.

Next, in step 5702 (corresponding to step 3508 of FIG. 35), output RGB data 1210 of each line is transferred to the original image area A of the work RAM 308 from the first RGB line memory 5201 of FIG. 56 through the data bus 417 of FIG. 4. More specifically, the CPU 301 of FIG. 3 receives the storing end signal 1208 from the address control section 1202 of FIG. 56 through the CPU interface section 401 of FIG. 4. Thereafter, the CPU address 1209 is supplied to the address control section 1202 by timing of FIG. 58B from the CPU interface section 401 of FIG. 4 through the address bus 416. The address control section 1202 sequentially supplies the CPU address 1209 to the first RGB line memory section 5201 as a memory address directly. Also, the address control section 1202 sequentially supplies the pulse of read/write signal 1207 for designating the reading to the first RGB line section 5201. Moreover, the output of the first RGB line memory section 5201 to the data change-over section 5601 is selected. Furthermore, the CPU 301 sets the address of the original image area A calculated in step 3701 to the work RAM 308 as the transfer start address.

Figure 58:
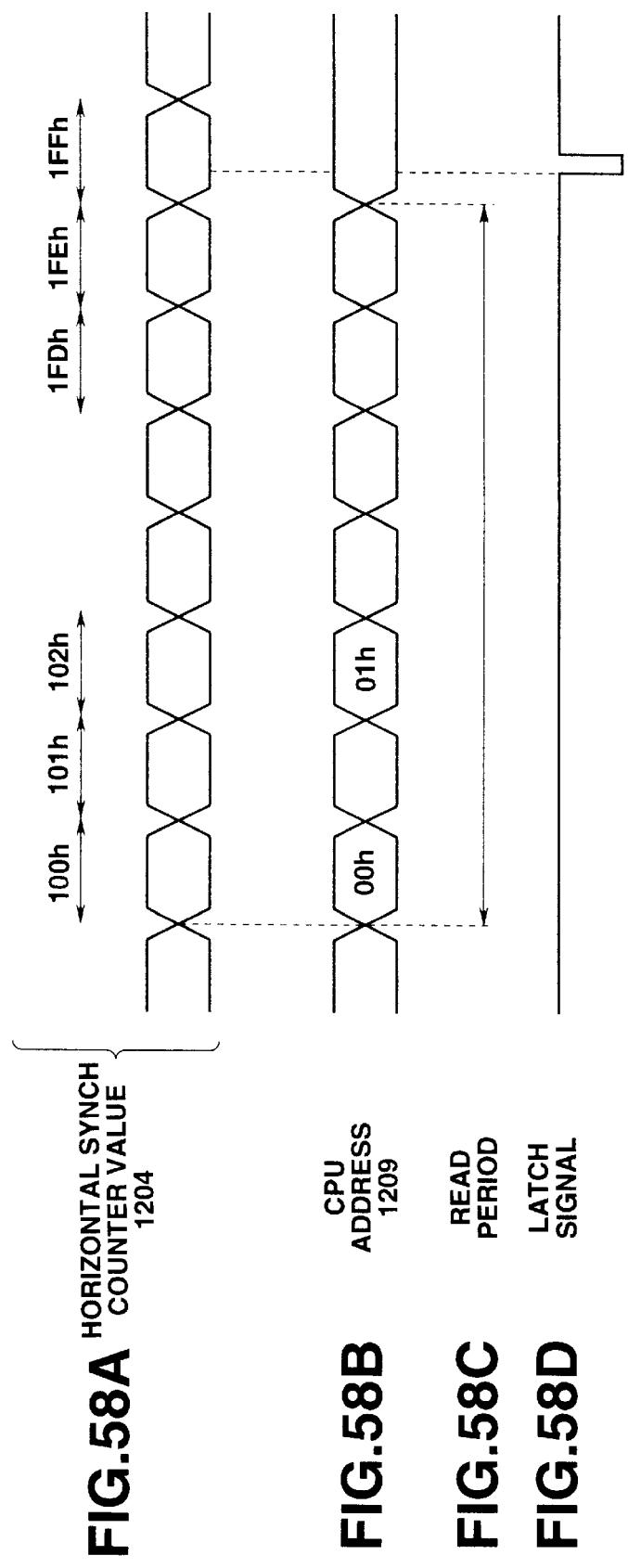
FIGS. 58A–58D are timing charts of reading and transfer timing of RGB data for one horizontal blanking period of the fourth embodiment.

Sequentially, the CPU 301 stops reading RGB data from the first RGB line memory section 5201 corresponding to the present line at the time when the horizontal synch counter value 1204 becomes a value 1FEh (h shows hexadecimal) corresponding to timing one clock before the final timing of the horizontal blank period of FIG. 58A. Then, in step 5703, the transfer start signal 5203 is set to the address control section 1202 of FIG. 56 through the CPU interface section 401 of FIG. 4. As a result, a latch signal (not shown) is output to the first and second RGB line memory sections 5201 and 5202 from the address control section 1202 by timing of FIG. 58D. Moreover, among output gates, which are connected to the second RGB line memory section 5202, the address control section 1202 controls an output gate, which corresponds to the residual RGB data, which is not transferred to the first RGB line memory section 5201, to be opened. The addresses of the residual RGB data can be discriminated based on the value of the CPU address 1209 input to the address control section 1202 from the present CPU 301. Thereby, by timing of the horizontal synch counter value 1204 corresponding to the tail of the present horizontal blank period, RGB data, which is not transferred to the work RAM 308 during the present horizontal blank period among RGB data (corresponding to input RGB data 1205) stored in the first RGB line memory section 5201 for the horizontal display period just before the present horizontal blank period, is transferred to the second RGB line memory section 5202 in parallel at one time.

Next, in step 5704 (corresponding to step 3502 of FIG. 35), the address of the original image area A of the work RAM 308 of FIG. 3 is calculated. The address corresponds to the value, which is obtained by decrementing from the register value "i".

Then, in step 5705, which is executed during a next horizontal display period, RGB data of the line, which corresponds to one previous horizontal display period stored in the second RGB line memory section 5202, is transferred to the original image area A of the work RAM 308 of FIG. 3 through the data bus 417 of FIG. 4 as output RGB data 1210. More specifically, the CPU 301 supplies the CPU address 1209 to the address control section 1202 from the CPU interface section 401 through the address bus 416. The address control section 1202 sequentially supplies the CPU address 1209 to the second RGB line memory section 5202 as a memory address (not shown) directly. Also, the address control section 1202 sequentially supplies the pulse of the read signal (not shown)to the second RGB line section 5202. Moreover, the output of the second RGB line memory section to the data change-over 5601 is selected. Furthermore, the CPU 301 sets the address of the original image area A calculated in step 3704 to the work RAM 308 as the transfer start address. As mentioned in the explanation of step 5704, the transfer start address corresponds to the value, which is obtained by decrementing from the register value "i", that is, one previous horizontal display period from the present horizontal display period.

At the same time, during the horizontal display period, the address control section 1202 receives the storing start signal 1203 from the CPU 301. Thereafter, the address control section 1202 sequentially generates the memory address 1206, which corresponds to the horizontal synch counter value 1204 output from the decoder section 413 of FIG. 4, and the pulse of the read/write signal 1207 designating writing by the following timing so as to be supplied to the RGB line memory section 5201 as shown in FIGS. 13A–13D. The timing is when the coincide signal 1215 is output from the comparator 1214. More specifically, the coincide signal 1215 shows that the CPU line designation value 1212, which designates the first line set to the line designation value register 1213, and the vertical synch counter value 1211, which is output from the decoder section 413 of FIG. 4, coincides with each other. As a result, input RGB data 1205 for one line (256 dots), which corresponds to the first line input from the color-lookup table section 409, is written to the RGB line memory 5201.

Also, in step 5706, residual RGB data of the line, which corresponds to the final horizontal display period stored in the second RGB line memory section 5202, is transferred to as output RGB data 1210 after the transfer start address of the original image area A of the work RAM 308 calculated through the data bus 417 in step 5304.

By the above-mentioned operation of the second embodiment, in the system in which output RGB data 1210 for one line cannot be fully transferred to the work RAM 308 from the VDP 302 for the horizontal blank period, the horizontal display period, which is longer than the horizontal blank period, is used, so that output RGB data 1210 for one line can be transferred to the work RAM 308 from the VDP 302.

Fifth Embodiment

Finally, the following will explain the fifth embodiment of the present invention. The fifth embodiment is different from the previous embodiment in the the structure of the RGB buffer section 415 of FIG. 12 and the screen extraction processing of FIG. 35.

Figure 59:
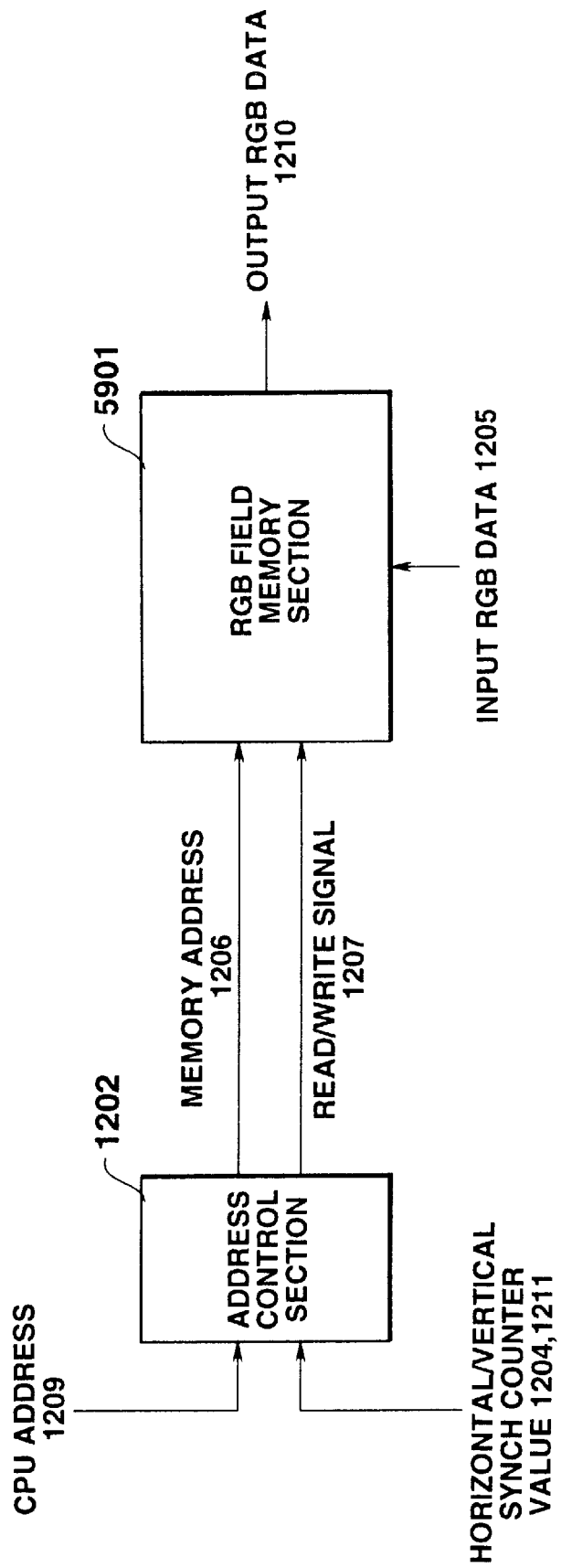
FIG. 59 is a structural view of an RGB buffer section of a fifth embodiment.

FIG. 59 is the structural view of the fifth embodiment of the RGB buffer section 415 of FIG. 4.

The difference between the above structure and the structure of FIG. 12 lies in that the RGB line memory section 1201 of FIG. 12 is replaced with a RGB field memory section 5901. The RGB field memory section 5901 can store input RGB data 1205 for one screen to be displayed on TV 311. The structure of the fifth embodiment is the structure, which is used in the case where there is a room in the hardware.

The operation flow chart of the screen extraction processing of the fifth embodiment corresponding to the screen extraction processing of FIG. 35 is not particularly shown. However, the schematic operation of the screen extraction processing of the fifth embodiment is as follows.

More specifically, the address control section 1202 outputs the memory address 1206 and the read/write signal 1207 for designating the writing to the RGB field memory section 5901 every horizontal display period (FIG. 11) of each vertical display period. In this case, the memory address 1206 is synchronized with the horizontal synch counter value 1204 and the vertical synch counter value 1211, and corresponds to each dot position of the screen. Thereby, input RGB data 1205 for one field is written to the RGB field memory section 5901 from the color look-up table section 409.

Then, the CPU 301 of FIG. 3 supplies the CPU 1209 to the address control section 1202 from the CPU interface section 401 of FIG. 4 through the address bus 416 during the vertical blank period. The address control section 1202 sequentially supplies the CPU address 1209 to the RGB field memory section 5901 as a memory address 1206 directly. Also, the address control section 1202 sequentially supplies the pulse of the read/write signal 1207 for designating the reading to the RGB field memory section 5901. As a result, output RGB data 1210 for one field is output to the work RAM 308 from the RGB field memory section 5901 through the data bus 417 of FIG. 4. Output RGB data 1210 is stored in the original image area A of the work RAM 308 of FIG. 3.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image controller with a printer, comprising:

image data storing means for storing background data which are allocated to any one of a plurality of imaginary display screens, and for storing display object image data to be displayed at a position of other imaginary display screens to be allocated;

display object displaying position storing means for storing the display position on said imaginary display screen of said display object image data;

priority controlling means for selecting one of image data of said imaginary display screens;

a display screen for displaying the selected one of image data of the imaginary display screens;

controlling means for supplying background data and display object image data to said image data storing means, and for supplying the display position on said imaginary display screen of said display object image data to said display object displaying position storing means;

scanning means for scanning the display screen which displays the selected one of image data of the imaginary display screens;

image processing means for reading background data, which are allocated to the display screen, corresponding to a scanning position scanned by said scanning means, and for reading display object image data, which are allocated to the display screen, from said image data storing means when said scanning position coincides with a display position of said display object image data stored in said display object display position storing means, so as to sequentially output an image signal corresponding to said read background image data and display object image data one horizontal line by one horizontal line;

image line storing means for temporarily storing said image data for one horizontal line at a time of said image data, which lines are sequentially output from said image processing means; and print processing executing means for executing a print processing based on said image signal for one horizontal line at a time which is stored in said image line storing means; and wherein said image data storing means, said display object displaying position storing means, said priority controlling means, said controlling means, said scanning means, said image processing means, said image line storing means and said print processing executing means are provided in a same housing.

2. The image controller according to claim 1, wherein writing of said image to said image line storing means is executed to be synchronized with a start of a horizontal display period corresponding to a designated horizontal line.

3. The image controller according to claim 1, wherein said printing processing executing means comprises screen storing means for sequentially storing the image signal for one horizontal line sequentially stored in said image line storing means so as to store the image signal for one screen, and executes the print processing based on the image stored in said screen storing means.

4. An image controller with a printer, comprising:

image data storing means for storing background data which are allocated to any one of a plurality of imaginary display screens, and for storing display object image data to be displayed at a position of other imaginary display screens to be allocated;

display object displaying position storing means for storing the display position on said imaginary display screen of said display object image data;

priority controlling means for selecting one of image data of said imaginary display screens;

a display screen for displaying the selected one of image data of the imaginary display screens;

controlling means for supplying background data and display object image data to said image data storing means, and for supplying the display position on said imaginary display screen of said display object image data to said display object displaying position storing means;

scanning means for scanning the display screen which displays the selected one of image data of the imaginary display screens;

image processing means for reading background data, which are allocated to the display screen, corresponding to a scanning position scanned by said scanning means, and for reading display object image data, which are allocated to the display screen, from said image data storing means when said scanning position coincides with a display position of said display object image data stored in said display object display position of means, so as to sequentially output an image signal corresponding to said read background image data and display object image data one horizontal line by one horizontal line;

image line storing means for temporarily storing said image data for one horizontal line at a time of said image data, which lines are sequentially output from said image processing means;

print processing executing means for executing a print processing based on said image signal for one horizontal line at a time which is stored in said image line storing means; and printing state controlling means for supplying said display image data corresponding to a print state of said print processing executing means to said image processing means through said controlling means; and wherein said image data storing means, said display object displaying position storing means, said priority controlling means, said controlling means, said scanning means, said image processing means, said image line storing means, said print processing executing means and said print state controlling means are provided in a same housing.

5. The image controller according to claim 4, wherein said printing state controlling means includes detecting means for detecting abnormality of said printing state, and which varies said display image data supplied to said image processing means through said controlling means in accordance with a kind of abnormality detected by said detecting means.

6. The image controller according to claim 5, wherein said detecting means detects shortage of printing paper of said print processing executing means and a setting defectiveness of said printing paper.

7. The image controller according to claim 4, wherein writing of said image to said image line storing means is executed to be synchronized with a start of a horizontal display period corresponding to a designated horizontal line.

8. The image controller according to claim 4, wherein said print processing executing means comprises screen storing means for sequentially storing the image data for one horizontal line sequentially stored in said image line storing means so as to store the image signal for one screen, and executes the print processing based on the image stored in said screen storing means.

9. An image controller with a printer, comprising:

image data storing means for storing background data which are allocated to any one of a plurality of imaginary display screens, and for storing display object image data to be displayed at a position of other imaginary display screens to be allocated;

display object displaying position storing means for storing the display position on said imaginary display screen of said display object image data;

priority controlling means for selecting one of image signals of said imaginary display screens;

a display screen for displaying the selected one of image data of the imaginary display screens;

controlling means for supplying background data and display object image data to said image data storing means, and for supplying the display position on said imaginary display screen of said display object image data to said display object displaying position storing means;

scanning means for scanning the display screen which displays the selected one of image data of the imaginary display screens;

image processing means for reading background data, which are allocated to the display screen, corresponding to a scanning position scanned by said scanning means, and for reading display object image data, which are allocated to the display screen, from said image data storing means when said scanning position coincides with a display position of said display object image data stored in said display object display position storing means, so as to sequentially output an image signal corresponding to said read background image data and display object image data one horizontal line by one horizontal line;

image line storing means for temporarily storing said image data for one horizontal line at a time of said image data, which lines are sequentially output from said image processing means; print processing executing means for executing a print processing based on said image data for one horizontal line at a time which is stored in said image line storing means.

10. The image controller according to claim 9, wherein said image data storing means, said display object displaying position storing means, said priority controlling means, said controlling means, said scanning means, said image processing means, said image line storing means and said print processing executing means are provided in a same housing.

11. The image controller according to claim 9, wherein writing of said image to said image line storing means is executed to be synchronized with a start of a horizontal display period corresponding to a designated horizontal line.

12. The image controller according to claim 9, wherein said print processing executing means comprises screen storing means for sequentially storing the image data for one horizontal line sequentially stored in said image line storing means so as to store the image data for one screen, and executes the print processing based on the image stored in said screen storing means.

13. The image controller according to claim 12, wherein:

said image line storing means comprises first and second line memory means;

said image data for one horizontal line sequentially output from said image processing means is sequentially written to said first line memory means and the image data for one horizontal line is sequentially transferred to said screen storing means from said second line memory means during the horizontal display period; and said image data for one horizontal line is transferred to said second line memory means from said first line memory means during a horizontal blanking period.

14. The image controller according to claim 12, wherein:

said image line storing means comprises first and second line memory means;

said image data for one horizontal line sequentially output from said image processing means is written to said first line memory means during the horizontal display period;

said image data is sequentially transferred to said screen storing means from said first line memory means during the horizontal blanking period which follows said horizontal display period, and the remaining image data untransferred to said screen storing means from said first line memory means during said horizontal blanking period is transferred to said second line memory means from said first line memory means during a time following the horizontal blanking period; and said image data is sequentially transferred to said screen storing means from said first line memory means and the remaining image data before one horizontal line is sequentially transferred to said screen storing means from said second line memory means during the horizonal display period which follows said horizontal blanking period.

* * * * *